US011525383B2

(12) United States Patent
King

(10) Patent No.: US 11,525,383 B2
(45) Date of Patent: Dec. 13, 2022

(54) MOTORCYCLE ENGINE WITH AN ALWAYS SPRING BIASED OPEN EXHAUST VALVE

(71) Applicant: Timothy B. King, New Woodstock, NY (US)

(72) Inventor: Timothy B. King, New Woodstock, NY (US)

( * ) Notice: Subject to any disclaimer, the term of this patent is extended or adjusted under 35 U.S.C. 154(b) by 47 days.

(21) Appl. No.: 16/851,437

(22) Filed: Apr. 17, 2020

(65) Prior Publication Data

US 2020/0240313 A1 Jul. 30, 2020

Related U.S. Application Data

(63) Continuation-in-part of application No. 15/707,286, filed on Sep. 18, 2017, now Pat. No. 10,634,035, which is a continuation-in-part of application No. 15/173,029, filed on Jun. 3, 2016, now Pat. No. 9,797,275.

(51) Int. Cl.
| | |
|---|---|
| *F01N 13/08* | (2010.01) |
| *F02D 13/02* | (2006.01) |
| *F02B 61/02* | (2006.01) |
| *F01L 5/20* | (2006.01) |
| *F01L 1/02* | (2006.01) |
| *F01L 5/02* | (2006.01) |
| *F02B 75/02* | (2006.01) |

(52) U.S. Cl.
CPC ............. *F01N 13/082* (2013.01); *F01L 1/02* (2013.01); *F01L 5/02* (2013.01); *F01L 5/20* (2013.01); *F02B 61/02* (2013.01); *F02D 13/0284* (2013.01); *F02B 2075/025* (2013.01); *Y02T 10/12* (2013.01)

(58) Field of Classification Search
CPC .... F02B 25/20; F02B 2075/025; F02D 13/02; F02D 13/0284
See application file for complete search history.

(56) References Cited

U.S. PATENT DOCUMENTS

| 4,766,854 A | 8/1988 | Riese |
| 4,776,305 A | 10/1988 | Oike |
| (Continued) | | |

FOREIGN PATENT DOCUMENTS

| JP | 62035020 A | 2/1987 |
| JP | 05133230 A * | 5/1993 |
| (Continued) | | |

*Primary Examiner* — John M Zaleskas
(74) *Attorney, Agent, or Firm* — Harris Beach PLLC

(57) ABSTRACT

A method of operation of exhaust valves of an adjustable exhaust port 2-stroke motorcycle engine with a two stage exhaust valve system includes: providing a control rod mechanically coupled to a governor, so that the governor causes a rotation of the control rod. A first stage exhaust valve, a second stage left exhaust valve, and a second stage right exhaust valve are also controllably linked to the control rod; and operating the second stage left exhaust valve and the second stage right exhaust valve by opening at least one of the second stage left exhaust valve and the second stage right exhaust valve before the first stage exhaust valve is completely open in an overlap operation. Related methods and structures for overlap, and/or stagger, and/or limiter operation of exhaust valves of an adjustable exhaust port 2-stroke motorcycle engine are also described.

11 Claims, 41 Drawing Sheets

SPRING-LOADED OPEN

(56) References Cited

U.S. PATENT DOCUMENTS

| | | | |
|---|---|---|---|
| 5,752,476 A | 5/1998 | Nakamura | |
| 6,019,090 A | 2/2000 | Ozawa | |
| 6,021,748 A | 2/2000 | Motose | |
| 6,253,718 B1 | 7/2001 | Uchida et al. | |
| 6,273,036 B1 | 8/2001 | Uchida et al. | |
| 9,797,275 B1 * | 10/2017 | King | F01L 1/02 |
| 10,634,035 B2 * | 4/2020 | King | F01N 13/082 |
| 2001/0027758 A1 * | 10/2001 | Ishida | F02F 1/22 |
| | | | 123/65 PE |

FOREIGN PATENT DOCUMENTS

| | | | | |
|---|---|---|---|---|
| JP | 05141249 A | | | 6/1993 |
| JP | 05321673 A | | | 12/1993 |
| JP | 08049548 A | * | | 2/1996 |
| JP | 08093481 A | * | | 4/1996 |
| JP | 08093482 A | | | 4/1996 |
| JP | 08296444 A | | | 11/1996 |
| JP | 09105331 A | | | 4/1997 |
| JP | 09228840 A | * | | 9/1997 |
| JP | 10061444 A | | | 3/1998 |
| JP | 10077850 A | * | | 3/1998 |
| JP | 10159569 A | * | | 6/1998 |
| JP | 2000018043 A | * | | 1/2000 |
| JP | 2000034929 A | | | 2/2000 |
| JP | 2001012248 A | | | 1/2001 |
| JP | 2001027136 A | * | | 1/2001 |
| JP | 2005023832 A | * | | 1/2005 |
| JP | 2005315143 A | | | 11/2005 |

* cited by examiner

1999 YZ250

PRIOR ART

1999 YZ250

ORIGINAL DEFAULT POSITION CLOSED

OLDER CENTER VALVE
8
NEWER CENTER VALVE
8
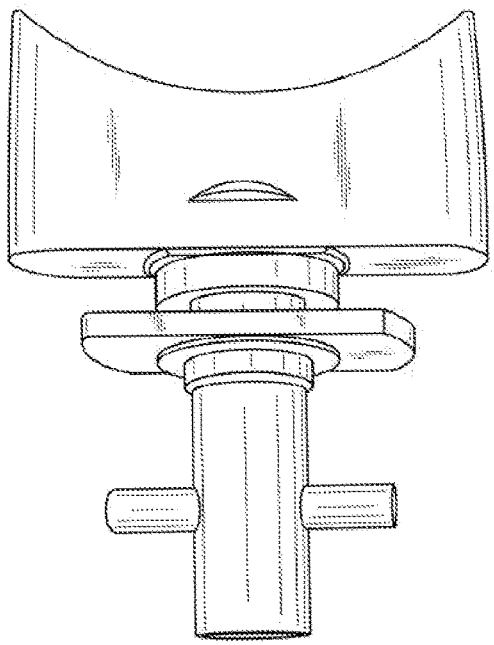
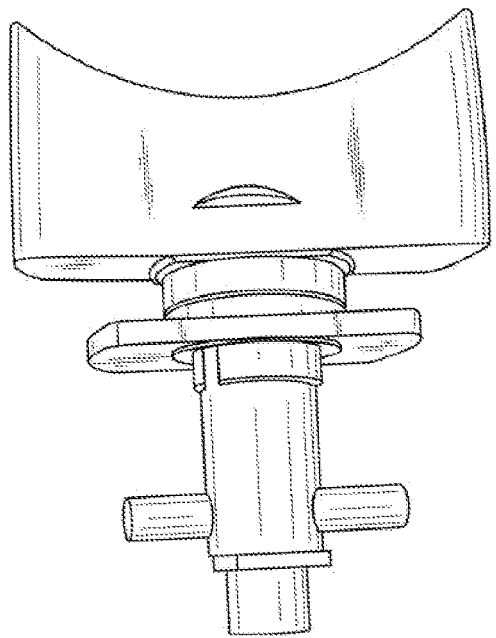
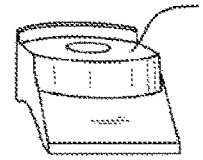
HOLDER
PRIOR ART

VALVES CLOSED NO CONTACT WITH HOLDER

SPRING TENSION/RESISTANCE ON GOVERNOR

SPRING-LOADED OPEN

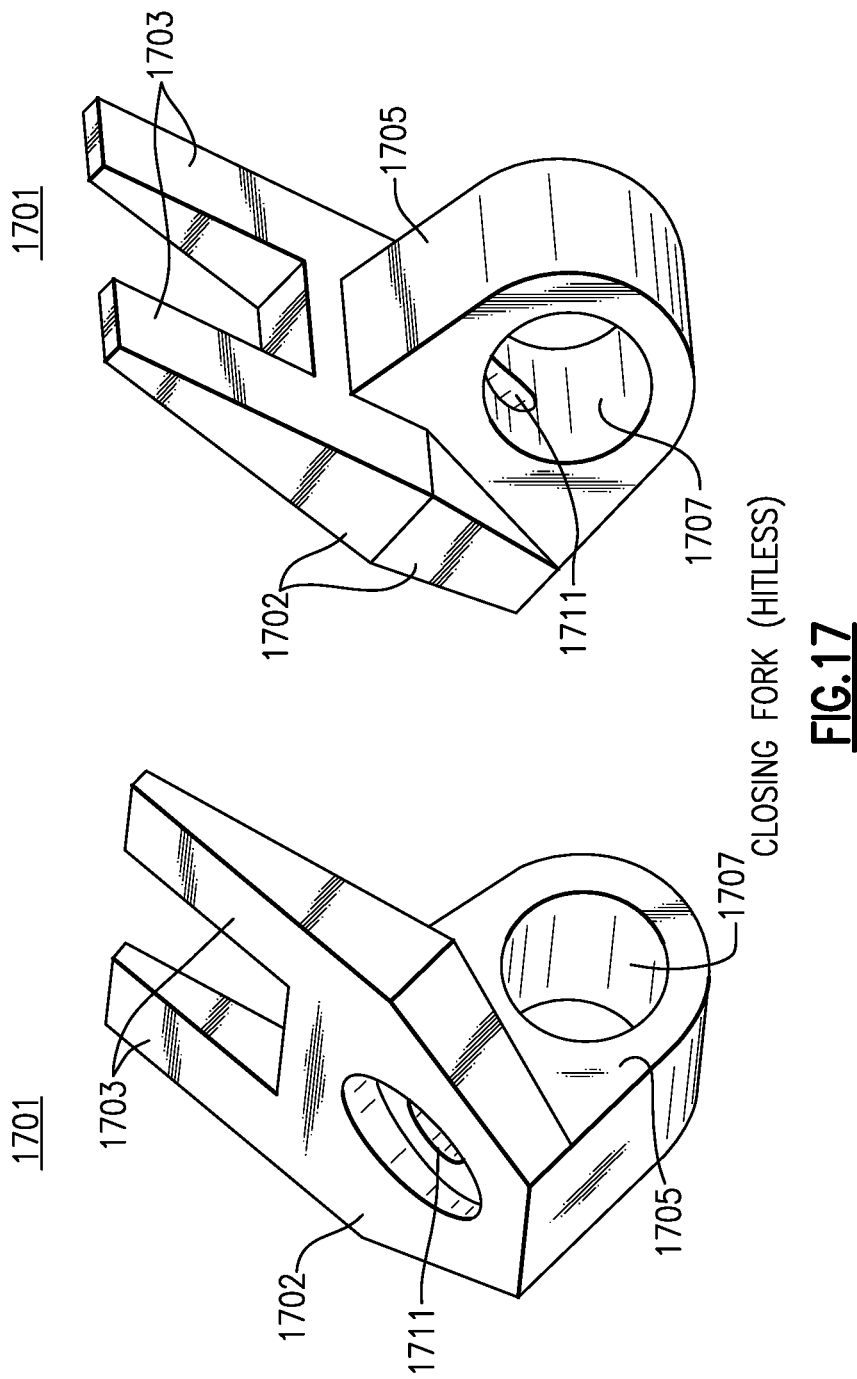

CLOSING FORK (HITLESS)

OPENING OF POWER VALVES ACCORDING TO THE NEW HITLESS SYSTEM

ALL POWER VALVES OPEN

CENTER OPEN SIDES CLOSED

ALL POWER VALVES CLOSED

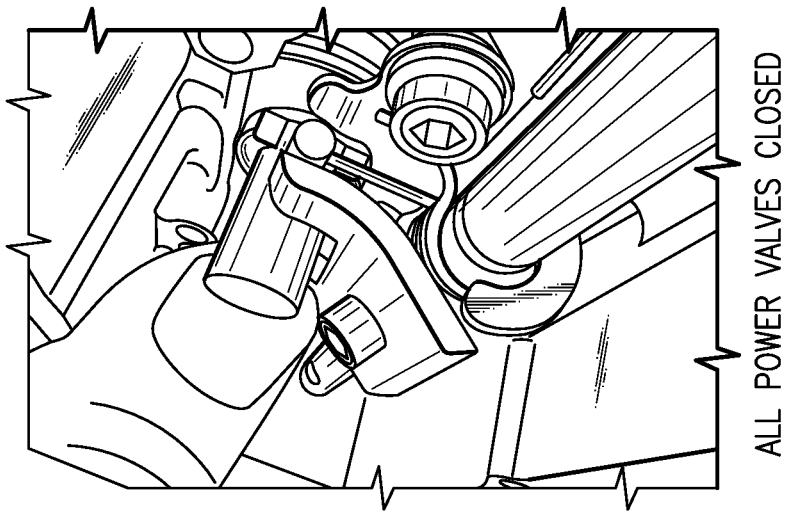
FIG.21C ALL POWER VALVES CLOSED
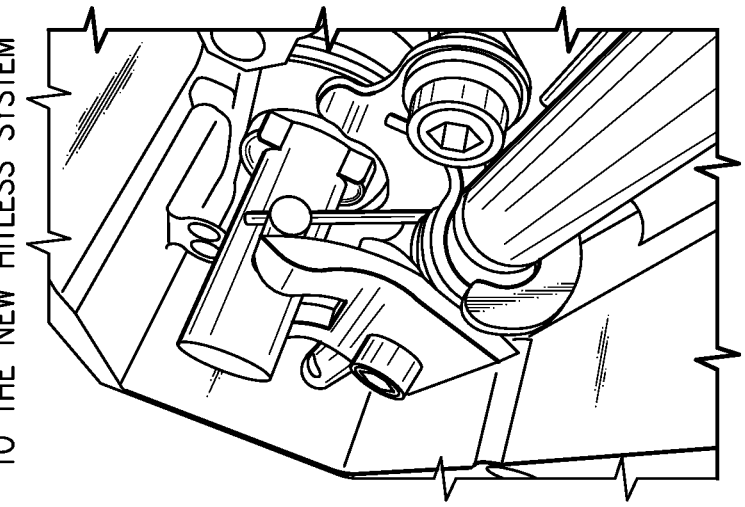
FIG.21B CENTER OPEN SIDES CLOSED
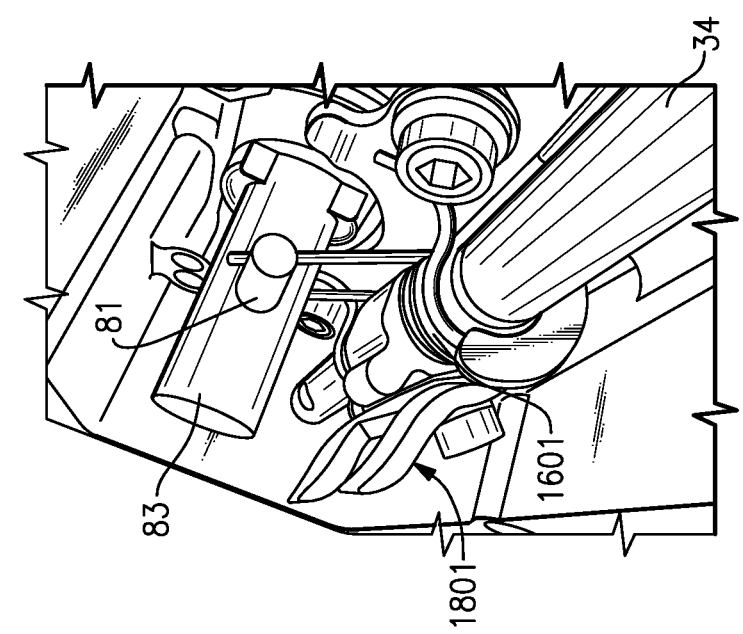
FIG.21A ALL POWER VALVES OPEN
CLOSING ALL POWER VALVES ACCORDING TO THE NEW HITLESS SYSTEM

NEW DEFAULT POSITION OPEN

```
┌─────────────────────────────────────────────────────────┐
│  PROVIDING AN UPGRADE KIT INCLUDING A CLOSING FORK      │
│  HAVING FORKED ARMS, AND TWO TORSION SPRINGS TO SPRING  │
│  BIAS A CENTER ADJUSTABLE EXHAUST VALVE TO AN OPEN      │
│  POSITION                                               │
└─────────────────────────────────────────────────────────┘
                              │
                              ▼  A
┌─────────────────────────────────────────────────────────┐
│  REMOVING PARTS OF AN UNMODIFIED POWER VALVE SHAFT      │
│  WHICH CONTROL THE OPERATION A CENTER VALVE FROM A      │
│  SHAFT INCLUDING A LINK LEVER AND TWO TORSION SPRINGS   │
└─────────────────────────────────────────────────────────┘
                              │
                              ▼  B
┌─────────────────────────────────────────────────────────┐
│  INSTALLING THE CLOSING FORK AND THE TWO TORSION        │
│  SPRINGS TO OVER THE SHAFT AND SECURING THE CLOSING     │
│  FORK TO THE SHAFT BY INSERTING A BOLT THROUGH THE      │
│  CLOSING FORK AND THREADING THE BOLT INTO AN ORIGINAL   │
│  THREADED HOLE OF THE SHAFT ABOUT ADJACENT TO A         │
│  CENTER EXHAUST VALVE                                   │
└─────────────────────────────────────────────────────────┘
                              │
                              ▼  C
┌─────────────────────────────────────────────────────────┐
│  WHEREIN THE INSTALLED CLOSING FORK AND TWO TORSION     │
│  SPRINGS SPRING BIAS A CENTER ADJUSTABLE EXHAUST VALVE  │
│  TO AN OPEN POSITION FOR A HITLESS OPERATION OF THE     │
│  POWER VALVE SYSTEM 2-STROKE MOTORCYCLE ENGINE          │
└─────────────────────────────────────────────────────────┘
                                                       D
```

FIG.23

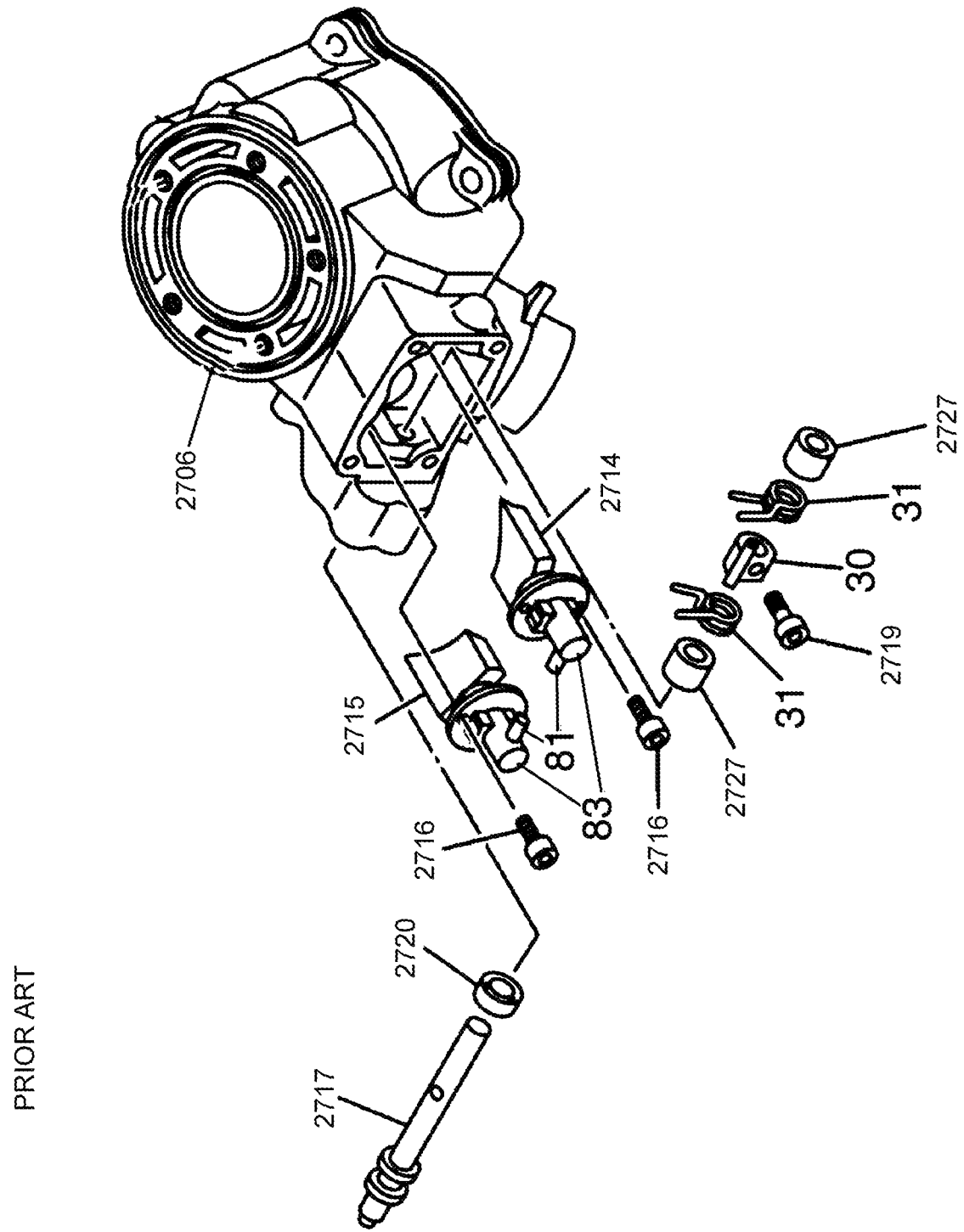

RIGHT VALVE CLOSED
LEFT VALVE OPEN

ALL EXHAUST VALVES OPEN

RIGHT VALVE OPEN
LEFT VALVE CLOSED

BOTH EXHAUST VALVES CLOSED

PRIOR ART
TWO STAGE SYSTEM
OPENING SEQUENCE

SHOWS LOCATION OF FIXED
LINKAGE PIN IN ROTATING
CONTROL PULLEYS
FOR SIDE VALVES.
PULLEYS PUSHED TOGETHER
FOR COMPARISON

ALL VALVES CLOSED
0/2 ROTATION

CENTER VALVE OPEN (FIRST STAGE)
SIDE VALVES CLOSED (SECOND STAGE)
1/2 ROTATION
(BETWEEN STAGES)

ALL VALVES OPEN
2/2 ROTATION

NEW CONTROL PULLEYS
SIDE VALVE STARTING POINT
WITH STAGE OVERLAP

NEW SYSTEM
OVERLAPPING STAGES

ALL VALVES CLOSED
0/8 ROTATION

OVERLAPPING STAGES
CENTER VALVE STILL PARTIALLY OPEN
SIDE VALVES PARTIALLY OPEN
APPROX. 3/8 ROTATION

ALL VALVES OPEN
8/8 ROTATION

PRIOR ART
TWO STAGE SYSTEM
OPENING SEQUENCE

PRIOR ART MIRRORED
CONTROL PULLEYS (32 AND 33)
PULLEYS PUSHED TOGETHER
FOR COMPARISON

CENTER VALVE OPEN
SIDE VALVES CLOSED
4/8 ROTATION

MIRRORED SIDE VALVES
STARTING TO OPEN TOGETHER
APROX. 5/8 ROTATION
NO STAGGER

ALL VALVES OPEN
8/8 ROTATION

PRIOR ART    NEW SYSTEM 3203   3202

NEW SYSTEM
SIDE TO SIDE STAGGER

NEW CONTROL PULLEYS
FOR STAGGERED
MOVEMENT OF VALVES

RIGHT SIDE VALVE
MOVES FIRST
APPROX. 3/8 ROTATION

RIGHT SIDE OPENS FURTHER
LEFT SIDE STARTS OPENING
STAGGERED MOVEMENT
APPROX. 7/16 ROTATION

ALL VALVES OPEN
8/8 ROTATION

PRIOR ART
SINGLE STAGE SYSTEM
OPENING SEQUENCE
VIEWED FROM DOWNSTREAM

SPLIT OR MIRRORED VALVES
IN THE CLOSED POSITION
0/3 ROTATION

SPLIT OR MIRRORED VALVES
STARTING TO OPEN TOGETHER
1/3 ROTATION

SPLIT OR MIRRORED VALVES
CONTINUE MOVING TOGETHER
2/3 ROTATION

ALL VALVES OPEN
3/3 ROTATION

NEW SYSTEM
SIDE TO SIDE STAGGER

SPLIT OR MIRRORED VALVES
IN THE CLOSED POSITION
0/3 ROTATION

RIGHT VALVE MOVES FIRST
1/3 ROTATION

LEFT VALVE MOVES
AFTER RIGHT VALVE FOR
STAGGERED OPERATION
2/3 ROTATION

ALL VALVES OPEN
3/3 ROTATION

TRAVEL LIMITED

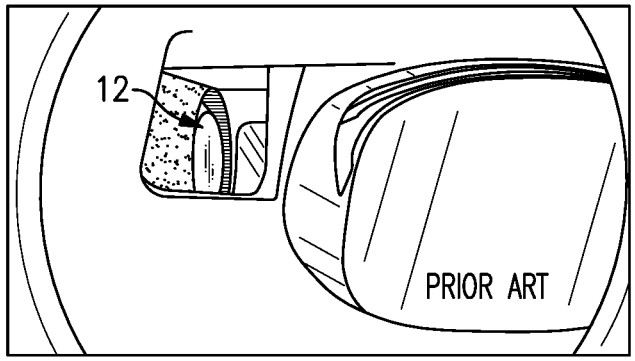

FIG.38A

DARK AREA IS DEEP VOID AROUND BEVELED VALVE CAUSING TURBULENCE VIEWED FROM DOWNSTREAM

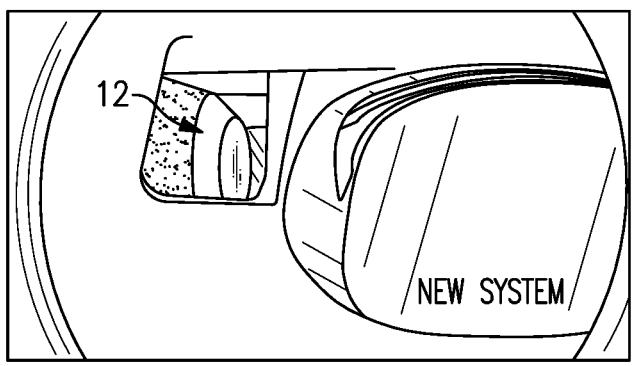

FIG.38B

NEW CONTROL PULLEYS ESTABLISH NEW ENDPOINT STOPPING SIDE VALVE WITH ALL ITS BEVEL SHOWING VIEWED FROM DOWNSTREAM

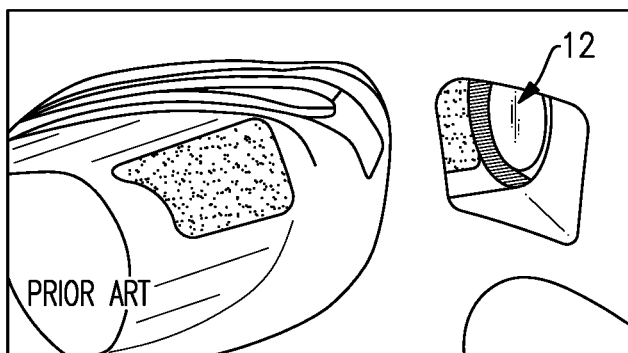

FIG.38C

DARK AREA IS DEEP VOID AROUND BEVELED VALVE CAUSING TURBULENCE

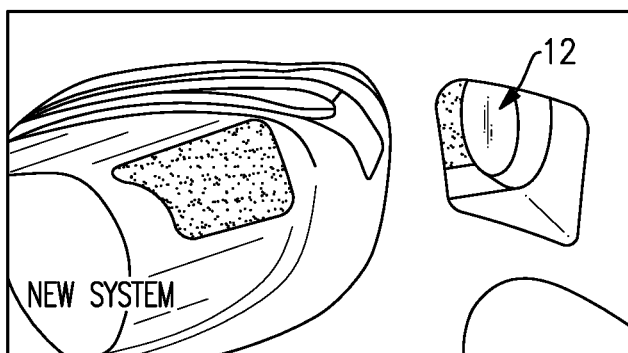

FIG.38D

NEW CONTROL PULLEYS ESTABLISH NEW ENDPOINT STOPPING SIDE VALVE WITH ALL ITS BEVEL SHOWING

NEW SYSTEM
POWER LIMITED

NEW CONTROL PULLEYS
ESTABLISH NEW ENDPOINT
BEFORE PREVIOUSLY INTENDED

NEW CONTROL PULLEYS
ESTABLISH NEW ENDPOINT FOR
SMOOTHER EXHAUST FLOW

NEW CONTROL PULLEYS
ESTABLISH NEW ENDPOINT FOR
LIMITING POWER OUTPUT

NEW CONTROL PULLEYS
ESTABLISH NEW ENDPOINT FOR
LIMITING POWER OUTPUT
SINGLE STAGE SYSTEM
VIEWED FROM DOWNSTREAM

PRIOR ART
SECOND STAGE
OPENING SEQUENCE

NO ROTATION
SECOND STAGE
VALVES SLOSED
(SEE FIG.32B)

HALF ROTATION
SECOND STAGE
VALVES STILL CLOSED
(SEE FIG.32C)

FULL ROTATION
SECOND STAGE
VALVES FULL OPEN
(SEE FIG.32D)

PRIOR ART PULLEYS RAMP STARTS PAST HALFWAY
NEW SYSTEM PULLEYS RAMP STARTS WELL BEFORE HALFWAY
CAUSING OVERLAPPING STAGES

MOTORCYCLE ENGINE WITH AN ALWAYS SPRING BIASED OPEN EXHAUST VALVE

CROSS-REFERENCE TO RELATED APPLICATIONS

This application is a continuation-in-part of and claims priority to and the benefit of U.S. patent application Ser. No. 15/707,286, MOTORCYCLE ENGINE WITH AN ALWAYS SPRING BIASED OPEN EXHAUST VALVE, filed Sep. 18, 2017, U.S. patent application Ser. No. 15/173,029, MOTORCYCLE ENGINE POWER VALVE CONTROL UPGRADE KIT, filed Jun. 3, 2016, now U.S. Pat. No. 9,797,275 B1, Motorcycle engine power valve control upgrade kit, issued Oct. 24, 2017, which applications and patents are incorporated herein by reference in their entirety.

FIELD OF THE APPLICATION

The application relates to motorcycle power valves and particularly to control of power valve position.

BACKGROUND

Off-road motorcycling has become a popular sport enjoyed by racers and riders worldwide. The most popular dirt bikes are relatively light weight motorcycles powered by a high performance 2-stroke engine. Many of the most popular models are manufactured by the Yamaha Motor Corporation of Japan (U.S. Corp. office in Cypress, Calif.). Most notable among the Yamaha off-road models is the model YZ250, which is the bike of choice for at least sixteen different motorcycle, off-road bike, and dirt bike competitions worldwide. The YZ250 motorcycle is powered by a 249 cc liquid-cooled 2-stroke engine. The YZ250 engine has an adjustable exhaust port known as YPVS™ (Yamaha Power Valve System). Another related model, the YZ125 engine has a split adjustable exhaust port. At low RPM the valves are closed allowing more compression and port timing producing more torque. As RPM's increase the valves are opened allowing less compression and port timing for producing high RPM horsepower.

SUMMARY

A method of operation of exhaust valves of an adjustable exhaust port 2-stroke motorcycle engine with a two stage exhaust valve system includes: providing a control rod mechanically coupled to a governor, so that the governor causes a rotation of the control rod, a first stage exhaust valve controllably linked to the control rod, a second stage left exhaust valve and a second stage right exhaust valve controllably linked to the control rod, wherein the rotation controls a position of the first stage exhaust valve, the second stage left exhaust valve and the second stage right exhaust valve; and operating the second stage left exhaust valve and the second stage right exhaust valve by opening at least one of the second stage left exhaust valve and the second stage right exhaust valve before the first stage exhaust valve is completely open in an overlap operation.

The method can further include operating the second stage left exhaust valve and the second stage right exhaust valve to open at different times or to have a different degree of open position with respect to each other, in a staggered operation.

The method can further include operating the second stage left exhaust valve and the second stage right exhaust valve at a maximum rotation of the control rod, limited to less than a full open position of the second stage left exhaust valve and the second stage right exhaust valve in a limiter operation.

A method of operation of exhaust valves of an adjustable exhaust port 2-stroke motorcycle engine with a single stage or a two stage exhaust valve system includes: providing a control rod mechanically coupled to a governor, so that the governor causes a rotation of the control rod, at least one of: an adjustable exhaust port 2-stroke motorcycle single stage engine having a first side and a second side of a split center valve controllably linked to the control rod, and an adjustable exhaust port 2-stroke motorcycle two stage engine having a first stage exhaust valve controllably linked to the control rod, a second stage left exhaust valve and a second stage right exhaust valve controllably linked to the control rod, wherein the rotation controls a position of the first stage exhaust valve, the second stage left exhaust valve and the second stage right exhaust valve; and operating the first side and the second side of the split center valve, or the second stage left exhaust valve and the second stage right exhaust valve to open at different times or to have a different degree of open position with respect to each other, in a staggered operation.

The method can further include operating the second stage left exhaust valve and the second stage right exhaust valve by opening at least one of the second stage left exhaust valve and the second stage right exhaust valve before the first stage exhaust valve is completely open in an overlap operation.

The method can further include operating either of the first side and the second side of the split center valve, or the second stage left exhaust valve and the second stage right exhaust valve at a maximum rotation of the control rod, limited to less than a full open position.

An adjustable exhaust port 2-stroke motorcycle engine with a two stage exhaust valve system includes a control rod mechanically coupled to a governor, so that the governor causes a rotation of the control rod. A first stage exhaust valve is controllably linked to the control rod. A second stage left exhaust valve and a second stage right exhaust valve are controllably linked to the control rod. A left control pulley and a right control pulley have a profiled slot and are mounted to the control rod. The rotation of the left control pulley and the right control pulley controls a position of the second stage left exhaust valve and the second stage right exhaust valve respectively via a pin sliding in the profiled slot. An initial rotation of the control rod causes the first stage exhaust valve to open first, and on further rotation of the control rod, and the profiled slot of the left control pulley and the right control pulley causes the second stage left exhaust valve and the second stage right exhaust valve open before the first stage exhaust valve is completely open in an overlap operation.

The profiled slot of the left control pulley and the right control pulley can cause the second stage left exhaust valve and the second stage right exhaust valve to open at different times with respect to each other, in a staggered operation.

At a maximum rotation of the control rod, the profiled slot of the left control pulley and the right control pulley can limit an open position of the second stage left exhaust valve and the second stage right exhaust valve to less than a full open position of at least one of the second stage left exhaust valve and the second stage right exhaust valve in a limiter operation.

The adjustable exhaust port 2-stroke motorcycle engine can be disposed in a YZ125 series motorcycle.

The adjustable exhaust port 2-stroke motorcycle engine can be disposed in a YZ250 series motorcycle.

The adjustable exhaust port 2-stroke motorcycle engine can include a two stage system.

The adjustable exhaust port 2-stroke motorcycle engine can include a single stage system.

An adjustable exhaust port 2-stroke motorcycle engine with a single stage or a two stage exhaust valve system includes a control rod mechanically coupled to a governor, so that the governor causes a rotation of the control rod. A first side and second side of a split center valve controllably linked to the control rod, or a first stage exhaust valve is controllably linked to the control rod. A second stage left exhaust valve and a second stage right exhaust valve are controllably linked to the control rod. A left control pulley and a right control pulley have a profiled slot and are mounted to the control rod, wherein the rotation of the left control pulley and the right control pulley controls a position of the first side and second side of a split center valve, or the second stage left exhaust valve and the second stage right exhaust valve respectively via a pin sliding in the profiled slot. The profiled slot of the left control pulley and the right control pulley causes the first side and second side of a split center valve, or the second stage left exhaust valve and the second stage right exhaust valve to open at different times with respect to each other, in a staggered operation.

The adjustable exhaust port 2-stroke motorcycle engine can include a two stage exhaust port 2-stroke motorcycle engine and wherein an initial rotation of the control rod causes the first stage exhaust valve to open first, and on a further rotation of the control rod, and the profiled slot of the left control pulley and the right control pulley causes the second stage left exhaust valve and the second stage right exhaust valve open before the first stage exhaust valve is completely open in an overlap operation.

At a maximum rotation of the control rod, the profiled slot of the left control pulley and the right control pulley can limit an open position of the first side and second side of a split center valve, or the second stage left exhaust valve and the second stage right exhaust valve to less than a full open position of at least one of the first side and second side of a split center valve, or the second stage left exhaust valve and the second stage right exhaust valve in a limiter operation.

The adjustable exhaust port 2-stroke motorcycle engine can be disposed in a YZ125 series motorcycle.

The adjustable exhaust port 2-stroke motorcycle engine can be disposed in a YZ250 series motorcycle.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 10 shows a drawing of the earlier valve assembly, and the later version with holder;

FIG. 17 shows two different views of one exemplary embodiment of a new hitless closing fork;

FIG. 21A is a drawing showing the closing sequence of the power valves from all power valves open according to the new hitless system;

FIG. 21B is a drawing showing the center power valve open and the side power valves closed;

FIG. 21C is a drawing showing all power valves closed;

FIG. 23 shows a flow diagram for a hitless PVS upgrade;

FIG. 27 is a drawing showing an exploded diagram of an exemplary YZ125 motorcycle engine;

FIG. 38A is a drawing showing a side valve of the prior art creating turbulence by traveling too far in its pocket, viewed from downstream;

FIG. 38B is a drawing showing new system stopping side valve with all its bevel showing;

FIG. 38C is a drawing showing a side valve of the prior art creating turbulence by traveling too far in its pocket, viewed from upstream;

FIG. 38D is a drawing showing new system stopping side valve with all its bevel showing;

DETAILED DESCRIPTION

Definitions

Figure 1:
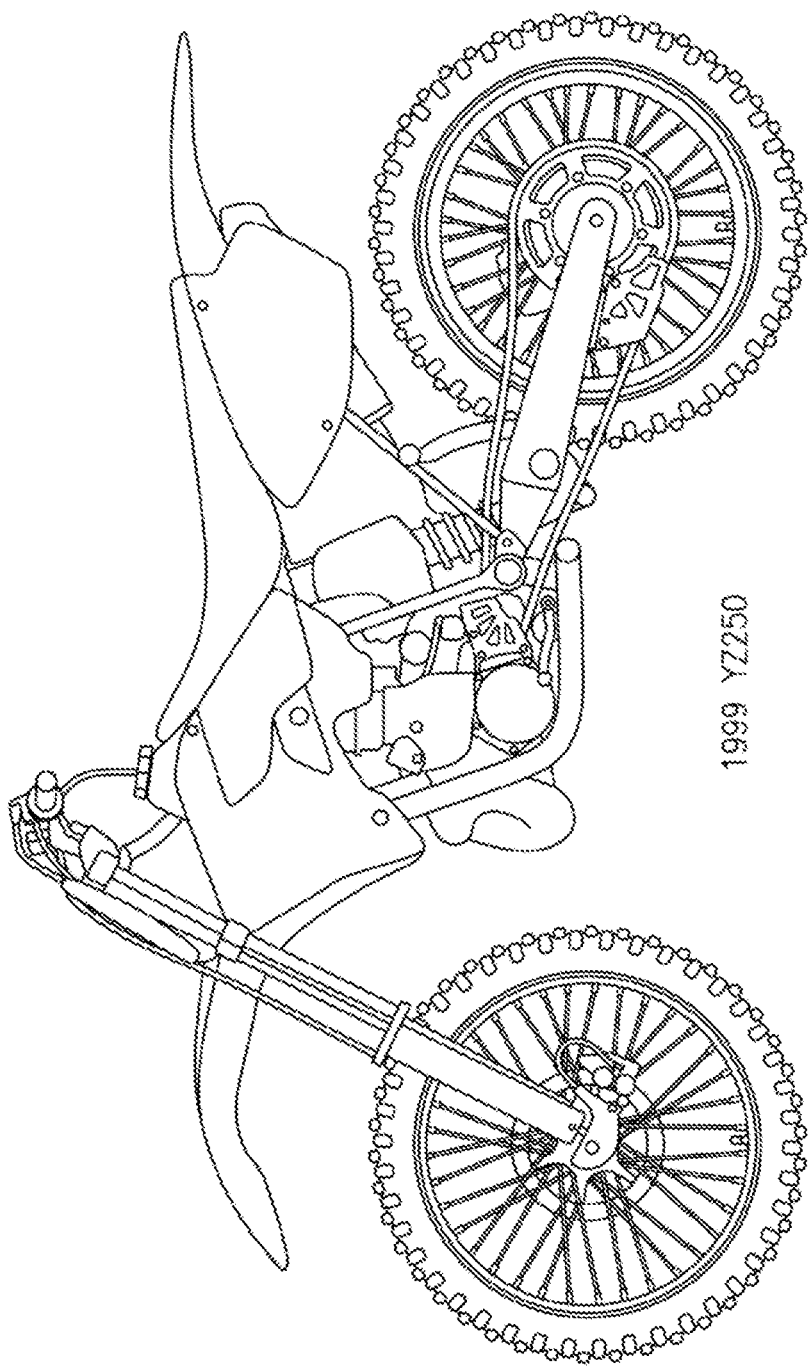
FIG. 1 shows an illustration of the left side of a Yamaha Motor Corp. 1999 YZ250 motorcycle.

SINGLE STAGE ADJUSTABLE EXHAUST PORT 2-STROKE MOTORCYCLE ENGINE—A single stage adjustable exhaust port 2-stroke motorcycle engine has a single adjustable exhaust port. The single adjustable exhaust port can be controlled by a single center valve, which can be referred to as a master valve, center valve, guillotine valve, etc. Even though there is only one main adjustable exhaust port, the valve can also be a split valve, where the two halves of the split valve are separated by a narrow cylinder wall or bridge for a exhaust port that would otherwise be too large. Typically, the split valve is positioned to a same common position, or as described hereinbelow, the split haves can now be operated at different positions ("stagger") at the same time according to the new system and method of the Application.

TWO STAGE ADJUSTABLE EXHAUST PORT 2-STROKE MOTORCYCLE ENGINE—A two stage adjustable exhaust port 2-stroke motorcycle engine has a main adjustable exhaust port and secondary adjustable exhaust ports. Typically, the secondary exhaust valves are only opened after the main adjustable exhaust valve is full open. However, as described in more detail hereinbelow, the secondary valves can be opened before the main valve is full open ("overlap") according to the new system and method of the Application. Typically, the secondary adjustable exhaust ports include two mirrored side valves which operate together. However, as described hereinbelow in more detail, according to the new system and method of the Application, the secondary valves can also be set to different positions ("stagger").

HIT—Following a first half of throttle input, there is a relatively large surge of power defined by the Application as a "HIT". In the current state of the art, these single stage and two stage systems make notchy and abrupt changes in power that is hard to control. The motorcycle driver experiences a smooth acceleration for the first half of throttle input followed by a large surge of power or a "HIT".

When the governor tension is increased in an effort to smooth the power delivery, the stages can be felt with a pause or hesitation before each of the stages followed by an abrupt surge or "Hit" of power. When the governor tension is decreased in an effort to eliminate the feeling of stages, the valves open too quickly, like a light switch, and power becomes too abrupt with a big "HIT" because all of the remaining power comes on at once.

The motorcycle operator experiences random hesitation and surging through changing throttle positions. No amount of tuning, and no presently available products solve the erratic output problem defined herein, and now known to those skilled in the art of 2-stroke motorcycle engines, as "HIT".

HITLESS—The smooth, seamless power output that is easy to control according the various solutions of the Application, is referred to by the Application as "HITLESS" operation.

DEGREE OF OPEN—Typically the valves of the prior art open until they no longer obstruct the exhaust port. Any of the valves discussed hereinbelow can now have a degree of open from full closed to full open. In some cases, the linkage controlling the valve can be limited so that valve never opens to the otherwise possible full open valve position ("limiter").

VALVE LINKAGE—The adjustable valves described hereinbelow are connected or linked to the control rod by way of a valve linkage. Common types of connections or linkages would include the link lever and spring, fork, arm, pulley, lever, linkage, spring, pin, gear segments (e.g. full or partial gears with teeth that rotate with the control rod), etc.

An adjustable exhaust port 2-stroke motorcycle engine has uniquely designed and shaped control paths in control pulleys mounted or bolted to a control rod or valve shaft that operate exhaust valves with overlapping stages, side to side stagger, and new endpoint limits. Any combinations of these new features can be designed into control pulleys to tailor the engine performance to an individual owner's needs. When the new exhaust valve process is in operation, the engine produces smooth hitless power output. An upgrade kit and method to convert a power valve system for 2-stroke motorcycle engines to hitless operation is also described.

An adjustable exhaust port 2-stroke motorcycle engine with undesirable power characteristics such as a surge or "Hit" can be fitted with a "Hitless kit" of replacement parts that can include control pulleys, springs, one or more control forks or control arms, and related linking members to link a control rod to exhaust valves. Upon disassembly, some of the prior art parts are removed from the control rod and replaced with parts from the "Hitless kit". The motorcycle operator can choose to install a kit with any one, two, all three, or any combination of the three aspects included in the kit. The three aspects of the kit are overlap, stagger, and limiter. On reassembly, including the newly installed components of the "Hitless kit", the adjustable exhaust port two stroke motorcycle engine is ready for Hitless operation.

Hitless operation means smooth, seamless power output from idle to wide open throttle. The inherent hesitation followed by a large power surge or "HIT" no longer is present. Hitless operation is more productive and provides safer operation.

Hitless kit means selecting a kit that best fits a rider's ability, size, riding terrain, and typically includes springs, washers, control pulleys, closing fork or closing arm, fasteners, and a couple tools.

The exhaust valves can include power valves. The control rod typically includes a valve shaft.

An upgrade kit according to the Application can be used to modify an adjustable exhaust port two stroke motorcycle engine of a YZ250 series motorcycle for hitless operation. An upgrade kit according to the Application can be used to modify an adjustable exhaust port two stroke motorcycle engine of a YZ125 series motorcycle for hitless operation.

An adjustable exhaust port 2-stroke motorcycle engine converted or modified by a Hitless kit installation according to the Application, results in overlapping movement of exhaust valves from different stages. Secondary or side exhaust valve timing is changed resulting in an overlapping sequence of stages and therefore overlapping valve movement. The newly converted 2-stroke motorcycle engine now exhibits smooth and predictable "Hitless" power characteristics.

According to another aspect, the converted adjustable exhaust port two stroke motorcycle engine with the "Hitless kit" installed results in staggered movement of exhaust valves from side to side. Exhaust valves configured as a pair such as split, mirrored, or side exhaust valves, now have different timing resulting in staggered movement of the exhaust valve pair. The newly converted 2-stroke motorcycle engine now exhibits even smoother and more predictable "Hitless" power characteristics.

An adjustable exhaust port to stroke motorcycle engine converted or modified by the Hitless kit installation results in limited movement of exhaust valves. The endpoints of the exhaust valves are changed to a point before their previously intended endpoint, therefore limiting valve movement. The newly converted 2-stroke motorcycle engine now exhibits smooth and predictable "Hitless" power characteristics.

Figure 2:
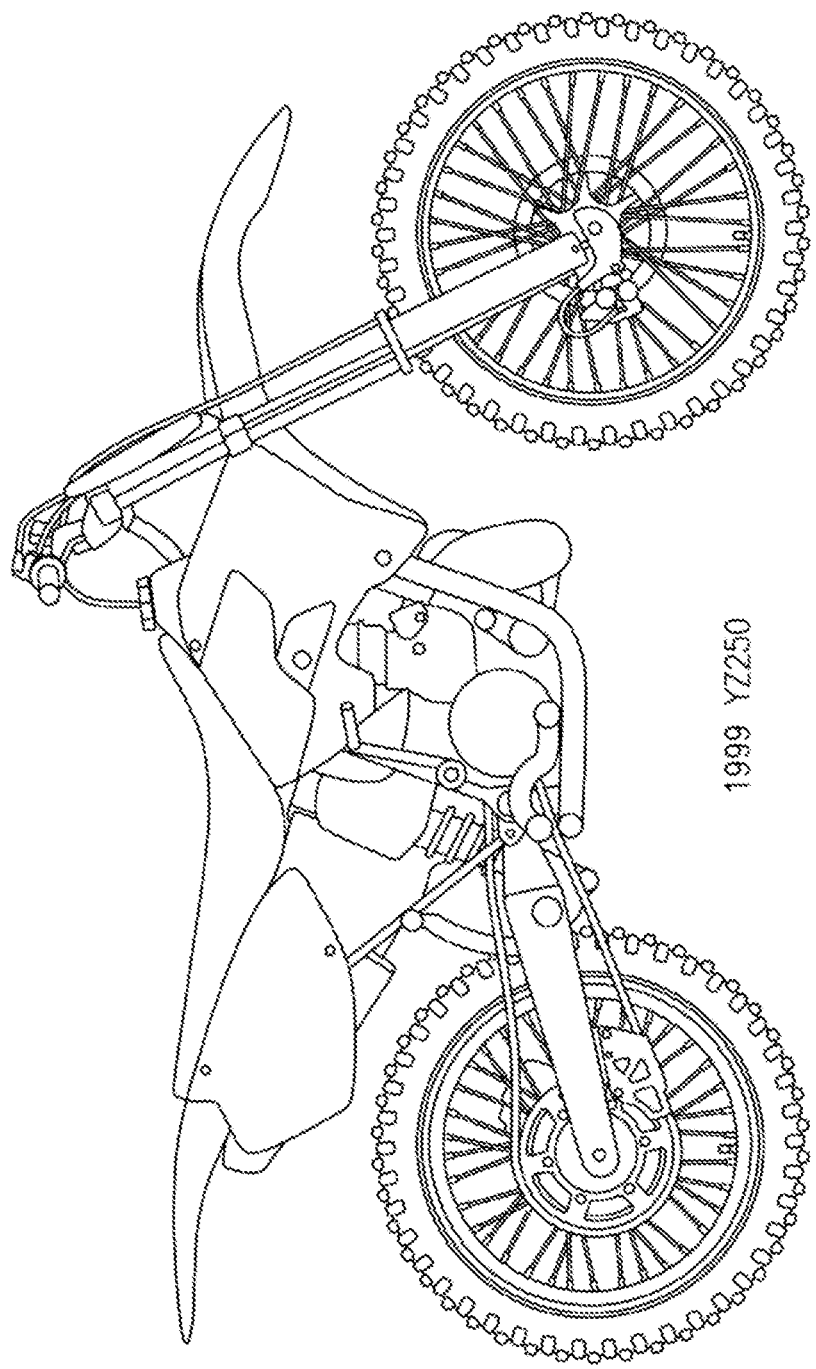
FIG. 2 shows an illustration of the right side of the motorcycle of FIG. 1.

FIG. 1 shows an illustration of the left side of a Yamaha Motor Corp. 1999 YZ250 motorcycle. FIG. 2 shows an illustration of the right side of the motorcycle of FIG. 1. As described hereinabove, the current generation YZ250 engine has an adjustable exhaust port power valve system (PVS) commonly referred to as the YPVS™ (Yamaha Power Valve System).

Figure 3:
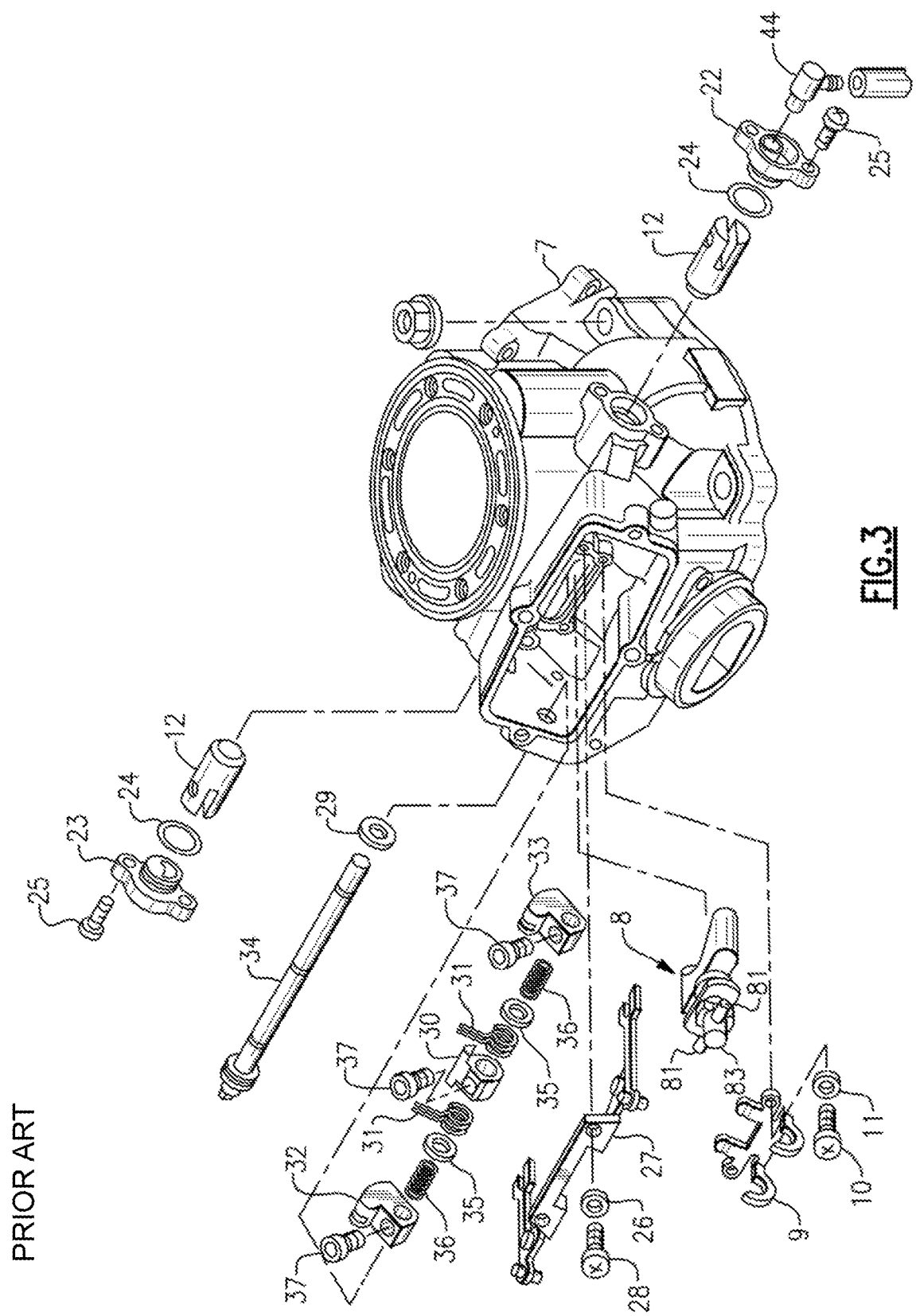
FIG. 3 shows an exploded diagram of an exemplary YZ250 motorcycle engine.

FIG. 3 shows an exploded diagram of an exemplary YZ250 motorcycle engine. The YPVS™ parts fit into the valve housing of cylinder 7. The YPVS™ parts operate valves 12 and valve assembly 8, a center adjustable exhaust valve, which controls the opening of the exhaust path. Valve assembly 8 includes transverse posts 81 which extend outward from a center valve stem 83. The posts 81 are typically provided by a common rod which extends through a transverse cylindrical opening in center valve stem 83. Shaft 34 supports from left to right, pulley 32, compression spring 36, plate washer 35, torsion spring 31, link lever 30, torsion spring 31, plate washer 35, compression spring 36, and pulley 33. Other related parts include holder 9 and link assembly 27. The pair of torsion springs 31 spring bias side valves 12 to a valve closed position. At low RPM the three power valves (valve assembly 8, and the two side valves 12) are closed allowing more compression and a port timing which produces more torque. As RPM's increase, the valves are opened allowing less compression and port timing producing higher RPM horsepower.

The YPVS™ is controlled by a governor that is gear driven directly off the crankshaft. Centrifugal weights in the governor overcome spring pressure and move a linkage.

Figure 4:
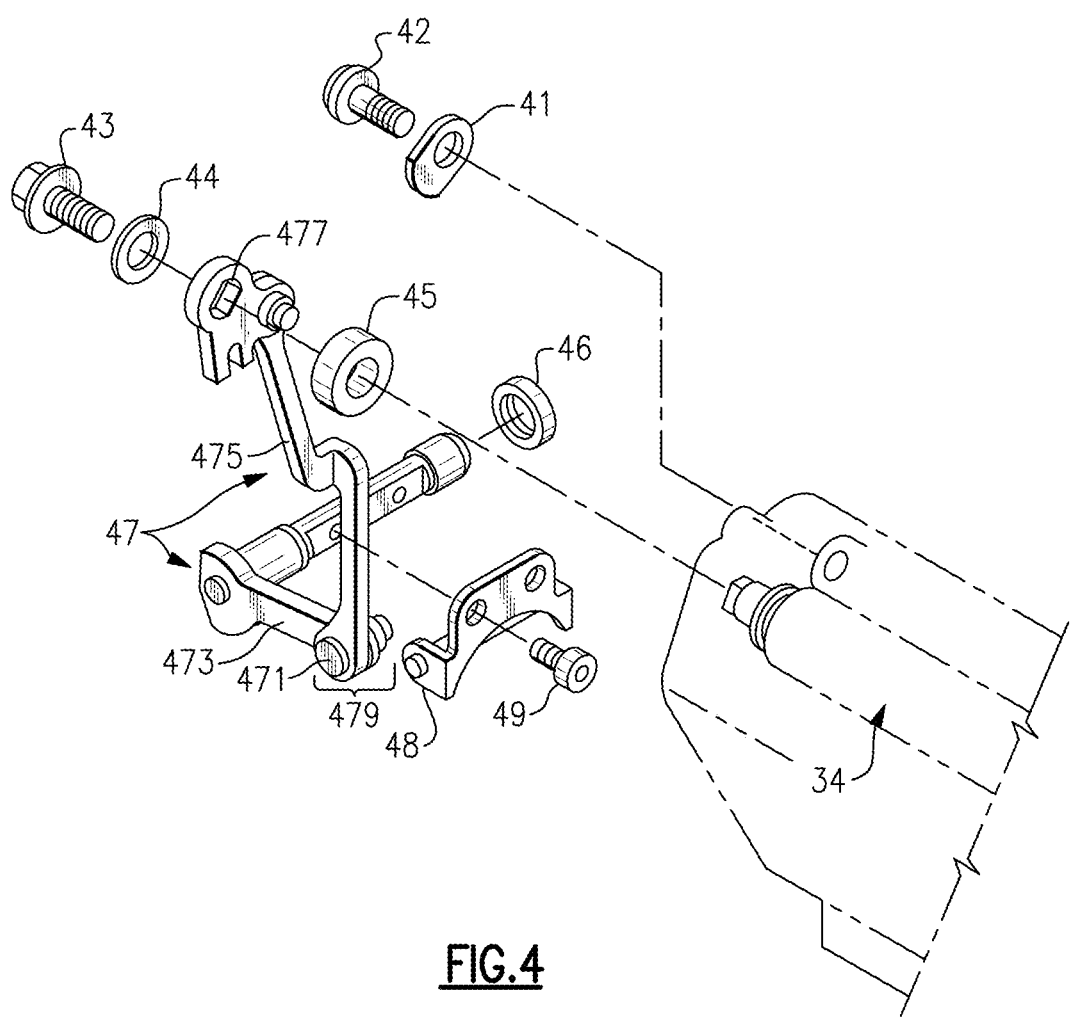
FIG. 4 shows an exploded diagram illustrating the linkage push rod assembly.

FIG. 4 shows an exploded diagram illustrating the linkage push rod assembly 47. The push rod assembly 47 couples to shaft 34 (FIG. 3) via oil seal 45, a keyed opening 477 in the top linkage arm 475 of the linkage push rod assembly 47, and is affixed to shaft 34 by flange bolt 43 and plate washer 44. The push rod assembly 47 lower linkage arm 473 is linked to the top linkage arm 475 via a pinned pivot point 479. Lower linkage arm 473 couples to the governor (not shown in FIG. 4) via governor fork 48 and rotates about oil seal 46.

Figure 5:
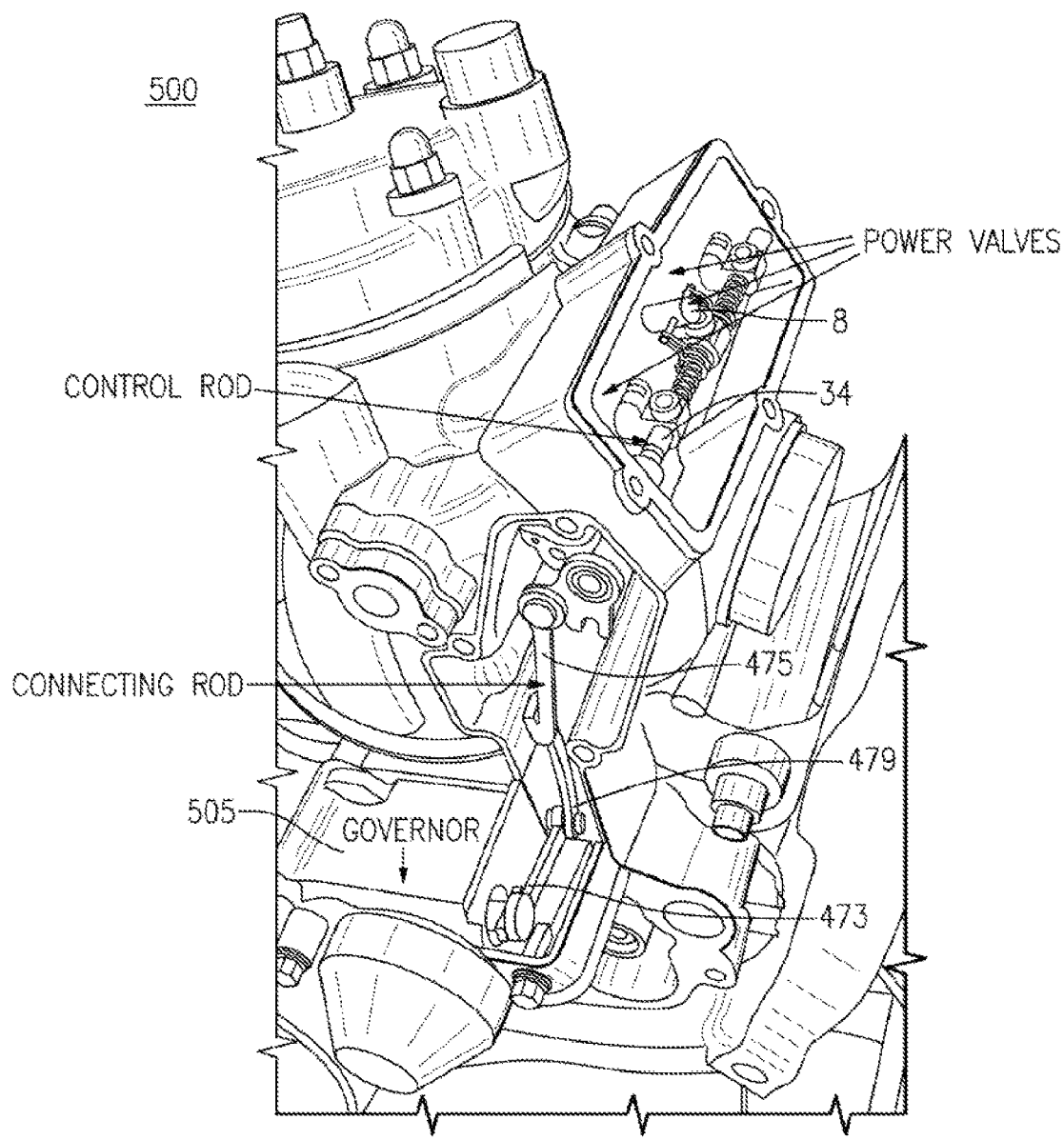
FIG. 5 is a drawing which illustrates an exemplary YZ250 engine.

FIG. 5 is a drawing which illustrates an exemplary YZ250 engine 500. The control rod shaft 34 controls the positions of power valves 12, and valve assembly 8. The push rod assembly 47 can be seen linking the governor 505 to shaft 34 as described hereinabove. The linkage moves through many points and pivots from the governor about pinned pivot point 479 up the right side of the engine to the power valve control rod. When the linkage moves, it rotates the control rod (shaft 34) that operates a two-stage power valve system which includes valve assembly 8, and the two side valves 12.

The first stage of the YPVS™ includes a main center valve (valve assembly 8) that operates in the first half of the linkage travel/control rod rotation. The second stage consists of two side valves (power valves 12, one on each side) that are controlled together as a pair in the second half of the control rod (shaft 34) rotation in response to the linkage travel. Because there are two stages to the YPVS™, each stage operating in a different half of the control rod rotation, Yamaha had to make a flexible connection for the main center valve. This was done by sandwiching the main center valve between the legs of a very stiff tension spring. There is one spring (torsional spring 31) on each side of the main center valve assembly 8. These torsion springs 31 are fixed to the control rod (shaft 34) by means of the link lever 30.

Figure 6:
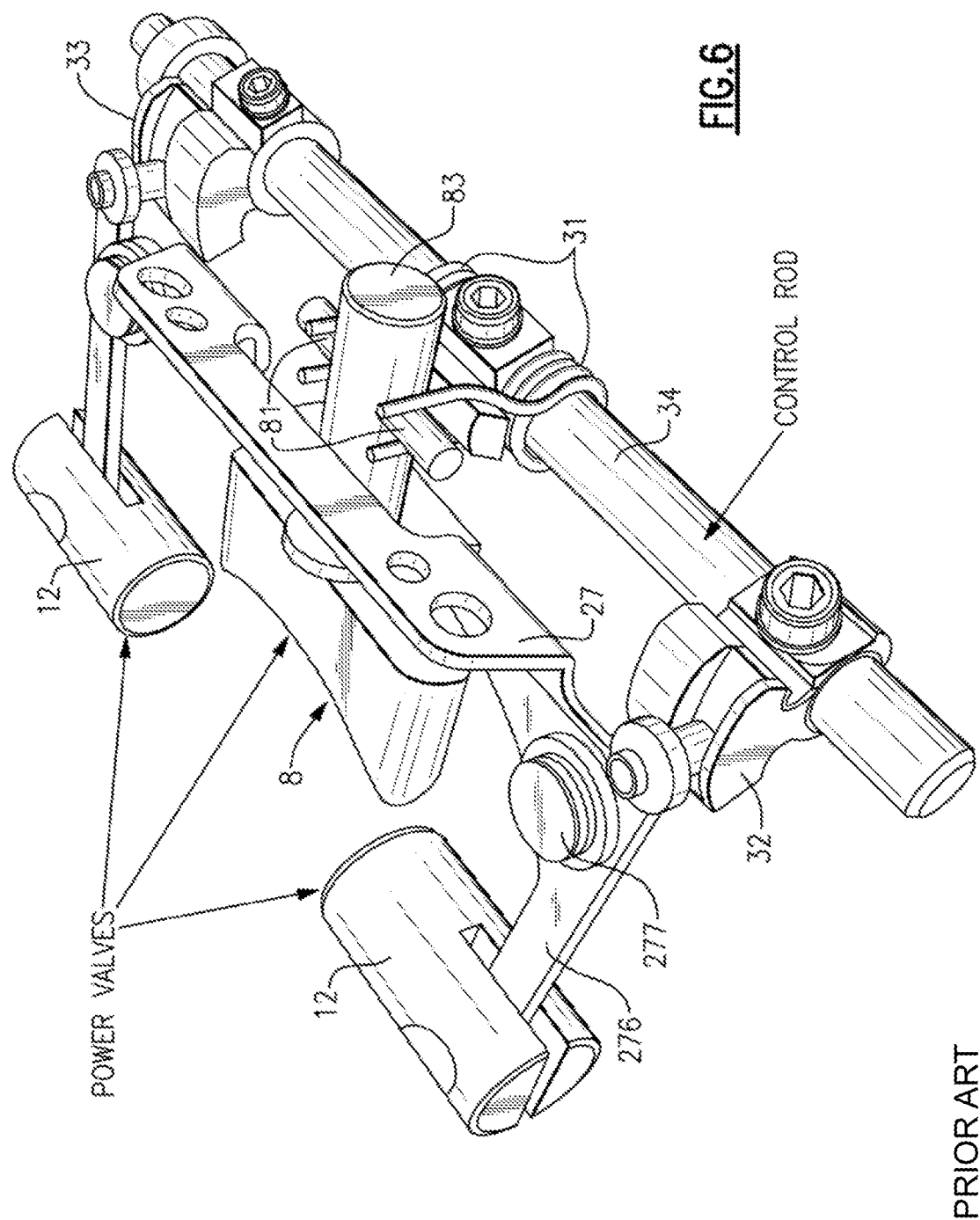
FIG. 6 is a drawing showing the center power valve and the side power valves coupled to the control rod.

FIG. 6 is a drawing showing the center power valve and the side power valves coupled to the control rod with reference designators labeled according to FIG. 3. Pulley 32 (left side) and pulley 33 (right side) can be seen to operate power side valves 12 on each side via the arms 276 and pivot points 277 of linkage 27 (FIG. 6).

Figure 7:
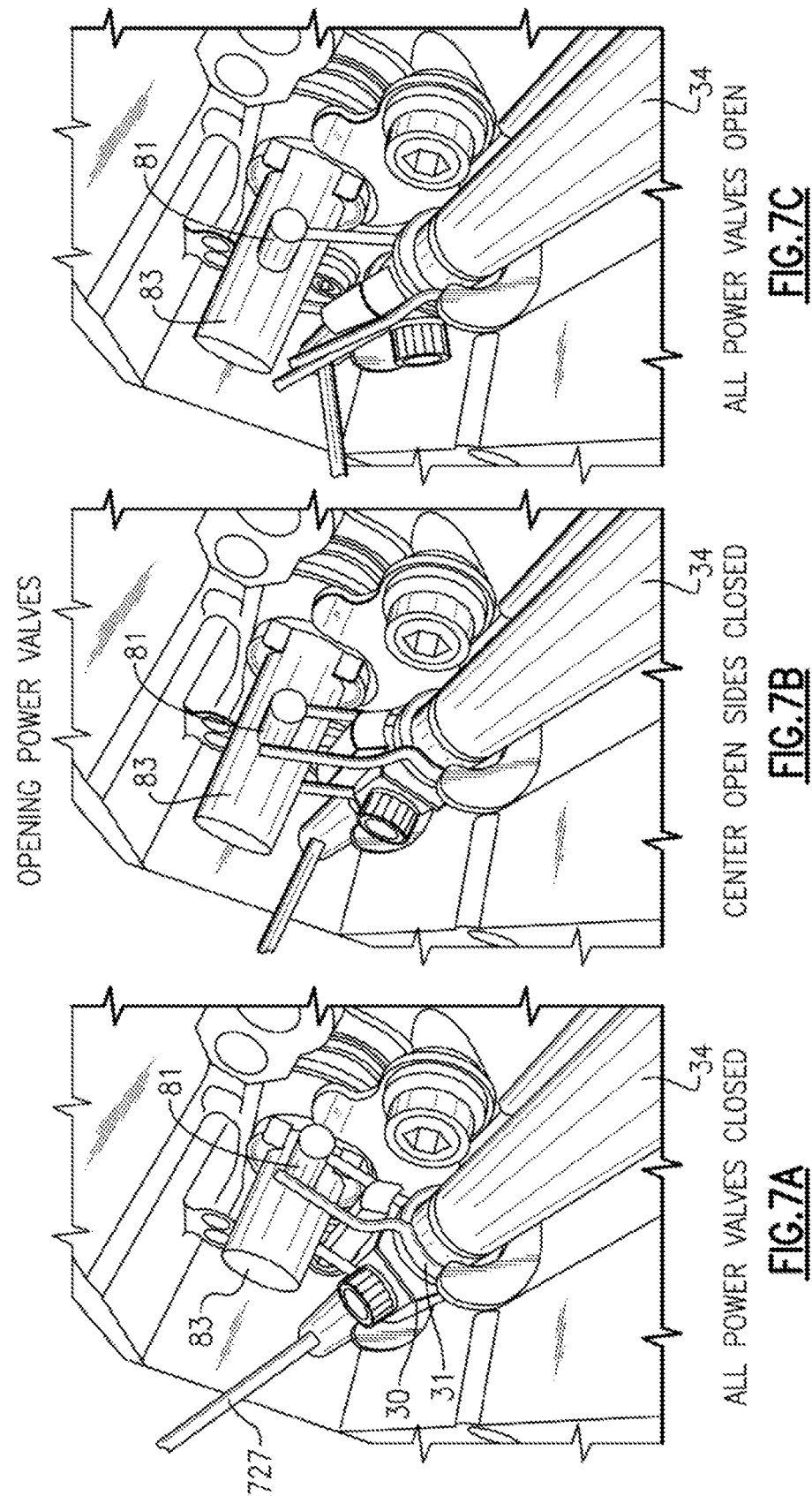
FIG. 7A is a drawing showing the opening sequence of the power valves from all power valves closed.
FIG. 7B is a drawing showing the center power valve open and the side power valves closed.
FIG. 7C is a drawing showing all power valves open.

Opening the valves: FIG. 7A, FIG. 7B, and FIG. 7C show shaft 34 rotating from all valves closed to all valves open. An Allen key 727, not part of the YPVS™, was inserted into a hole in shaft 34 to rotate the shaft through the three positions of FIG. 7A, FIG. 7B, and FIG. 7C. FIG. 7A shows all valves closed. In FIG. 7B, one leg of the stiff torsion springs (torsion springs 31) pulls the main center valve open by acting against transverse post 81 until valve assembly 8 hits its stop (halfway through the control rod rotation). Transverse posts 81 are typically present as a single rod which extends through valve stem 83 and extend outwards from center valve stem 83. As can be seen in FIG. 7C, after the main center valve (valve assembly 8) hits its stop (outward most travel), the stiff torsion springs (torsion springs 31) open up to allow the control rod to continue rotating operating the second stage (side valves 12) in the second half of control rod rotation (shaft 34).

Figure 8:
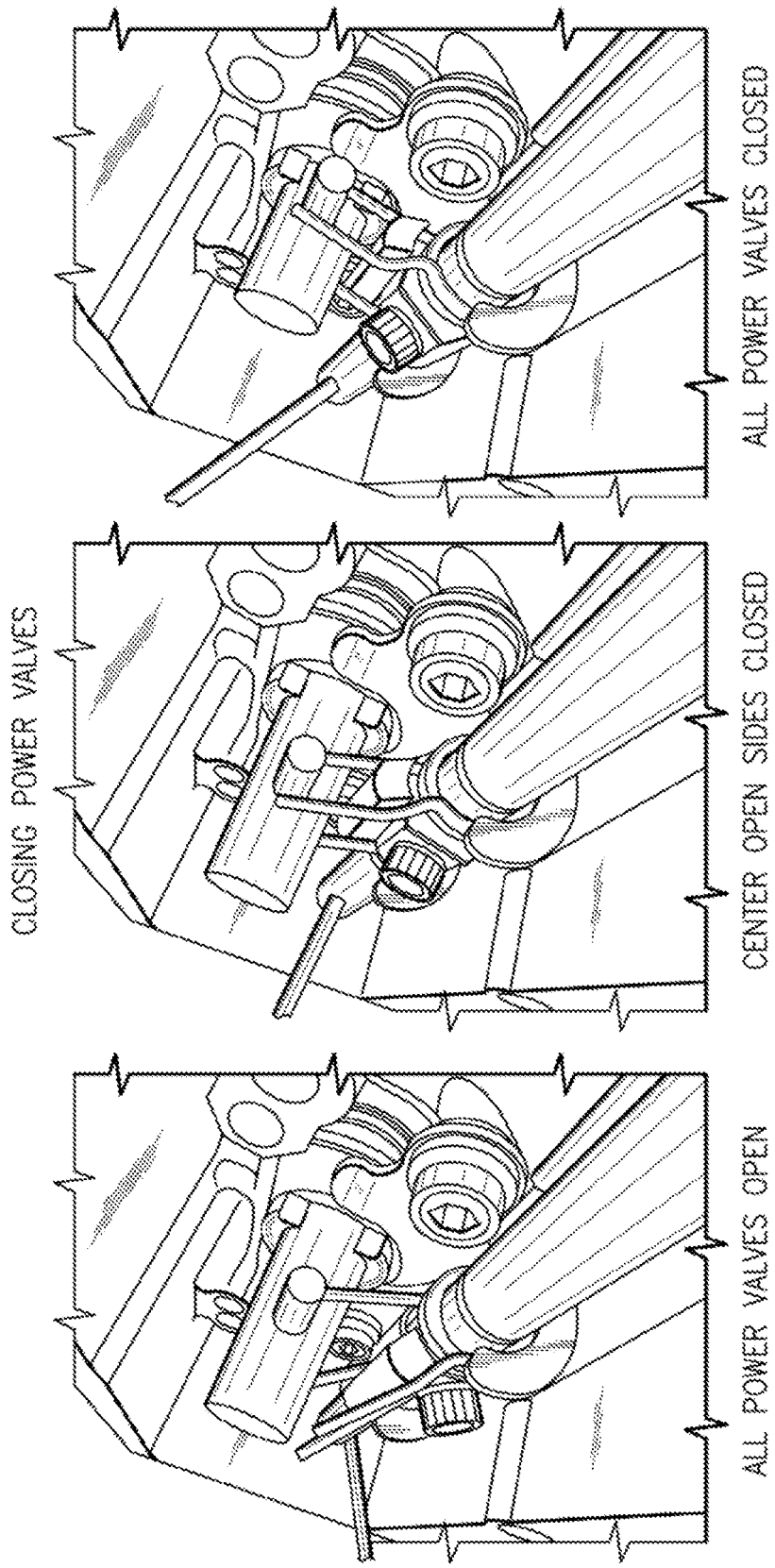
FIG. 8A is a drawing showing the closing sequence of the power valves from all power valves open.
FIG. 8B is a drawing showing the center power valve open and the side power valves closed.
FIG. 8C is a drawing showing all power valves closed.

Closing the valves: FIG. 8A, FIG. 8B, and FIG. 8C show shaft 34 rotating from all valves open to all valves closed. FIG. 8A shows all valves opened. In FIG. 8B, the stiff torsion springs (torsion springs 31) are relieved as the governor pulls the second stage (side valves 12) closed (at half rotation of shaft 34). As can be seen in FIG. 8C, then the other legs of the stiff torsion springs (torsion springs 31) push the main center valve assembly 8 closed.

Figure 9:
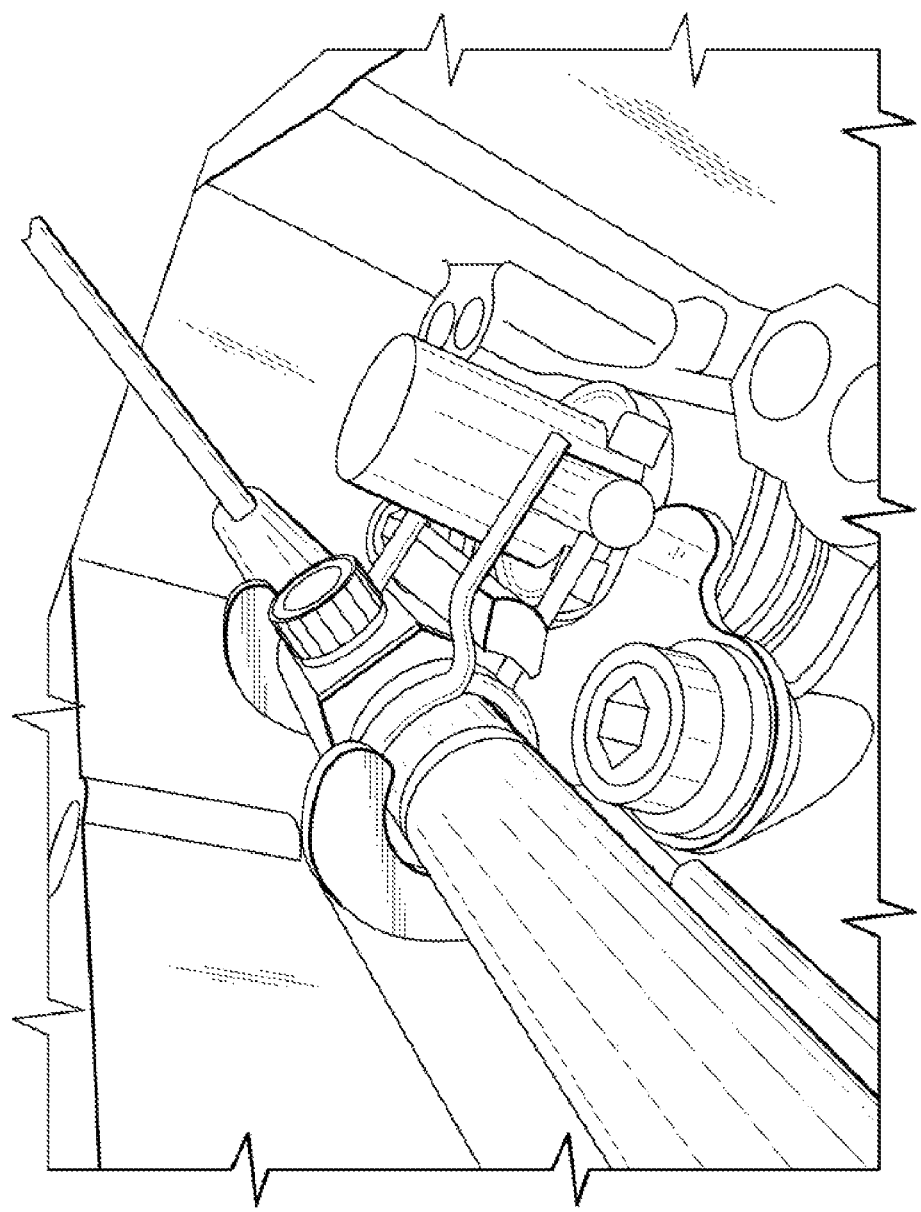
FIG. 9 shows the YPVS™ in its original default closed position.

FIG. 9 shows the YPVS™ in its original default closed position. When the linkage is disconnected from the control rod, the default position is all valves closed.

Yamaha changed the YPVS™ in 2003. Some reports were that when the main center valve was closed, exhaust pressure would push the valve open against the stiff tension springs and cause it to flutter. The flutter was thought to cause a poor low RPM performance, and in some extreme cases caused the main center valve to break.

FIG. 10 shows a drawing of the earlier valve assembly 8, and the later version with holder 1001. Yamaha changed the tip of the main center valve to accommodate a holder 1001 that would engage the top of the valve (valve assembly 8) only after full closed position. This change was to prevent the main center valve from fluttering in the closed position.

Figures 11A, 11B, 11C:
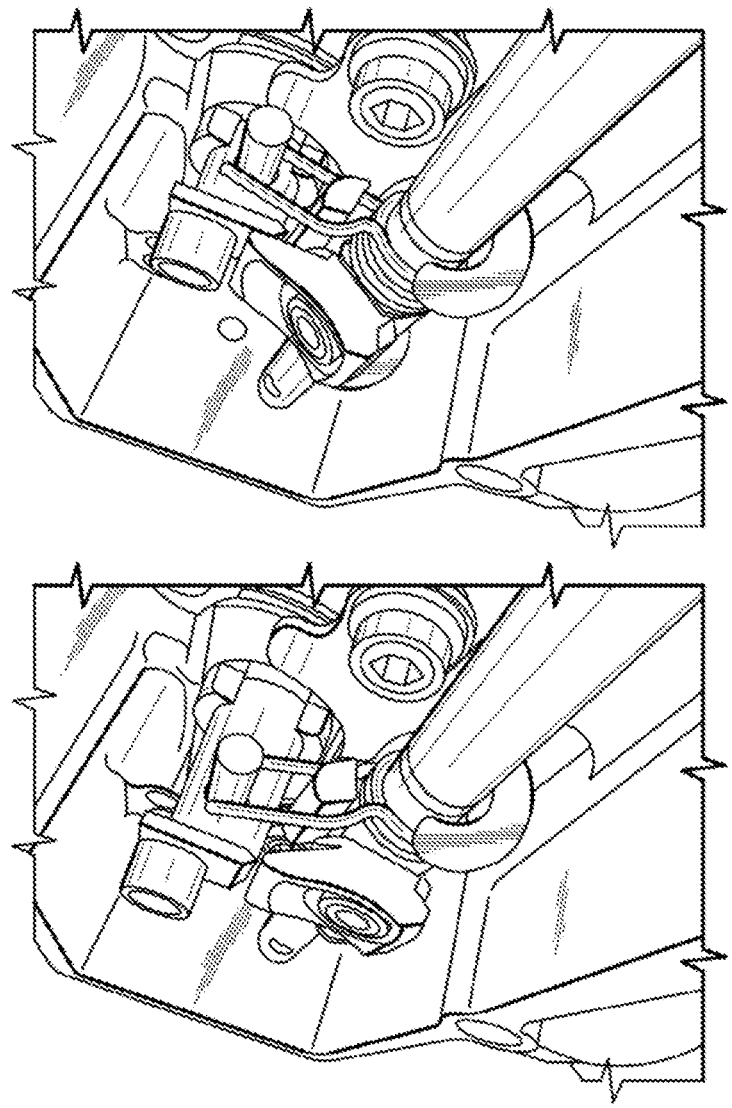
FIG. 11A is a drawing showing the closing sequence of the later style power valves from all power valves open.
FIG. 11B is a drawing showing the center power valve open and the side power valves closed.
FIG. 11C is a drawing showing all power valves closed.

FIG. 11A, FIG. 11B, and FIG. 11C show valve assembly 8 of the later version YPVS™ with holder 1001 rotating from all valves open to all valves closed. FIG. 11A shows all valves open. In FIG. 11B, the stiff torsion springs (torsion springs 31) are relieved as the governor pulls the second stage (side valves 12) closed (at half rotation of shaft 34). As can be seen in FIG. 11C, then the other legs of the stiff torsion springs (torsion springs 31) push the main center valve assembly 8 closed. Holder 1001 can be seen over the top of valve assembly 8 where it prevents valve assembly 8 from opening.

Figure 12:
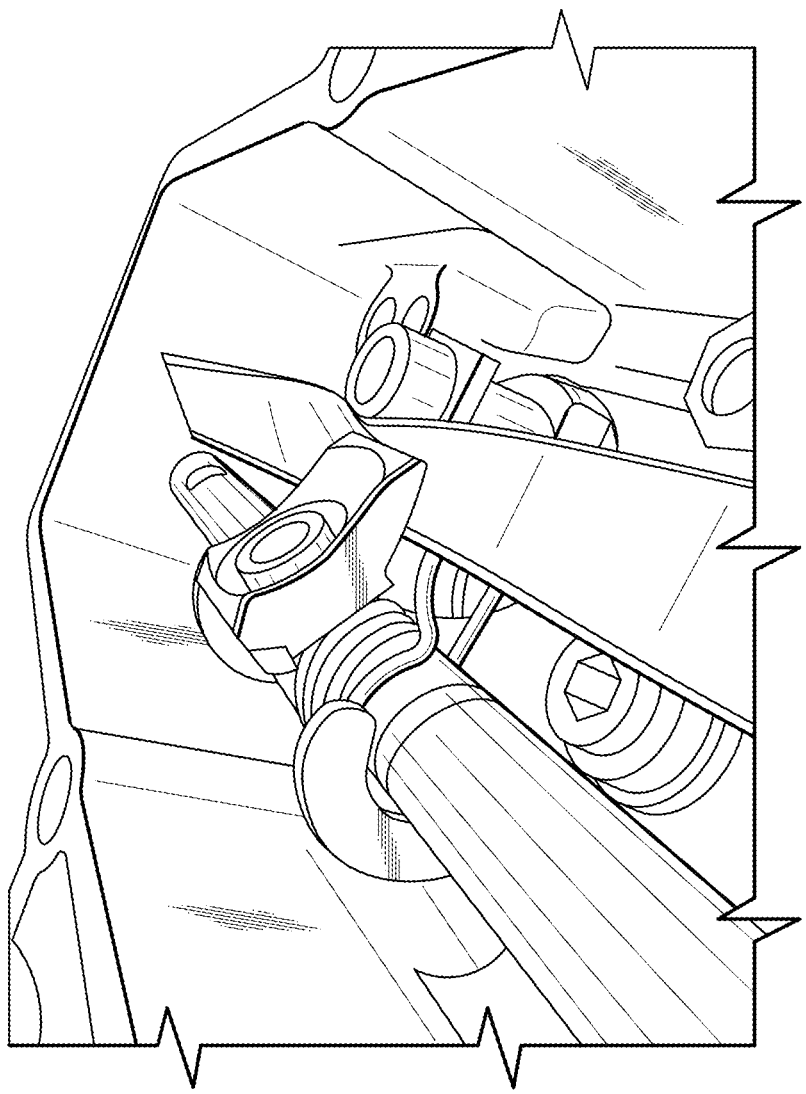
FIG. 12 is a drawing showing the non-contact arrangement of holder over the top of valve assembly.

FIG. 12 shows a non-contact arrangement of holder 1001 over the top of valve assembly 8.

The FIG. 10 solution was also problematic, because if the holder came in contact with the main center valve before full closed position it would break the new tip off from the main center valve.

Figure 13:
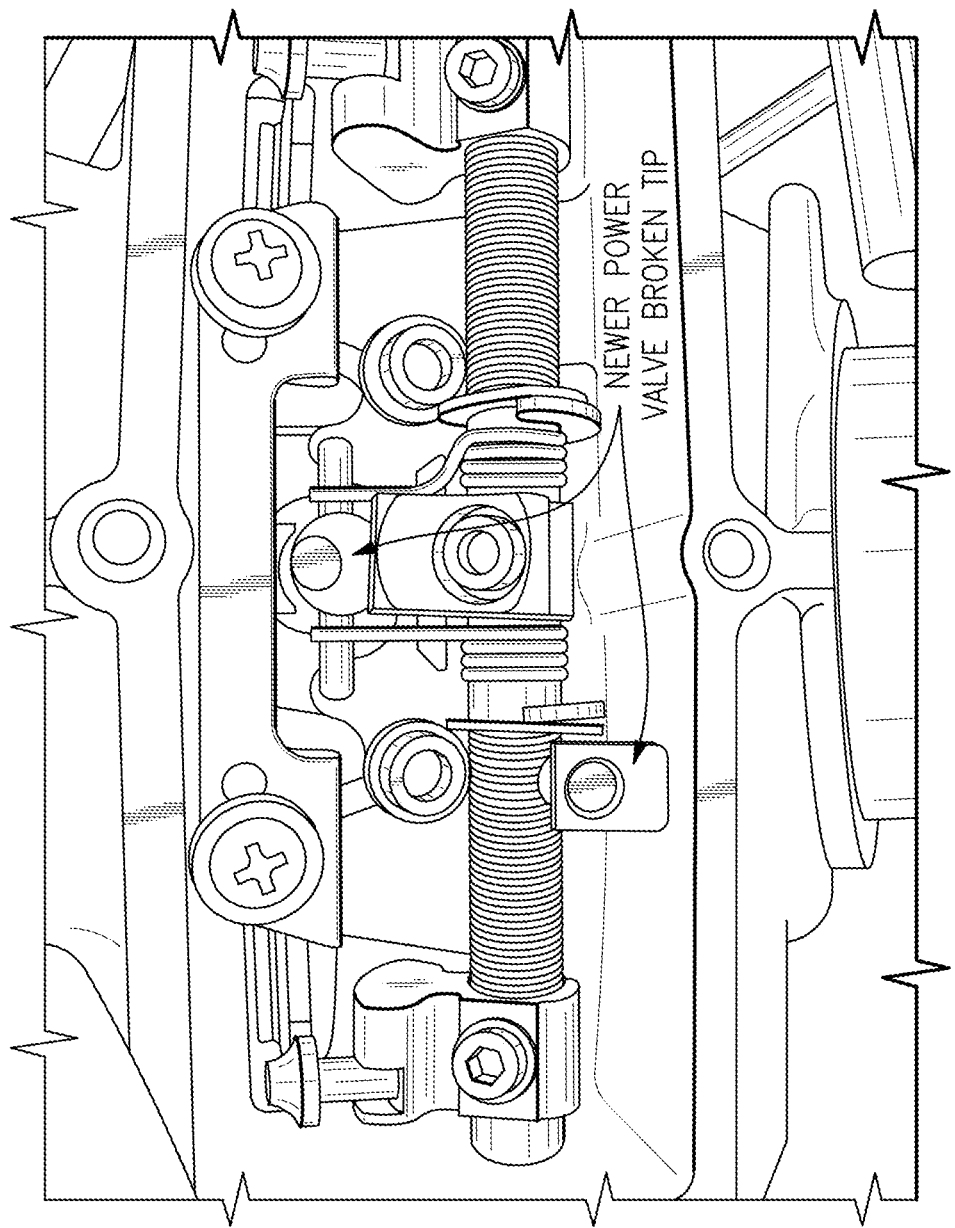
FIG. 13 is a drawing that shows a newer version of the power valve where the tip is broken off.

FIG. 13 shows a drawing illustrating a newer version of the power valve (valve assembly 8) where the tip is broken off. After replacing the valve multiple times most people would leave it broken because it would then operate the same as the prior years and the difference was said to be insignificant for most riders.

The "HIT" problem: A common problem on later model (1999+) motorcycles is that the linear governor of the YPVS™ system works smoothly through the first half of its travel then it suddenly encounters a significant outside force/resistance for the second half of its travel. The motorcycle driver experiences a smooth acceleration for the first half of the RPM range then a noticeable hesitation where a resistance-force is encountered. When that resistance-force is overcome, the second stage of the YPVS™ opens releasing a large surge of power or a "HIT". Thus the motorcycle driver experiences smooth operation—then hesitation—followed by a surge. No amount of tuning, and no presently available products solve the problem. There is need for a solution to the HIT problem.

Identification of the cause of the HIT problem: It was realized that the HIT problem is caused by the operation of the three valves combined with force multiplication by the governor linkage.

Figure 14:
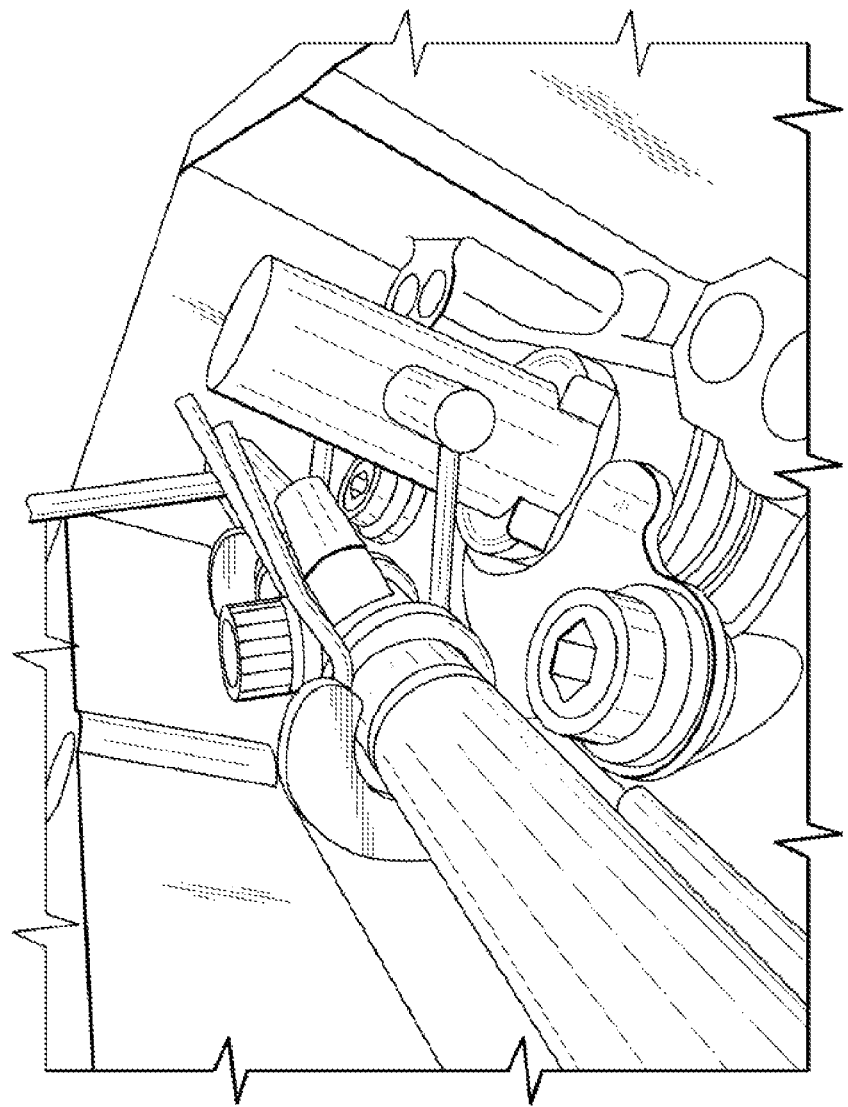
FIG. 14 is a drawing that shows spring/tension resistance on the governor.

FIG. 14 is a drawing that shows spring/tension resistance on the governor 505. When the main center valve assembly 8 is fully open (halfway through control rod (shaft 34) travel) the force of the two stiff torsion spring (torsion springs 31) opening, along with the friction of the second stage side valves opening, all create a resistance/force on the control rod (shaft 34) that suddenly starts halfway through its rotation. This combine force is multiplied through a mechanical advantage/leverage created by the linkage 47 to the governor 505.

Figure 15:
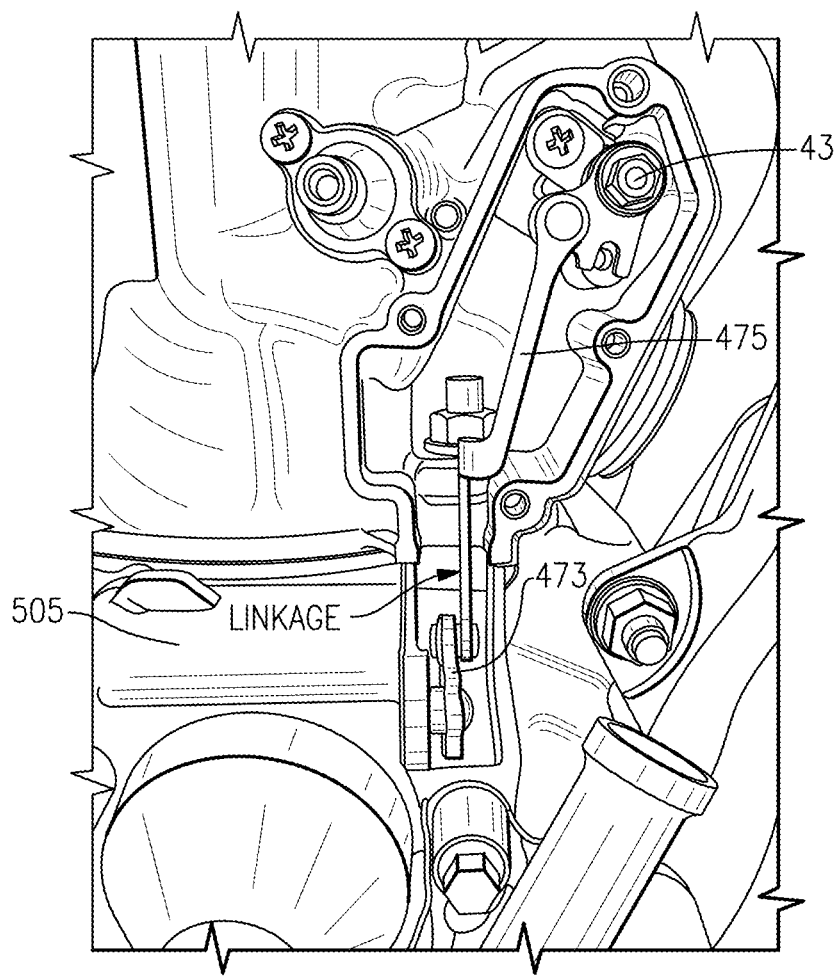
FIG. 15 is a drawing showing another view of the linkage between the governor and the control rod.

FIG. 15 is a drawing showing another view of the linkage 47 between governor 505 and control rod shaft 34 as affixed to the control rod shaft by flange bolt 43.

Solution to the HIT problem: A new "hitless" system as described in more detail hereinbelow substantially eliminates the outside force acting on the governor. The hitless solution creates a new connection between the main center power valve assembly 8 and the control rod (shaft 34) that does not add resistance/force to the governor.

In the description which follows, the complete upgraded power valve system (PVS) as upgraded operates the valve positions between the closed and opened valve positions with respect to shaft 34 as described hereinabove. The upgrade includes replacement of the original torsion springs 31 and installation of a new closing fork part replacing lever link 30.

The original torsion springs 31 (which spring biased side valves 12 closed) are now replaced by different torsion springs. Following the upgrade, new spring bias is opposite, now spring biasing valve assembly 8 open.

Figure 16B:
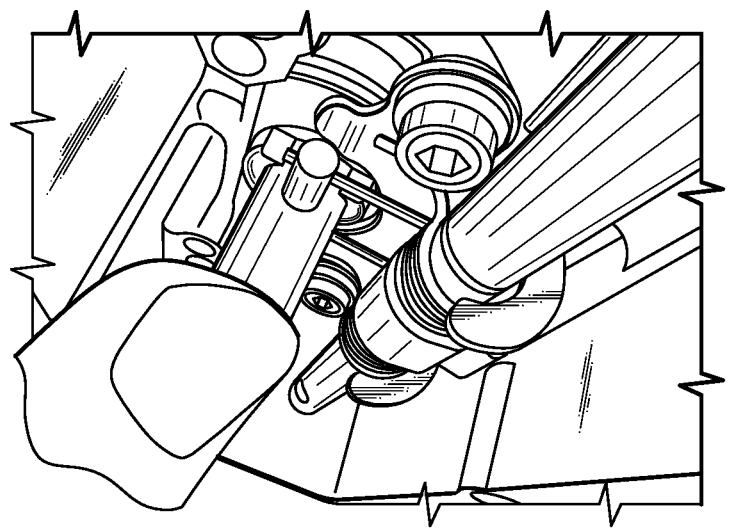
FIG. 16B shows the center valve of FIG. 16A being held closed against the open spring bias.
Figure 16A:
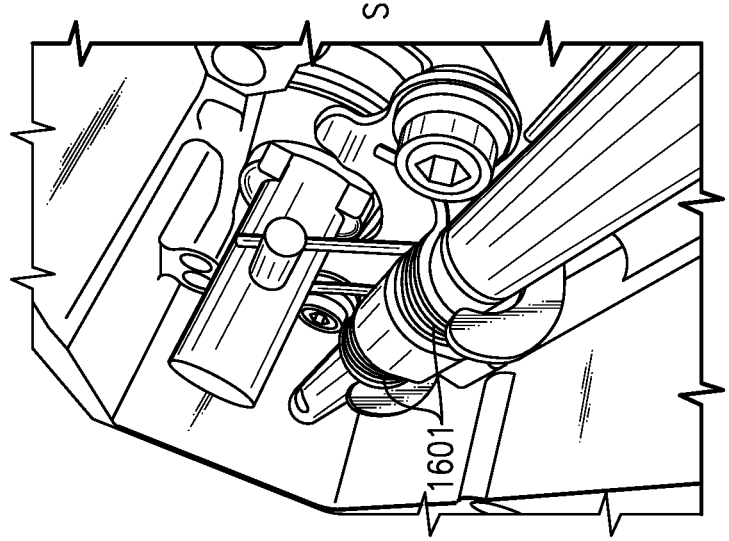
FIG. 16A is a drawing showing how the center valve is spring biased to the open position according to the new hitless system.

FIG. 16A and FIG. 16B show a new spring structure (torsion springs 1601) which replaces the original torsion springs 31 (FIG. 3). In the new system, two new light torsion springs are slid over shaft 34. However, torsion springs 1601 are not mounted to, nor controlled by the control rod (shaft 34). One leg of each spring is stopped against the engine cylinder (in some versions, there is a cylinder with a plate attached to the cylinder on which the leg rests, which we define as included in the use of the word "cylinder" herein). The other leg of each spring is stopped by the underside of the main center valve. The main center valve is now spring biased to the full open position. In FIG. 16A, it can be seen that before the new closing fork is installed, valve assembly 8 is held open by the open bias force of spring 1601. Before the new closing fork is installed, valve assembly 8 can be pushed close against the open bias force of spring 1601 by pressing down with a fingertip on the top of valve assembly 8. FIG. 16B shows the center valve of FIG. 16A being held closed against the open spring bias. Thus, when partially assembled, valve assembly 8 moves to an open position by a new open spring bias technique. Yet, when the new system is fully assembled, the opening and closing operation of side valves 12 with respect to the rotational position of shaft 34 remains unchanged.

Closing fork: FIG. 17 shows two different views of one exemplary embodiment of a new hitless closing fork 1701. The structure of closing fork 1701 includes a flat plate 1702 which extends into two forked arms 1703 and a closing fork base portion 1705. A cylindrical through wall 1711 from a top surface to a bottom surface of the base portion 1705 defines a hole through which a bolt is inserted to secure the upgrade kit closing fork 1705 to shaft 34 using an existing threaded hole in shaft 34. The only part of the upgrade kit that is fixed mounted to the control rod is the new closing fork 1701. Closing fork 1701 closes the spring loaded main center valve (spring biased open) from its full open default position.

Figure 18:
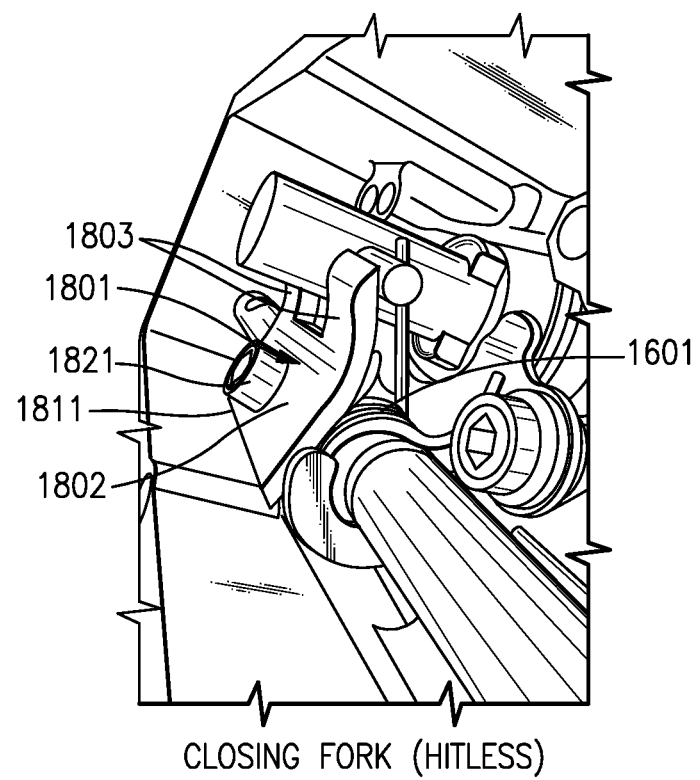
FIG. 18 shows another exemplary embodiment of a closing fork.

FIG. 18 shows another embodiment of closing fork 1801 having closing forked arms 1803 which extend from a flat mounting plate section 1802. In this embodiment, the closing fork is bolt mount to shaft 34 via a separate closing fork base section. Shaft 34 slides through a cylindrical interior wall section which defines an opening through the base section under the flat mounting plate section 1802 which extends into closing fork arms 1803. Both of the closing fork 1801 and flat mounting plate section 1802 are bolted (bolt 1821) to shaft 34 by use of the existing threaded hole in shaft 34. Bolt 1821 extends through a cylindrical wall defining a hole in plate 1802 of closing fork 1801 (hole and cylindrical wall 1811 not visible in FIG. 18).

The shape of closing fork 1801 can vary without changing the new hitless closing fork system and method. For example, during testing, the bevel at the ends of the forked arms was made to avoid making contact with the cover. However, it was found that there was no interference and in most embodiments, it is now believed that the bevel is not needed.

For initial testing and proof of principle, the closing fork of FIG. 18 and the later exemplary valve closing and opening illustrations according the new hitless closing fork system and method were cut and formed from a steel plate stock. The ears were cut off the original link lever 30 and closing fork 1801 was affixed over the modified link lever 30. The forked arms 1803 of closing fork 1801 were curved because the flat spot of the modified link lever 30 was not at the correct angle. It is contemplated that in most embodiments of the forked arms of the closing fork of either the one-piece embodiment of FIG. 17, or the two-piece embodiment of FIG. 18, will be substantially straight as shown in FIG. 17.

In some embodiments it is contemplated that modified link lever 30, or an equivalent replacement base part will be used as a separate base part which accepts shaft 34 through a cylindrical walled opening similar to how the original unmodified link level 30 mounts to shaft 34 (e.g. similar to bolt 1821).

Single closing fork arm: While the closing forks 1701, 1801 both show two forked arms, it is contemplated that a closing fork having one arm can be used to provide a hitless control of an adjustable exhaust port 2-stroke motorcycle engine as described in the Application. In embodiments having only one forked arm, it is unimportant where the fork arm is located, only there be a corresponding post 81 or equivalent structure or flat surface on center valve assembly 8.

Figure 19:
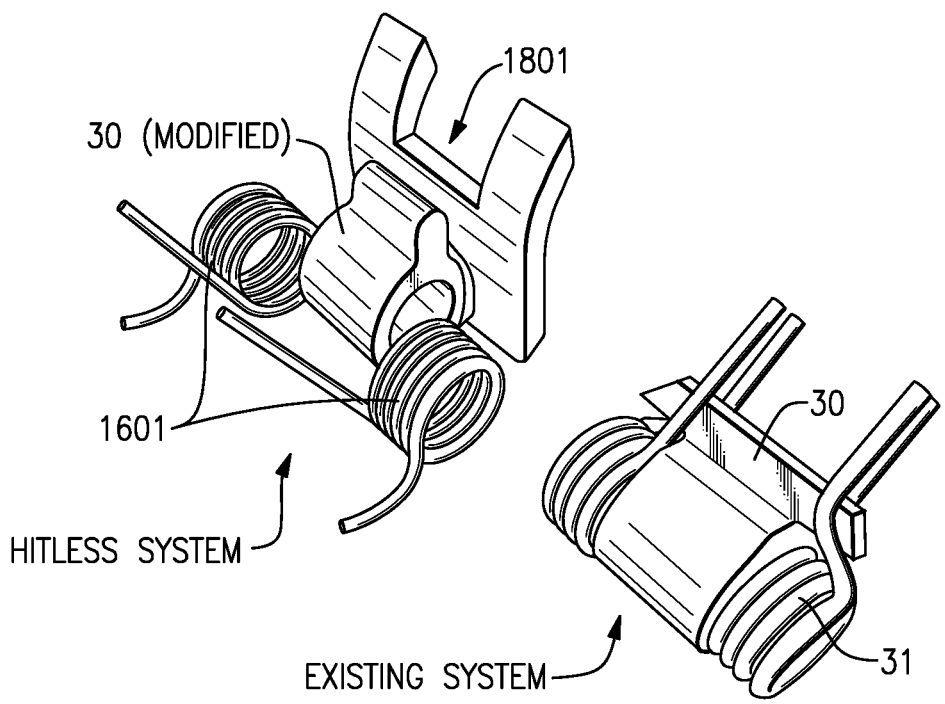
FIG. 19 shows a comparison of the new upgrade torsion springs to the original torsion springs and the new closing fork to the original link lever.
Figure 20C:
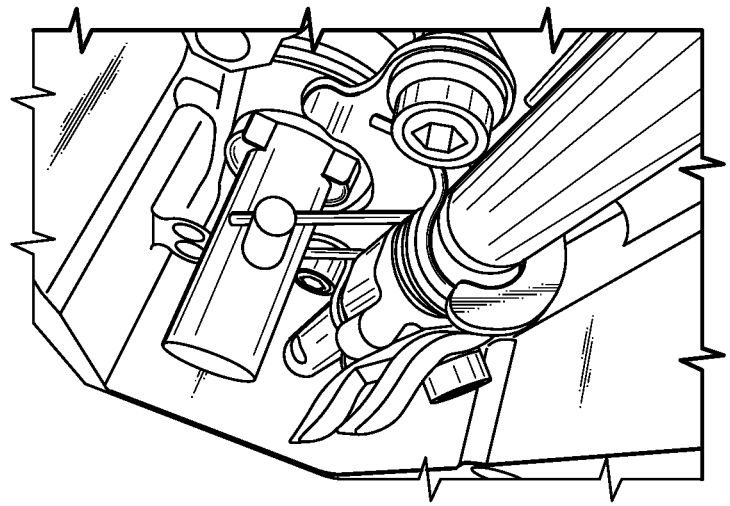
FIG. 20C is a drawing showing all power valves open.
Figure 20B:
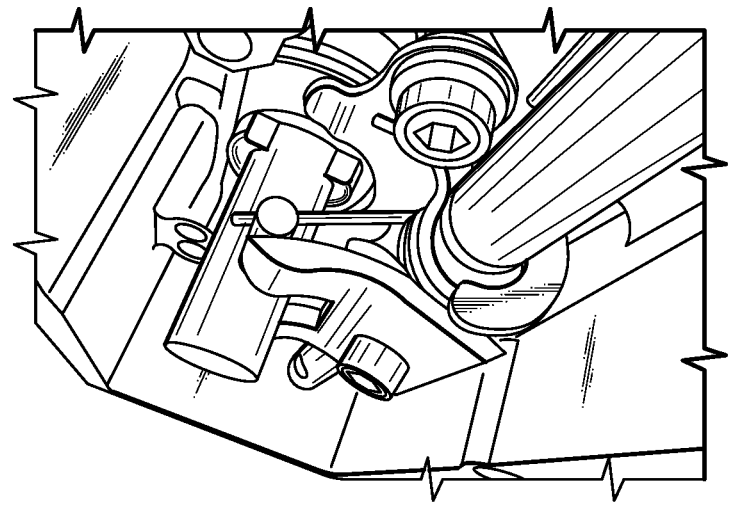
FIG. 20B is a drawing showing the center power valve open and the side power valves closed.
Figure 20A:
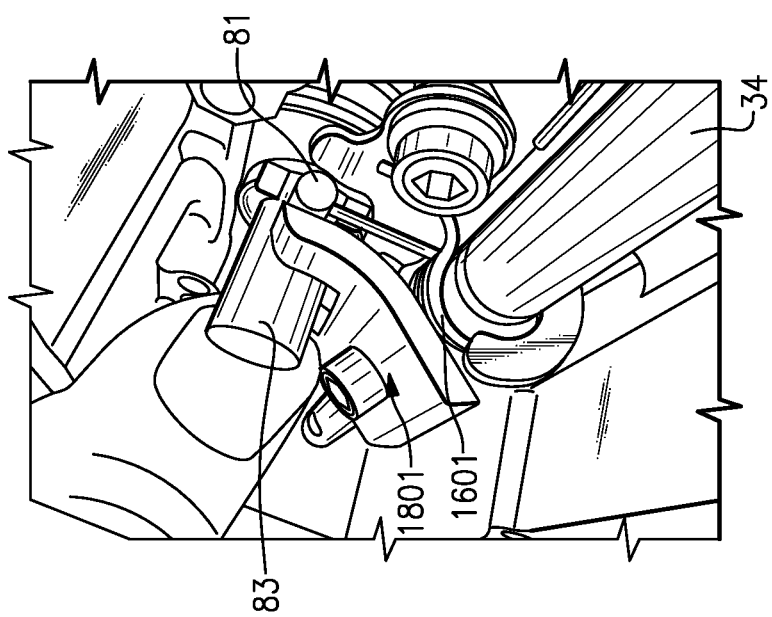
FIG. 20A is a drawing showing the opening sequence of the power valves from all power valves closed according to the new hitless system.

FIG. 19 shows a comparison of the new upgrade torsion springs 1601 to the original torsion springs 31 and the new closing fork to the original link lever 30;

Opening the valves according to the new system: FIG. 20A, FIG. 20B, FIG. 20C show shaft 34 rotating from all valves closed to all valves open. FIG. 20A shows shaft 34 rotated to the all valves closed position. Closing fork 1801 holds valve assembly 8 closed by pressing against transvers posts 81 of valve assembly 8 to overcome the open spring bias of spring 1601. FIG. 20B shows shaft 34 rotated so that the forked arms 1803 of closing fork 1801 have rotated up allowing the center valve assembly to open by the open bias of spring 1601. FIG. 20C shows shaft 34 further rotated to the all valves open position. The operation of side valves 12 is unchanged by spring 1601 and closing fork 1801 modification.

During the valve closed to open progression as described above, the governor 505 slowly allows the main center valve (valve assembly 8) to open until it hits its stop (returning to its full open position halfway through the control rod rotation). The control rod (shaft 34) continues rotating, operating the second stage (side valves) in the second half of control rod rotation with no resistance on the control rod caused by any of the valves or their connections.

Closing the valves according to the new system: FIG. 21A, FIG. 21B, FIG. 21C show shaft 34 rotating from all valves open to all valves closed. In FIG. 21A, shaft 34 is shown in the all valve open rotational position. In FIG. 21B, shaft 34 has rotated to the center valve (valve assembly 8) open position and where both side valves 12 are in a closed position. The forked arms 1803 of closing fork 1801 can be seen near or at the transverse posts 81 of valve assembly 8. In FIG. 21C, shaft 34 has rotated to the all valve closed rotational position, and the forked arms 1803 of closing fork 1801 are pressing against the transverse posts of valve assembly 8 to hold the center valve assembly closed.

Figure 22:
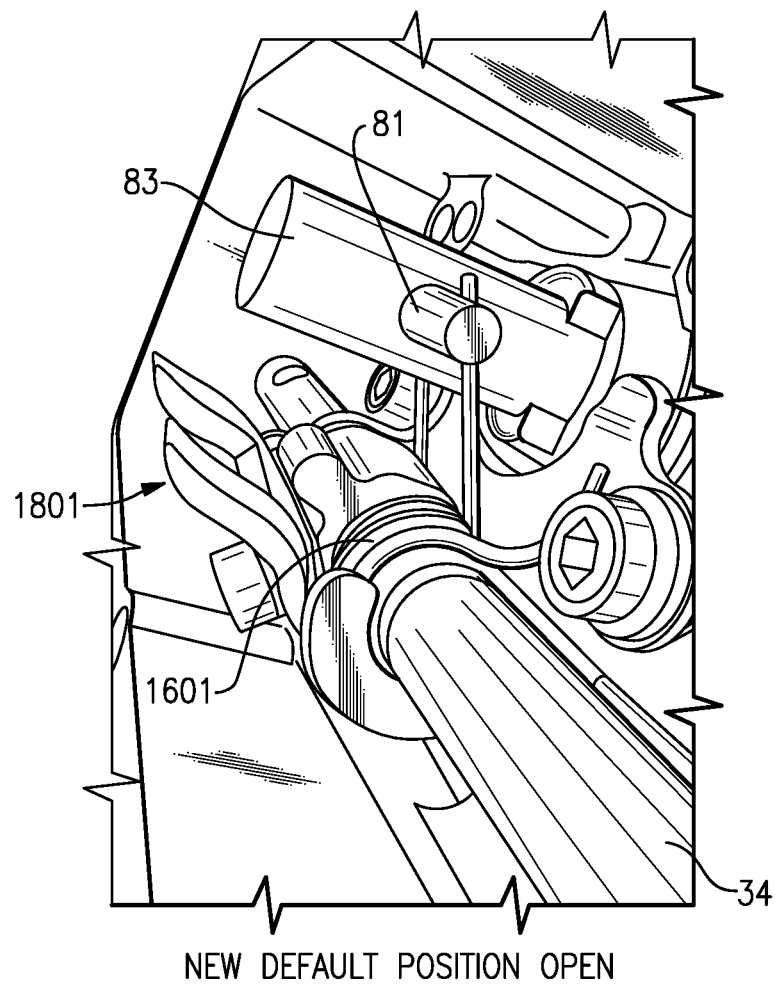
FIG. 22 is a drawing showing the new default open position of the center power valve assembly.

FIG. 22 is a drawings showing the new default open position of the center power valve assembly 8.

During the closing of the valves, the governor pulls the second stage (side valves) closed (at half rotation), then closes the main center valve with the new closing fork. When the linkage is disconnected from the control rod, the default position is all valves open, the opposite of the original system.

Once modified as described hereinabove, the governor is allowed to move the control rod and power valves smoothly without any interference to the governors' linear design. Testing showed this lack of interference caused the YPVS™ timing to be a little early, so a new spring with a stronger rate was installed in the governor to correct the timing. The new governor spring is matched for perfect high RPM performance while increasing low RPM performance because of the stronger rate.

The new system as described hereinabove makes the engine output smooth and linear through the entire RPM range with no "HIT". Following installation of the spring 1601 and closing fork (e.g. closing fork 1801 or 1701), there is also an increase of torque in the lower RPM range. The motorcycle engine power valve upgrade kit is believed to work with all types of YPVS™ system main center valves, new style, old style, broken or not from 1999 to the current model year.

Example of a new closing fork and open spring bias of a center power valve for a hitless control of an adjustable exhaust port 2-stroke motorcycle engine: Reference designators are given for both closing fork versions 1701 (e.g. FIG. 17) and 1801 (e.g. FIG. 18) of the new hitless closing fork. The hitless control adjustable exhaust port 2-stroke motorcycle engine closing fork 1701, 1801 includes a flat plate 1702, 1802 which extends in a same direction into two substantially parallel flat closing fork arms 1703, 1803. The flat plate 1702, 1802 includes a flat plate interior cylindrical wall which extends perpendicular from a first flat plate surface to a second flat plate surface to define a mounting hole 1711, 1811 which accepts a mounting bolt 1821. A closing fork base section 1705, modified 30, has a mounting internal cylindrical wall in alignment with and to extend the interior flat plate cylindrical wall to allow the mounting bolt 1821 to extend through the closing fork base section to bolt the hitless control adjustable exhaust port 2-stroke motorcycle engine closing fork to a shaft 34. An internal closing fork base section cylindrical wall 1707 is perpendicular to both the interior cylindrical wall and a direction of the substantially parallel flat closing fork arms to accept the shaft 34 inserted there through. Each torsion spring 1601 of two torsion springs has a first extended leg including an approximately 90-degree bend about where the first extended leg extends out from a spring body of each torsion spring and a second leg extending straight out of a body of each torsion spring. Each of the torsion springs 1601 is a mirror of each other where the first extended leg extends from a different side. The two torsion springs 1601 define a cylindrical opening which mounts freely and rotatingly over a shaft 34 on either side of the closing fork base section.

FIG. 23 shows a flow diagram for a hitless PVS upgrade as described hereinabove. The method steps include: A) providing an upgrade kit including a closing fork having forked arms, and two torsion springs to spring bias a center adjustable exhaust valve to an open position; B) removing parts of an unmodified power valve shaft which control the operation a center valve from a shaft including a link lever and two torsion springs; C) installing the closing fork and the two torsion springs to over the shaft and securing the closing fork to the shaft by inserting a bolt through the closing fork and threading the bolt into an original threaded hole of the shaft about adjacent to a center exhaust valve; and D) wherein the installed closing fork and two torsion springs spring bias a center adjustable exhaust valve to an open position for a hitless operation of the power valve system 2-stroke motorcycle engine Exemplary upgrade kits: In one exemplary embodiment, a power valve system (PVS) upgrade kit for the YZ250 Motorcycle includes a closing fork (either a two-piece closing fork with a separate closing fork base portion, or a one-piece closing fork which includes an integral base portion) and two tension springs which spring bias the center valve to an open position as described hereinabove, which parts solve the "HIT" problem. There could also be supplied governor compression springs with different rates (spring constants) and an assortment of different thickness washer plates. There can also be different length pieces of plastic tube to slide over the governor shaft to control the range of motion inside the governor and to limit the amount the side exhaust valves open. There can also be included a small bushing that can be used for shaft 34 as a repair for those who have a worn cylinder shaft hole.

In summary, a new hitless power valve system (PVS) upgrade kit and upgrade method with closing fork system and reversed spring bias is described hereinabove, which solves the HIT problem of hesitation and surging during power throttle changes.

Alternate Spring Embodiments

Any suitable spring bias can be used to achieve the spring biased opened exhaust valves of the Application. For example, in one embodiment, the spring used to create the spring bias open can be a compression type spring. In compression type spring embodiments, the transverse post can be removed from the center exhaust valve, and the compression spring slid over the valve stem. The transverse post is then reinstalled in the valve. Upon installation, one end of the compression spring is stopped by the engine cylinder and the other end stopped by the valves transverse post, thus creating the spring bias open of the center adjustable exhaust valve.

In another exemplary embodiment, the spring used to create the spring bias open can be an extension spring. One end of the extension spring can be mounted to a surface of the cylinder or valve cover. The other end of the extension spring can be hooked to the transverse post of the valve, thus creating the spring bias open of the center adjustable exhaust valve.

In another exemplary embodiment, the spring used to create the spring bias open can be a leaf spring. In some embodiments, one end of the leaf spring is mounted to a surface of the cylinder or valve cover. The other end of the leaf spring is hooked to the transverse post of the valve, thus creating the spring bias open of the center adjustable exhaust valve.

In other embodiments, any suitable spring type can be used to create the desired spring bias open condition.

Figure 24:
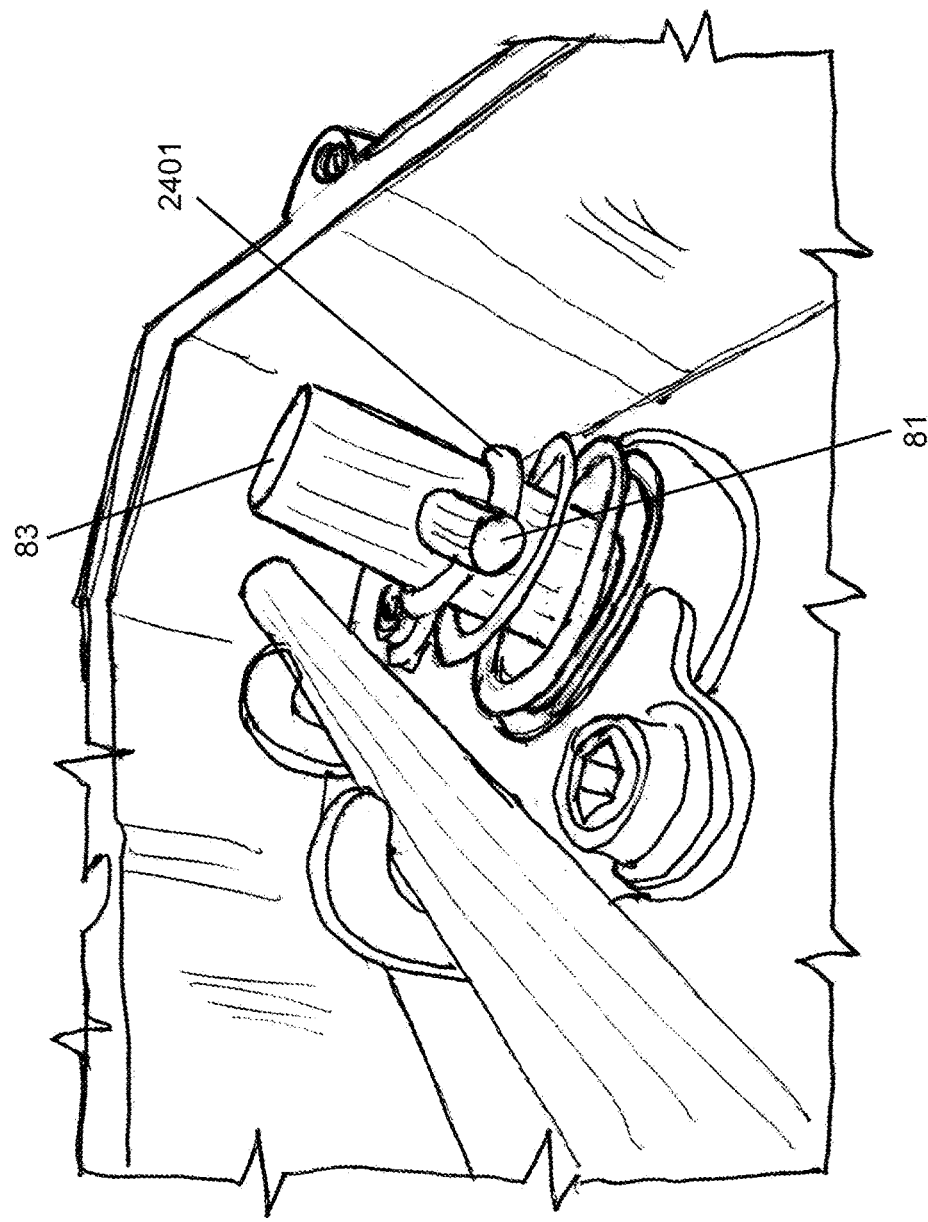
FIG. 24 is a drawing showing an exhaust valve spring bias to open by an exemplary compression spring.

FIG. 24 is a drawing showing an exhaust valve spring bias to open embodiment by an exemplary compression spring. Compression spring 2401 contacts one or more transverse posts 81 at one end. The other end of compression spring 2401 contacts a surface of the cylinder, or one or more intervening fix mounted parts, the fix mounted parts, mounted to and in contact with a surface of the cylinder. For example, there can be one or more plates and/or washers between the end of compression spring 2401 and the surface of the cylinder.

Figure 25:
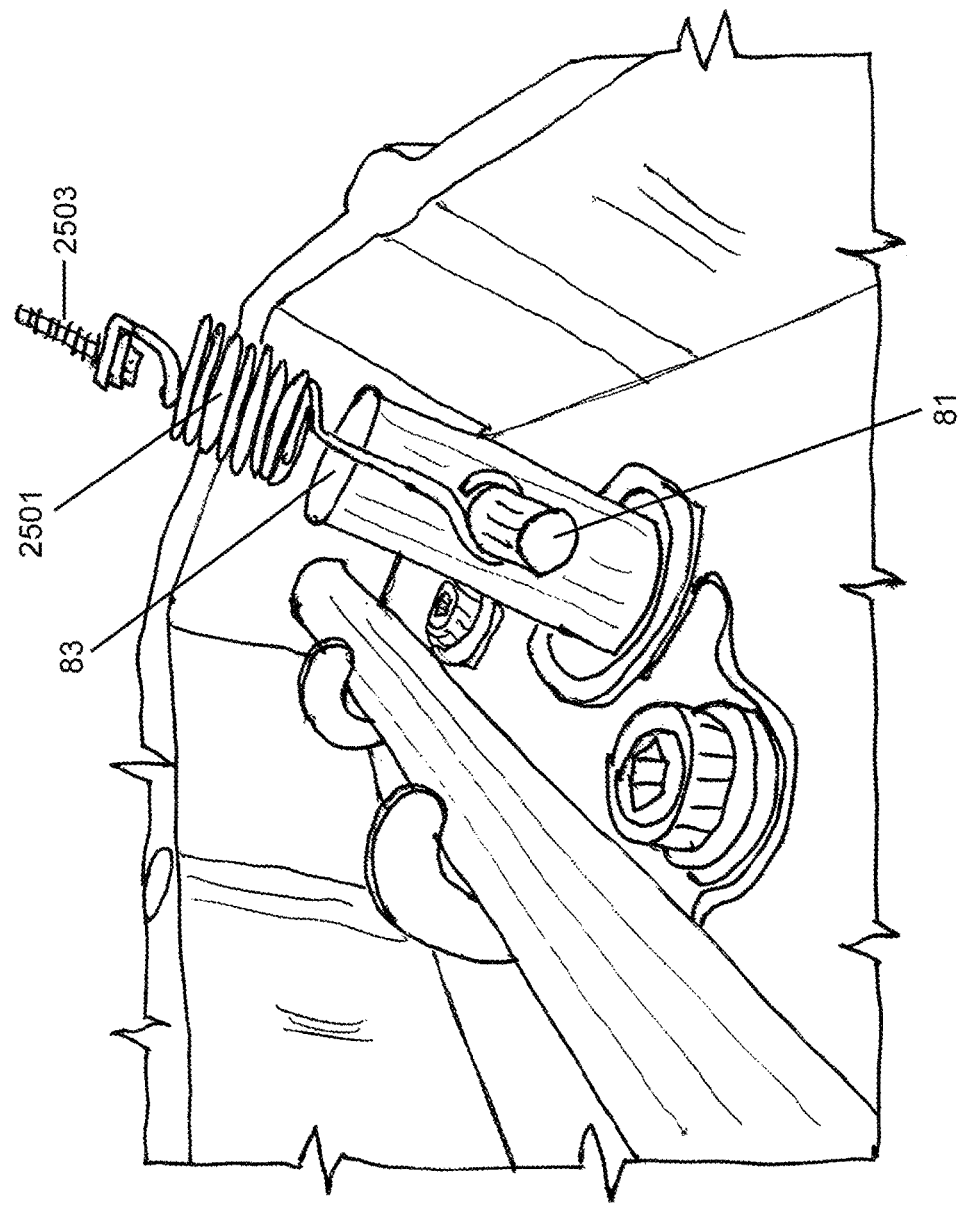
FIG. 25 is a drawing showing an exhaust valve spring bias to open by an exemplary extension spring.

FIG. 25 is a drawing showing an exhaust valve spring bias to open embodiment by an exemplary extension spring 2501. Extension spring 2501 is disposed between one or more transverse posts 81 and a fixed surface of or in fixed mounted contact with a surface of, or fixed mechanically coupled to a surface of the cylinder (not shown in FIG. 25). For example, any suitable fastener, such as a screw 2503 can be in contact with a cover or bracket (not shown in FIG. 25) attached or otherwise fixed mounted to a surface of the cylinder.

Figure 26:
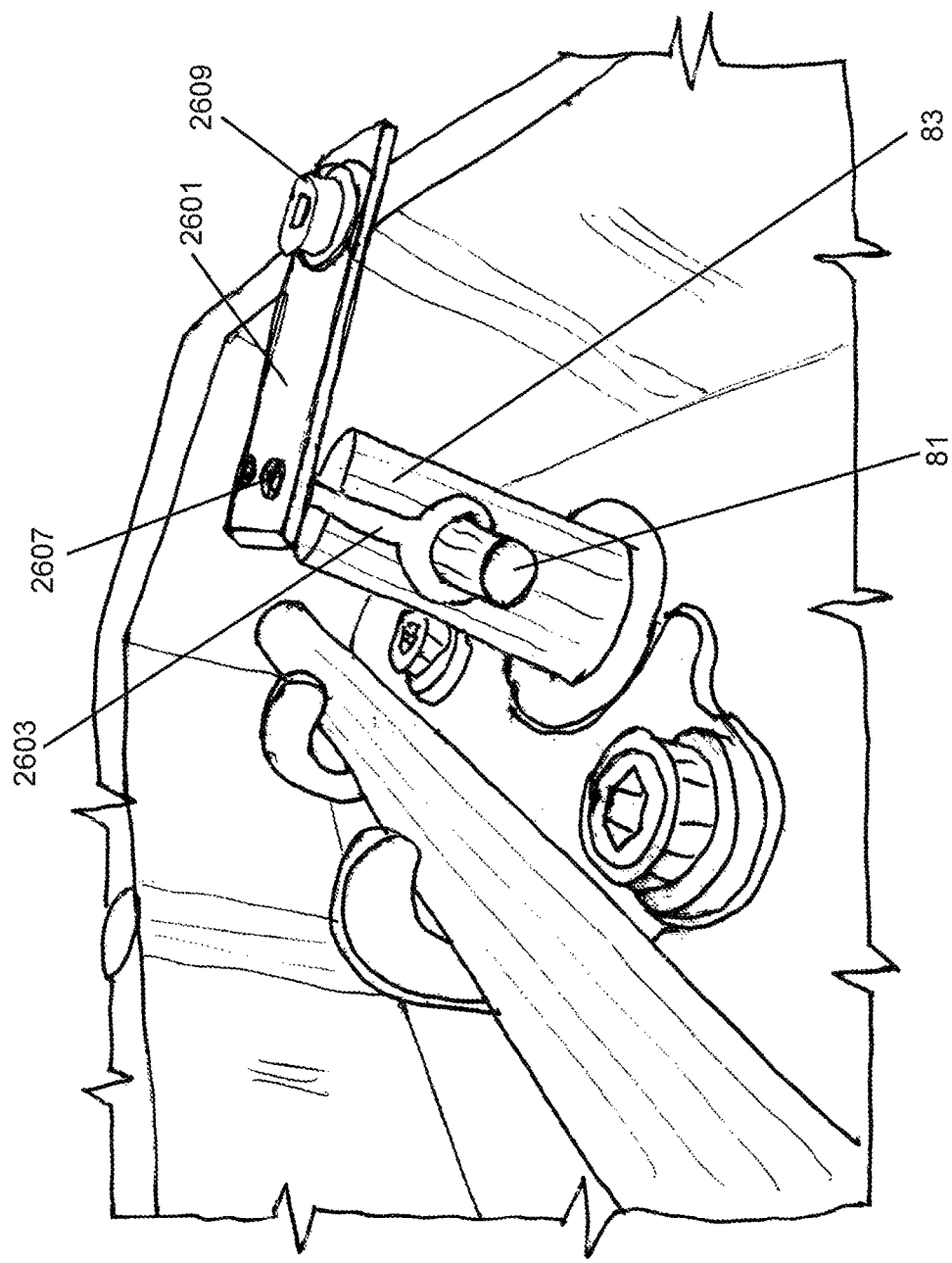
FIG. 26 is a drawing showing an exhaust valve spring bias to open by an exemplary leaf spring.

FIG. 26 is a drawing showing an exhaust valve spring bias to open embodiment by an exemplary leaf spring 2601. Leaf spring 2601 is disposed between one or more transverse posts 81 and a surface of the cylinder or any fix mounted part to a surface of the cylinder, such as, for example, a wall, bracket, post, etc. In the example of FIG. 26, one end of the leaf spring is mechanically coupled to a transverse post 81 by a linkage 2603. The other end of leaf spring 2601 is mechanically coupled to a wall which is in fixed mounted relation to the cylinder by a screw 2609. Any suitable fasteners can be used to affix either end of the leaf spring 2601 to either or both of the linkage and fixed mounting surface.

Fixed Mounted to a Surface or in Contact with a Surface

Fixed mounted to a surface or in contact with a surface, such as where one end of a spring is fixed mounted to a surface of the cylinder is defined to include any intervening fix mounted structures to a surface of the cylinder. For example, a bracket, washer, plate, fixed mounted to a surface of the cylinder are understood to create a fixed mount mechanical coupling (one end of a spring mechanically bound to, or in contact with) of one end of a spring to the surface of the cylinder. The definition of fixed mounted to a surface of the cylinder does not include, for example, (See FIG. 19, "EXISTING SYSTEM") a torsion spring of the prior art which is fixed mounted by at least one point of the torsion spring to a shaft which rotates not freely, but with the rotation of the shaft, with respect to a surface of the cylinder.

Closing Fork and Closing Arm

Generally, the new concept of the Application includes a closing fork type device, such as, for example, the exemplary closing fork of FIG. 17. As described originally, there can be a closing fork with one arm as compared to the two armed closing fork for FIG. 17. For clarity, a closing fork with one arm is sometimes interchangeably referred to as a closing arm.

Applications

The exemplary embodiments described hereinabove introduced the hitless solution by a main or center exhaust valve spring bias open in terms of motorcycle engines, such as for example, the classic Yamaha YZ-250 2-stroke motorcycle engine. Other suitable applications can include, for example, engines for ATV's, snowmobiles, jet skis, other watercraft, etc.

The same hitless solution concept applies to split center exhaust valves, such as, for example, has been used in the YZ125 2-stroke engine.

YZ125 2-Stroke Engine

Another exemplary 2-stroke engine which can benefit from the exhaust valve spring bias open solution is the YZ125 2-stroke engine. The YZ125 motorcycle is powered by a 124 cc liquid-cooled 2-stroke engine. The YZ125 engine has a split center adjustable exhaust valve, probably because the exhaust port was too wide for the small cylinder. The cylinder has a bridge in the middle of the exhaust port to support the piston with its ring. The center adjustable exhaust valve is split down the middle with half on each side of the bridge. At low RPM the valves are closed allowing more compression and port timing producing more torque. As RPM's increase the valves are opened allowing less compression and port timing producing high RPM horsepower.

It was further realized that split center adjustable exhaust valves can be spring biased to a valves open position at all times, such as, for example, by the two torsion springs described hereinabove with respect to the adjustable center exhaust valve. For such engines using a split center exhaust valve, a transverse post of each split center exhaust valve can be engaged by the closing arm upon rotation of the control rod shaft, where the split center exhaust valves close by overcoming an open spring bias provided by the two torsion springs. The new open spring bias and closing arm arrangement allows for smooth and precise operation unlike prior art methods with no always present open spring bias.

In some embodiments, the adjustable exhaust port 2-stroke motorcycle engine split center adjustable exhaust valves are a mirror of each other.

One exemplary adjustable exhaust port 2-stroke motorcycle engine is used in the Yamaha™ YZ125 series motorcycle.

In alternative embodiments, the springs used to create the spring bias open can be compression type springs. For example, in some embodiments, the transverse post can be removed from the valves. A compression spring is slid over the valve stems. The transverse posts are reinstalled in the valves. Upon installation one end of the compression springs are stopped by the engine cylinder and the other end stopped by the transverse posts of the valve, thus creating the spring bias open of the valves.

In another alternative embodiment, the springs used to create the spring bias open can be extension springs. One end of the extension springs is mounted to a surface of the cylinder or valve cover. The other end of the extension spring is hooked to the transverse posts of the valves, thus creating the spring bias open of the valves.

In another alternative embodiment, the springs used to create the spring bias open can be leaf springs. One end of the leaf springs is mounted to a surface of the cylinder or valve cover. The other end of the leaf spring is hooked to the transverse posts of the valves, thus creating the spring bias open of the valves.

FIG. 27 shows an exploded diagram of an exemplary YZ125 motorcycle engine. The split center adjustable exhaust valves 2714 and 2715 fit into the valve housing of cylinder 2706. Valve assemblies 2714 and 2715 include transverse posts 81 which extend outward from the center valve stems 83. The posts 81 are typically provided by a common rod which extends through a transverse cylindrical opening in the valve stems 83. Control rod shaft 2717 supports from left to right, spacer 2727, torsion spring 31, link lever 30, torsion spring 31, and spacer 2727. The legs of the torsion springs 31 straddle the posts on the link lever 30 and all three are connected to the control rod shaft 2717 by screw 2719. Both torsion springs 31 and link lever 30 are forced to rotate with the control rod shaft. The opening in the torsion spring legs straddle the transverse posts 81 in the exhaust valves. Increased RPM's cause governor to rotate the control rod shaft 2717 causing torsion springs 31 legs to pull the exhaust valves open. Upon decreasing RPM's the governor pulls the control rod shaft 2717 back causing torsion springs 31 legs to push the exhaust valves closed.

Erratic power output is a common problem on later (1999+) motorcycles as the exhaust valves are able to flutter and even resist opening and closing due to being sandwiched between the legs of the torsion springs fixed to the control rod shaft. The motorcycle operator experiences random hesitation and surging through changing throttle positions. No amount of tuning, and no presently available products solve the Erratic output. There is need for a solution to the Erratic output problem.

Solution to the Erratic output problem: A new system as described in more detail hereinbelow substantially eliminates the flutter and soft connection between the control rod shaft and the exhaust valves. The new solution creates a new direct and positive connection between the exhaust valves and the control rod shaft. The upgrade includes replacement of the original torsion springs 31 and installation of a new closing arm part replacing link lever 30.

Figure 28B:
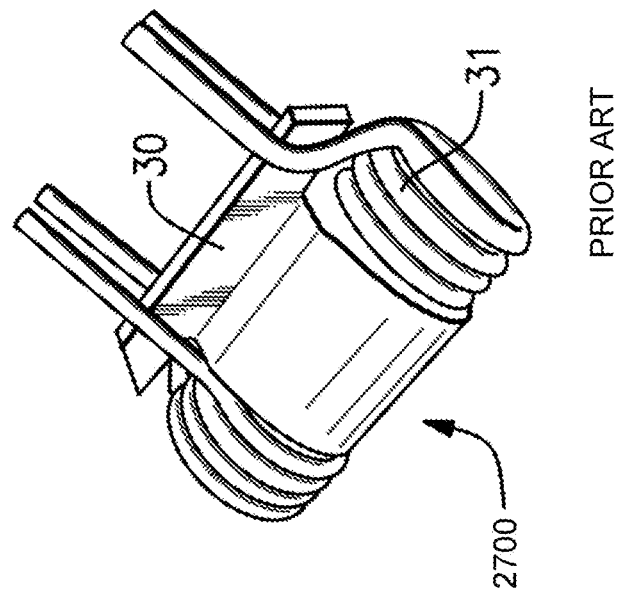
FIG. 28B is a drawing showing original link lever.
Figure 28A:
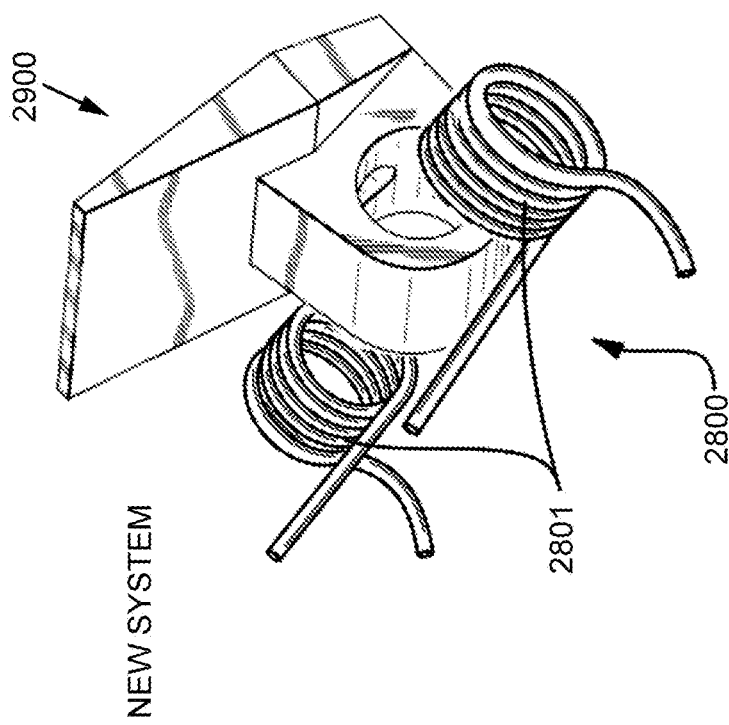
FIG. 28A is a drawing showing the new upgrade torsion springs and a closing arm of the hitless solution.

FIG. 28A and FIG. 28B show a comparison of the new system to the existing system. FIG. 28A is a drawing showing the new upgrade torsion springs and a closing arm of the hitless solution. FIG. 28B is a drawing showing original link lever. The new system shows the new torsion spring 2801 structures which replaces the original torsion springs 31 (FIG. 27). Each of the new torsion springs 2801 are a mirror of each other on either side of a single arm closing fork, closing arm 2900. The first extended leg of each of the mirrored torsion springs 2801 extends accordingly from a different side of each torsion spring 2801. The two torsion springs defining a cylindrical opening which slides freely and rotatingly over the control rod shaft 2717 (FIG. 27). Each of the torsion springs are disposed on either side of the new closing arm 2900 base portion 2905. Each of the two torsion springs 2801 having the first extended leg stopped by and in contact with a surface of an engine cylinder and a second leg stopped by and in contact with a respective transverse post of the split center adjustable exhaust valves. The split center adjustable exhaust valves spring biased to a valves open position at all times by the two torsion springs that are in no way connected to the control rod shaft.

Figure 29B:
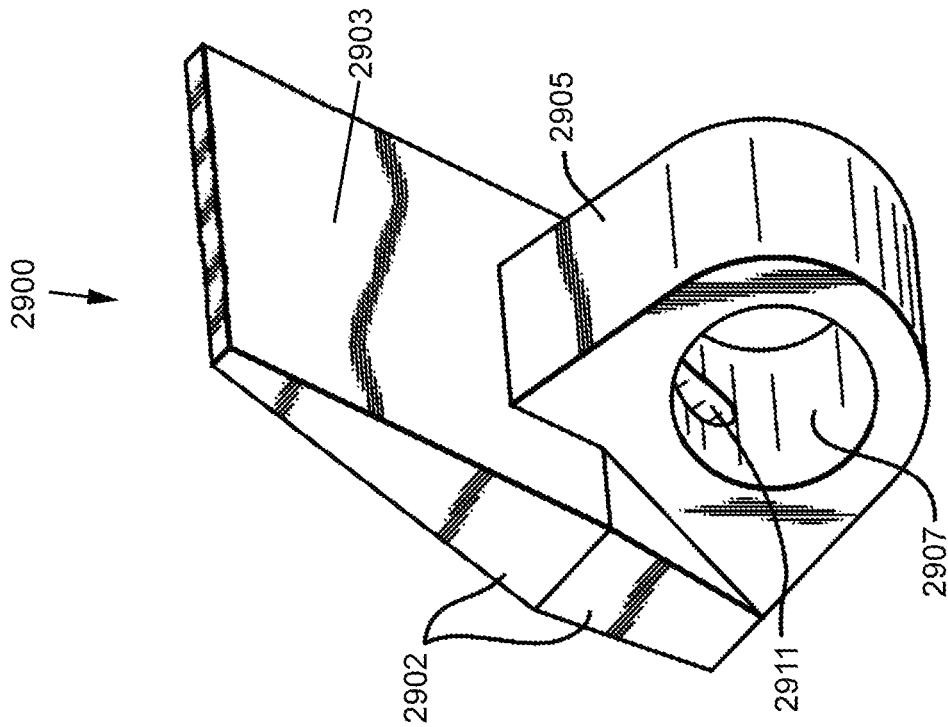
FIG. 29B is a drawing showing a different perspective view of the closing fork of FIG. 29A.
Figure 29A:
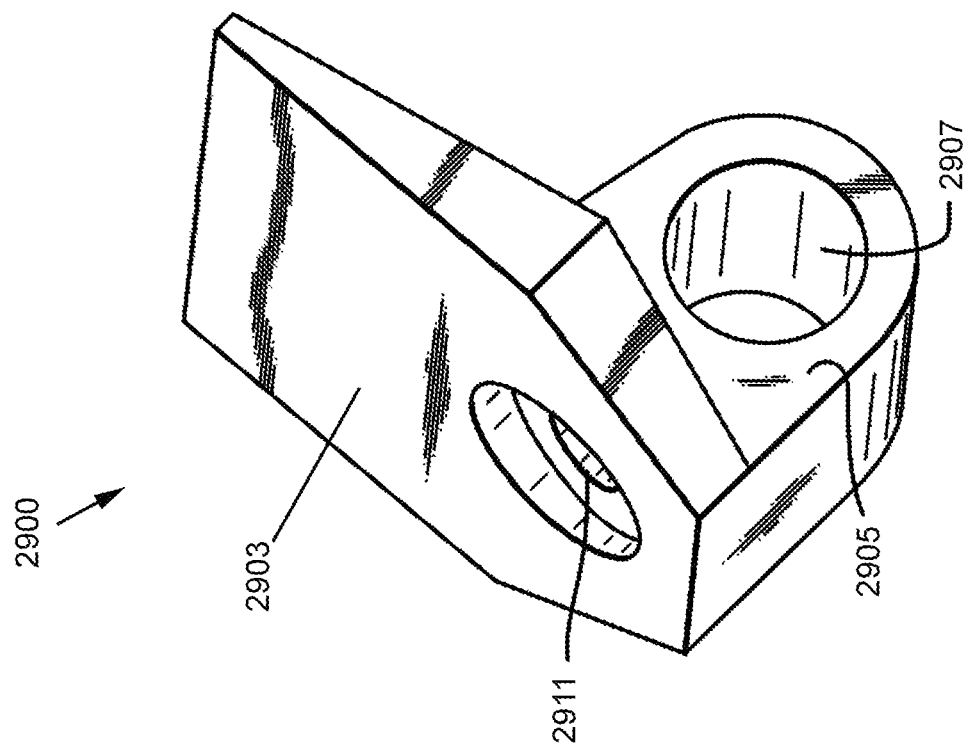
FIG. 29A is a drawing showing a perspective view of another exemplary embodiment of a hitless closing fork with a single closing arm.

FIG. 29A and FIG. 29B show two different views of one exemplary embodiment of hitless closing fork with a single closing arm as a closing arm 2900. FIG. 29A shows a perspective view of another exemplary embodiment of a hitless closing fork with a single closing arm 2900. FIG. 29B shows a different perspective view of the closing fork with a single closing arm 2900 of FIG. 29A. The structure of closing arm 2900 includes a flat plate 2903 which extends out past the closing arm base portion 2905. A cylindrical through wall 2911 from a top surface to a bottom surface of the base portion 2905 defines a hole through which a bolt is inserted to secure the new closing arm 2900 to shaft 2717 using an existing threaded hole in shaft 2717. The only part of the upgrade that is fixed mounted to the control rod is the closing arm 2900. Closing arm 2900 closes the spring loaded exhaust valves (spring biased open) from their full open default position by overcoming the spring bias.

Figure 30B:
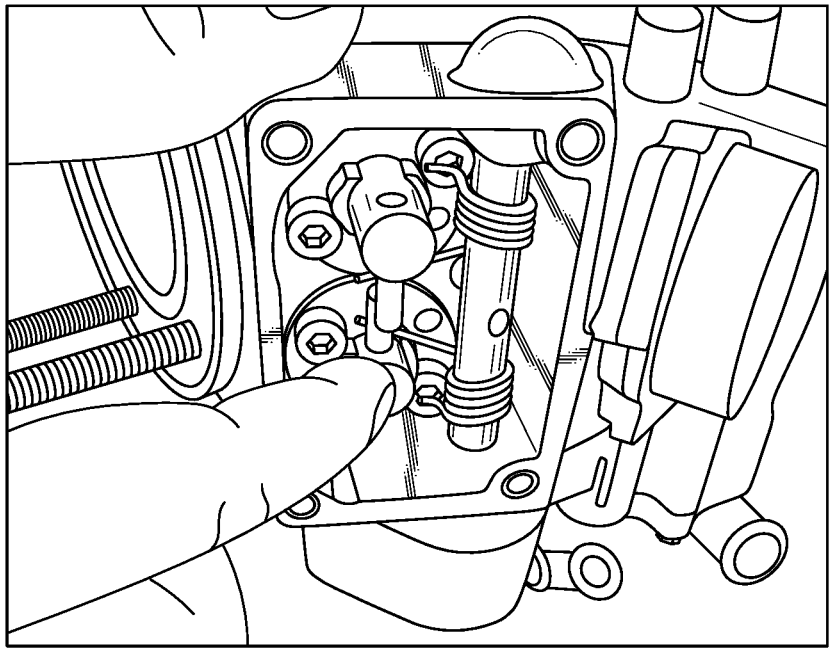
FIG. 30B is an illustration showing right exhaust valve closed and left exhaust valve open.
Figure 30A:
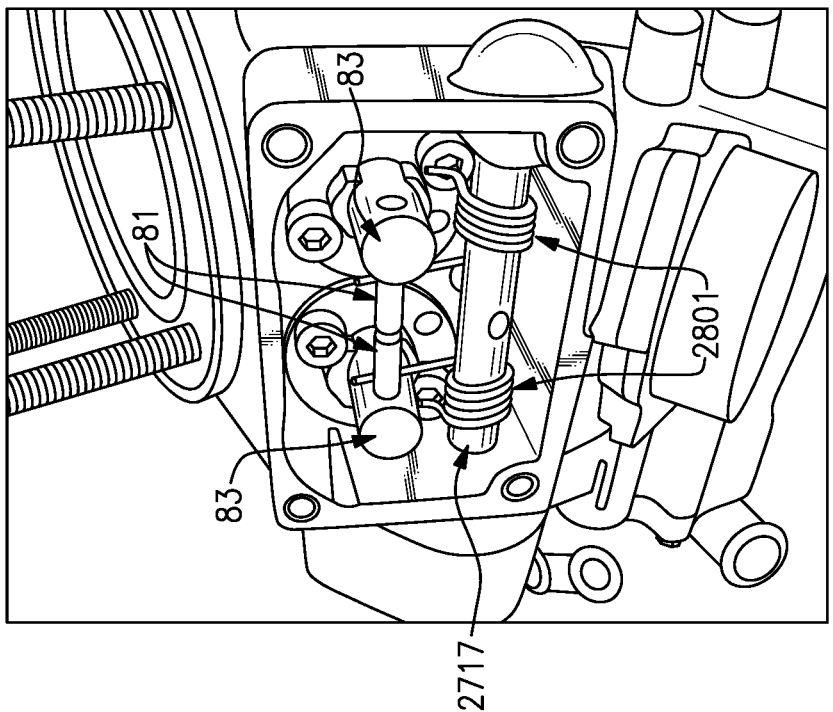
FIG. 30A is an illustration showing both exhaust valves spring biased open.

FIG. 30A shows both exhaust valves spring biased open. FIG. 30B shows right exhaust valve closed and left exhaust valve open.

Figure 31A:
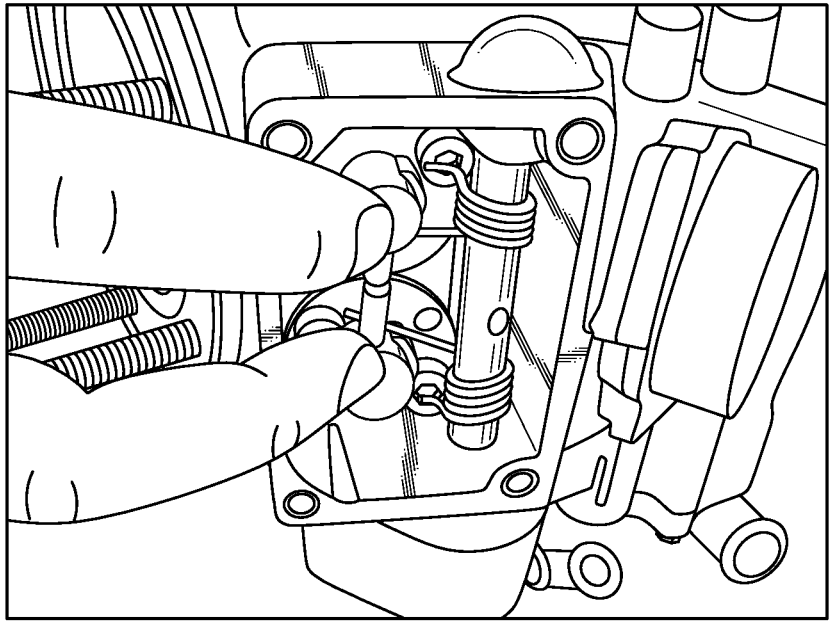
FIG. 31A is an illustration showing left exhaust valve closed and right exhaust valve open.
Figure 31B:
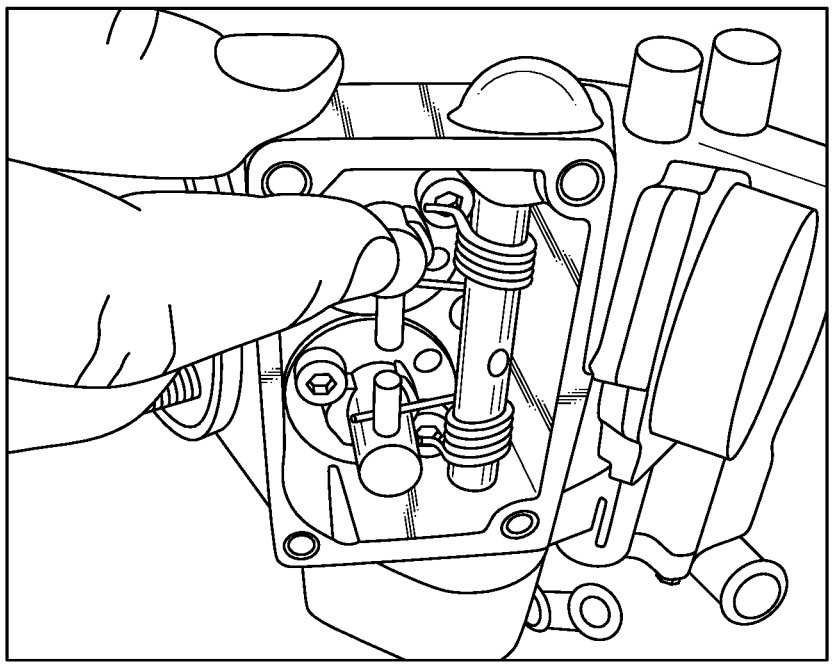
FIG. 31B is an illustration showing both exhaust valves pushed closed against their spring bias open.

FIG. 31A shows left exhaust valve closed and right exhaust valve open. FIG. 31B shows both exhaust valves pushed closed against their spring bias open.

Transverse Posts

In the exemplary embodiment of FIG. 20B, for example, where there is one center exhaust valve, typically there are two transverse posts protruding from either side of the center valve stem 83. Also, as described hereinabove, transverse posts 81 are typically present as a single rod which extends through valve stem 83 and extend outwards from center valve stem 83. However, it is possible in some embodiments to provide a single transverse post on either side of the center valve stem 83, which can for example, be operated in conjunction with a single arm closing fork.

Or, as is the case in exemplary embodiment of the split center exhaust valve, valve half has its own center valve stem 83 with its own single transverse post, and both posts can be operated together, such as for example, by a common single arm closing fork, or by a two arm closing fork. In other embodiments, two separate closing forks can operate each half of a split center exhaust valve independently of each other.

Once modified as described hereinabove, the exhaust valves move in a precise manner as the control rod shaft dictates making the engine output smooth and linear throughout the entire RPM range with no Erratic characteristics.

In summary, a new exhaust valve control system with closing arm and open spring bias is described hereinabove, which solves the Erratic power output problem of surging and hesitation during throttle changes.

Also, in summary, because one end of one or more springs (e.g. one leg of one or more torsion springs) is stopped by and in direct contact with a surface of an engine cylinder or a fixed structure attached to the surface of an engine cylinder, and another end of the one or more springs (e.g. the opposing leg of one or more torsion springs) is in contact with one or more transverse posts of one or more center exhaust valve portions (e.g. a single center exhaust valve, or a split center exhaust valve) such as the transverse posts of a center exhaust valve, the center exhaust valve (or, both parts of a split center exhaust valve) is spring biased open at all times. Also, the torsion springs are disposed freely and rotatingly over the control rod, or in the case of a compression spring over valve stem, the spring is disposed freely, but not necessarily rotatingly over the control rod By contrast, in the prior art, the torsion springs are mechanically affixed to the control rod, or to a component which is mechanically affixed to the control rod. The rotation of the control rod causes the torsion springs to rotate. Generally, one leg of the prior art torsion springs opens the center exhaust valve as driven by the rotation of the control rod, not by spring bias. In the prior art, the torsion springs are not tensioned until the center exhaust valve is fully opened. Then, as the control rod continues to rotate past the center exhaust valve fully opened position, the secondary exhaust valves are opened. As the secondary valves are opened, the torsion springs of the prior art are tensioned, spring biasing the secondary valves to a secondary valve closed position.

Applicant realized that previously undesirable engine performance characteristics experienced by the motorcycle operator, particularly during acceleration, can be solved by changing the mechanical loading on the governor arm which drives the exhaust valve control rod. In the solution, described and claimed by the Application, one end of each spring is stopped by and in direct contact with a surface of an engine cylinder or a fixed structure attached to the surface of an engine cylinder (e.g. one leg of each of the torsion springs in some center exhaust valve embodiments) is in contact with a surface of the cylinder. Also, instead of being mechanically coupled to the control rod, one or more springs are disposed between the surface of the cylinder and one or more transverse posts (e.g. torsion springs are disposed freely and rotatingly over the control rod). The control rod no longer directly drives the center exhaust valve open by driving the legs of the torsion springs. Rather, as part of the solution, the center exhaust valve is spring biased to the open position at all times.

In the common wisdom of the prior art of adjustable exhaust port 2-stroke motorcycle engines, where the center adjustable exhaust valve is driven open by the rotation of the control rod (because the torsion springs are mechanically coupled to the control rod), and the torsion springs only become tensioned on rotation past the center exhaust valve full open position, and then only to bias the secondary exhaust valves to the valve closed position.

As described hereinabove, the springs used to create the spring bias open can be of any suitable type, such as, for example, one or more compression springs, one or more extension springs, one or more leaf springs, etc.

Also, in summary, Applicant generally realized that the solution to the hitless problem is to spring bias open the center exhaust valve, or either or both sections of a split center exhaust valve by disposing one or more springs between a surface of the cylinder and at least one transverse post of the center exhaust valve, or either or both sections of a split center exhaust valve where the spring bias open condition is independent of the rotational position or rotation of the control rod or shaft. For example, in embodiments using one or more torsion springs slid over the control rod or shaft, the spring bias open is independent of the position of the control rod or shaft where the torsion spring moves freely and independently of the control rod or shaft. Similarly, for example, in embodiments where one end of a compression spring is in contact with at least one transverse post and the other end is contact with a surface of the cylinder either directly or via an intervening plate, washer, etc. Or, where an extension spring is mounted at one end and in contact with a bracket, cover, etc. which is fix mounted to the cylinder and the other end of the extension spring is in contact with at least one transverse post. Or, where a leaf spring is mounted to and in contact with a bracket, wall, etc. which is fixed mounted to a surface of the cylinder and the other end of the leaf spring is mechanically coupled to a transverse post by an intervening linkage. In all case, the center exhaust valve, or split center exhaust valve is always spring biased open. Also, a closing fork or closing arm can come in contact with one or more transverse posts to close an exhaust valve (e.g. a center exhaust valve, or one or both sections of a split center exhaust valve) by pressing against the always present open spring bias.

Hitless Solutions—Single Stage and Two Stage Systems

Improvements by modification to the slot profile of the exhaust valve control pulleys The exemplary embodiments described herein above introduced the hitless solution in terms of motorcycle engines, such as for example, the classic Yamaha YZ250, and YZ125 two-stroke motorcycle engines. The improvements described hereinabove modified structures and operation of the main exhaust valve, typically the center valve, also known as the guillotine valve, or a split center valve.

Now, we turn to another hitless solution improvements with modified structures and operation of the exhaust valves. The new concept can also be provided as a motorcycle engine power valve control upgrade kit to modify existing structures of the prior art, a solution based on modified pulleys, also applies to power valve coordination and timing.

The pulleys work to move the control linkages of the exhaust valves as the control rod (to which the pulleys are mounted) rotates by the governor. The control linkages are moved by pins that ride within ramped slots of the control pulleys. The ramps move from one side of each pulley to the other side by a profiled pattern. The Application describes various modifications of the shape of the ramped slots. The ramp can include a substantially zero slope leading into or leading out of a ramp pattern with typically about one slope, however there could be multiple slopes of the ramp. When the ramp slot is all the way to one side of the pulley, the exhaust valve is fully closed. When the ramp slot is all the way to the other side of the pulley, the exhaust valve is fully open. The slope and shape of the ramp between the two sides, creates an operating profile of the operation of the valves as the governor rotates the control rod.

As described in more detail hereinbelow, it was realized that the profiles of the slots can be modified over the prior art pulleys as a solution to the Hit problem. Modification of the ramped slots include changing the slope of the slots so that the exhaust valves begin to move while the primary exhaust valve is still moving (overlap), moving "mirrored" exhaust valves in a non-mirrored operation where each exhaust valve has a different position at a given time (stagger), and/or preventing the exhaust valves from reaching an end position, e.g. limiting the amount of open short of full open of the prior art (limiter).

In unmodified prior art engines, a centrifugal governor that is activated at a predetermined engine speed moves through a range of motion as engine speed increases. The governor pushes a linkage 475 (e.g. FIG. 4 and FIG. 5), that rotates a "control rod" or "valve shaft" 34 (e.g. FIG. 3, FIG. 5, FIG. 6 and FIG. 7) and 2717 (e.g. FIG. 27 and FIG. 30A), that is mechanically linked by way of spring 31 (e.g. FIG. 3, FIG. 6, FIG. 7A, FIG. 19, FIG. 27, FIG. 28B), fork 1701 (e.g. FIG. 17) and 1801 (e.g. FIG. 18, FIG. 19, FIG. 20A), arm 2900 (e.g. FIG. 28A, FIG. 29A and FIG. 29B), control pulley 32 and 33 (e.g. FIG. 3, FIG. 6 and FIG. 13), lever arm with pin 27 (e.g. FIG. 3) and 276 (FIG. 6), gear segment, or any combination thereof and/or other forms and names of linkage types. These linkages connect the control rod to the exhaust valve or valves.

Figure 32A:
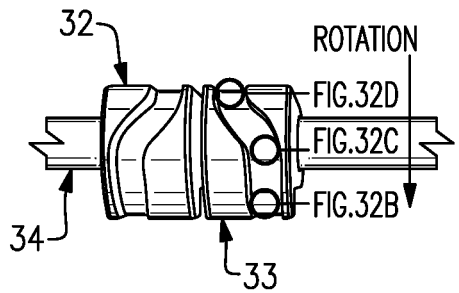
FIG. 32A is a drawing showing the pulleys of the prior art, pulleys have been moved together for comparison.
Figure 32B:
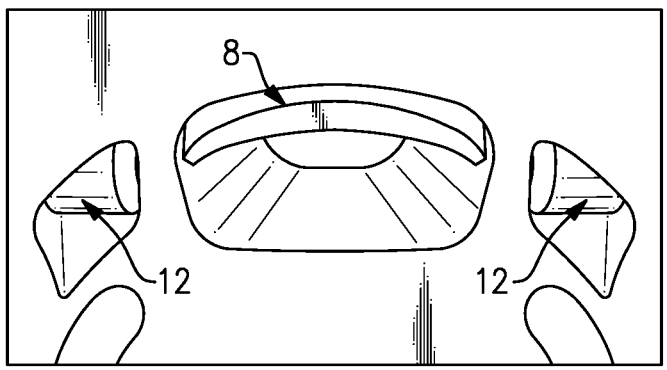
FIG. 32B is a drawing showing the opening sequence of the power valves of the prior art starting with all power valves closed.
Figure 32C:
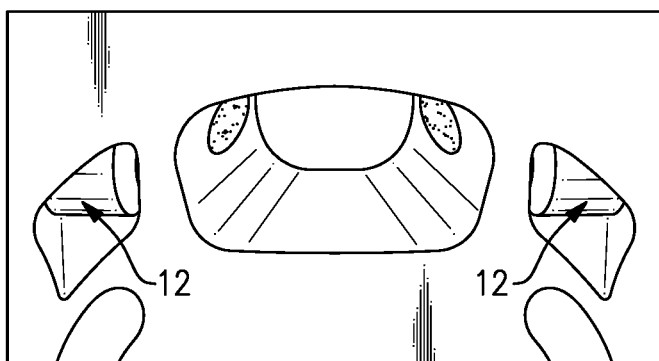
FIG. 32C is a drawing between stages showing the first stage center power valve open and the second stage side power valves closed.
Figure 32D:
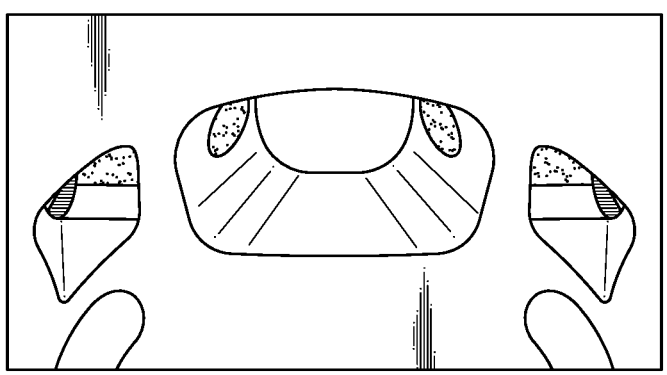
FIG. 32D is a drawing showing all power valves open.
Figure 36A:
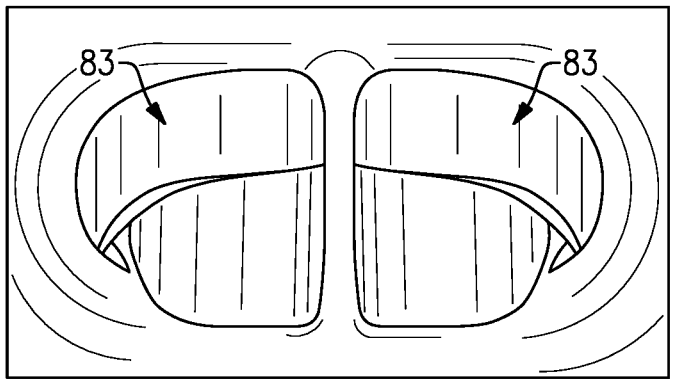
FIG. 36A is a drawing showing the opening sequence of the power valves of the single stage prior art starting with all power valves closed as viewed from downstream.

Three exhaust valve types have been shown and discussed previously; single or "center" exhaust valve 8 (e.g. FIG. 3, FIG. 5, FIG. 6 and FIG. 32B), a "split" or "mirrored" center exhaust valve using two valves each a mirror of the other 83 (e.g. FIG. 27, FIG. 30A and FIG. 36A), and "secondary" or "side" exhaust valves which are also configured as a mirrored pair 12 (e.g. FIG. 3, FIG. 6 and FIG. 32B). Two types of control systems "single stage" and "two stage" systems have been described hereinabove.

Single stage system—The single stage system can be seen in FIG. 27. It can be made up of a single center exhaust valve or more commonly a "split" center exhaust valve. On rotation, the control rod activates the movement of all valves together at the exact same time to the exact same end point or full open position. When the governor slows the control rod rotates back, closing all the exhaust valves together at the exact same time to the exact same starting point or closed position. Because all of the exhaust valves in the system move together at the exact same time for the exact same distance from their fully closed to fully open position in the single stage system.

Two-stage system—The two-stage system can be seen in FIG. 3, FIG. 6, FIG. 13, and FIG. 40A-C.

Figure 40A:
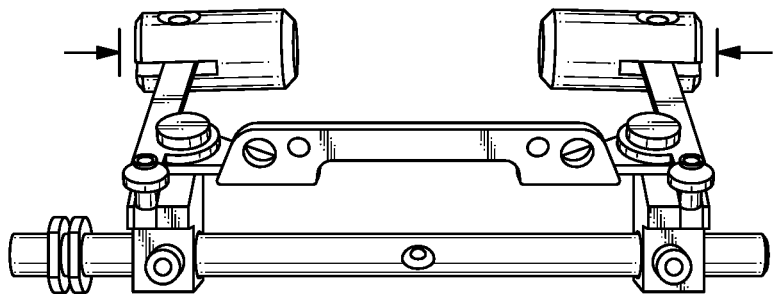
FIG. 40A is a drawing showing a prior art opening sequence of the secondary exhaust valves, no rotation.
Figure 40B:
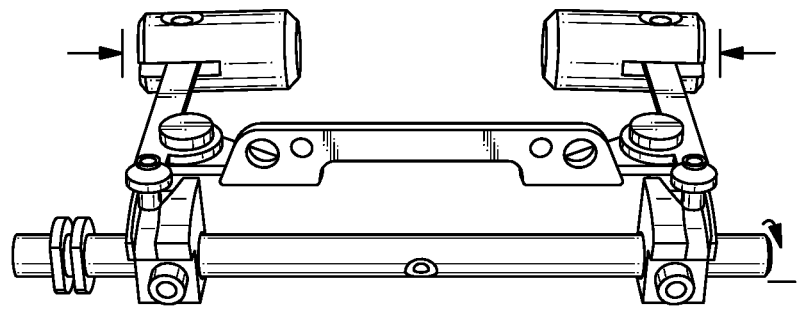
FIG. 40B is a drawing showing a prior art opening sequence of the secondary exhaust valves, half rotation.
Figure 40C:
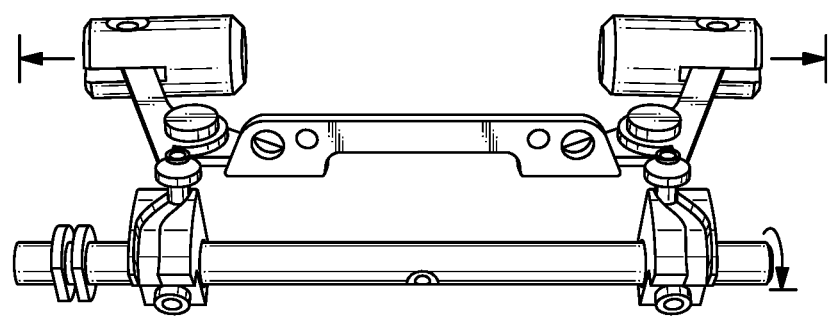
FIG. 40C is a drawing showing a prior art opening sequence of the secondary exhaust valves, full rotation.

For a better understanding of the FIG. 6 drawing, now with emphasis on the secondary exhaust valves and pulleys, FIG. 40A is a drawing showing a prior art opening sequence of the secondary exhaust valves, control rod with no rotation valves are closed. FIG. 40B is a drawing showing a prior art opening sequence of the secondary exhaust valves, control rod at half rotation valves are still closed, and FIG. 40C is a drawing showing a prior art opening sequence of the secondary exhaust valves, control rod at full rotation valves are open.

A two-stage system can include a split center exhaust valve, or more commonly, a single center exhaust valve for the first stage, and the second stage typically uses a pair of side exhaust valves or secondary exhaust valves that are configured as a mirror of each other and operate together as a pair with one on each side of the center exhaust valve or valves.

The first stage of the two-stage system is made up much the same as the single stage system mentioned above, where on rotation, the control rod moves all exhaust valves of the first stage together at the exact same time to the exact same end point or full open position.

Then following further rotation of the control rod, the second stage is activated by the control pulleys and both side exhaust valves which move together at the exact same time to the exact same end point or full open position. When the governor slows the control rod rotates back, closing the side exhaust valves of the second stage together at the exact same time to the exact same starting point or closed position. Then following further rotation, the center exhaust valve or valves are moved at the same exact time to the same exact starting point or closed position. The valves of each stage move in two separate isolated motions, or stages, in the two stage system.

Note that the first stage takes place during the straight section of control path in the control pulleys 32 and 33 (FIGS. 32A and 40A&B). This straight section is what allows the first stage to operate alone.

Also, note that the control pulleys of the prior art are made and configured as a mirrored pair, with each being a mirror of the other. The mirrored pulleys move mirrored linkage arms with pins 276 (arms 276 and pivot points 277 of linkage 27, FIG. 6). The linkage arms 276 move the mirrored side valves 12 (FIG. 32B).

Problem—Following a first half of throttle input, there is a relatively large surge of power defined by the Application as a "HIT".

In the current state of the art, these single stage and two stage systems make notchy and abrupt changes in power that is hard to control. The motorcycle driver experiences a smooth acceleration for the first half of throttle input followed by a large surge of power or a "HIT".

When the governor tension is increased in an effort to smooth the power delivery, the stages can be felt with a pause or hesitation before each of the stages followed by an abrupt surge or "Hit" of power. When the governor tension is decreased in an effort to eliminate the feeling of stages, the valves open too quickly, like a light switch, and power becomes too abrupt with a big "Hit" because all of the remaining power comes on at once.

The motorcycle operator experiences random hesitation and surging through changing throttle positions. No amount of tuning, and no presently available products solve the erratic output problem.

There is need for a solution to the erratic output problem and therefore there is a need for a new way to control exhaust valve operation.

Solution to the Erratic Power Output Problem:

The new system of the Application substantially eliminates the erratic surging and tames the "Hit".

Exemplary implementations have now been successfully demonstrated and tested over hundreds of testing hours. A new system for controlling the power valves using control pulleys with newly shaped control paths move the exhaust valves according to newly orchestrated sequences. The newly choreographed sequences provide a coordination and interaction between the exhaust valves that results in a smooth, seamless power output that is easy to control. The smooth, seamless power output that is easy to control is referred to by the Application as "Hitless" operation.

The upgrade replaces the original control linkage and pulleys. The upgrade includes three distinct factors realized and described in detail hereinbelow. The three factors now defined by the Application are referred to as "overlap", "stagger", and "limiter", describe and control the processes of coordinating exhaust valve movement and their timing and relationship to each other.

Figure 41:
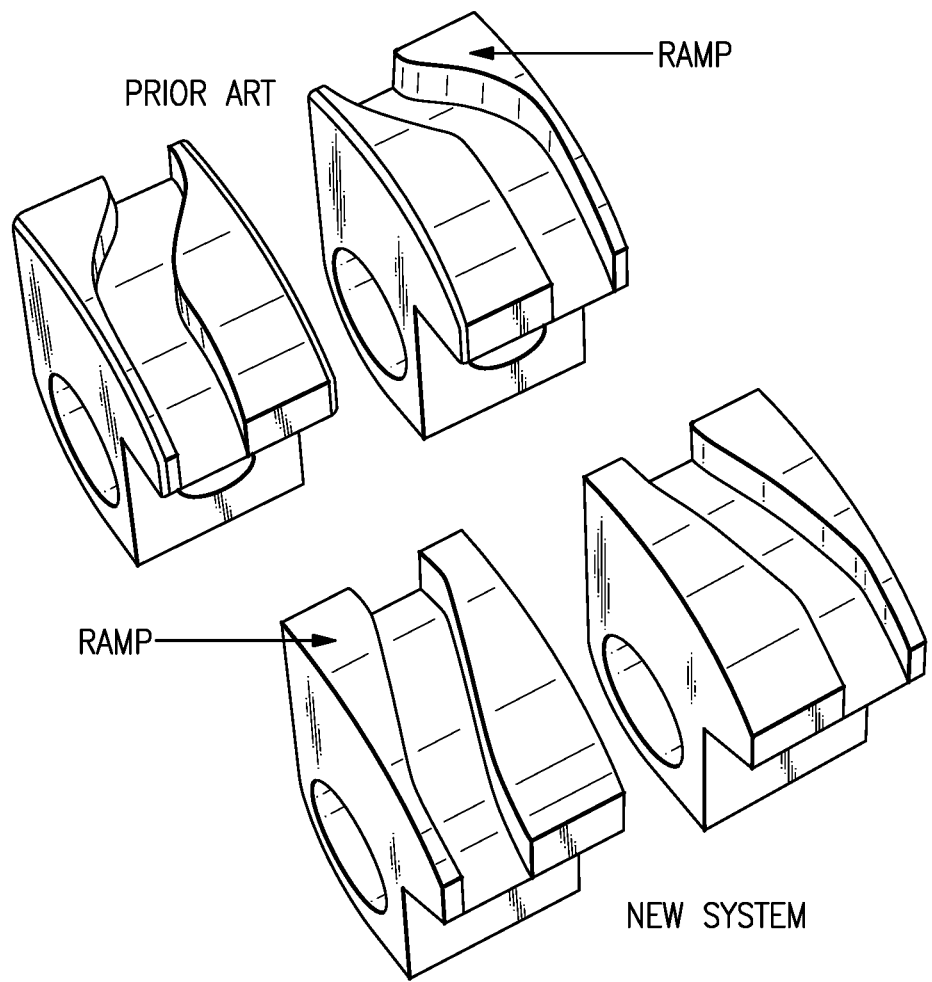
FIG. 41 is a drawing comparing pulleys of the prior art to exemplary new pulleys according to the Application.

FIG. 41 is a drawing comparing pulleys of the prior art to exemplary new pulleys according to the Application. As described in more detail hereinbelow, the new pulley structures can be varied for any desired combination of overlap, stagger, and limiter.

OVERLAP—Overlapping the stages of a two-stage system was found to smooth the power output dramatically. When overlap was introduced, the power output (exhaust flow) became much more progressive.

A substantially optimized amount of overlap was accomplished by using shaped control paths in the control pulleys that activate movement of the second stage exhaust valves before the first stage exhaust valve movement is complete, thus creating an overlapping movement of the valves. Put another way, movement of the valves from the second stage, overlap with the movement of valve from the first stage.

FIG. 32A-D show the typical prior art system operating in two separate stages. At no time do the valves or stages overlap with one another.

FIG. 33A-D show the new system with overlapping stages and valve movement.

Figure 33A:
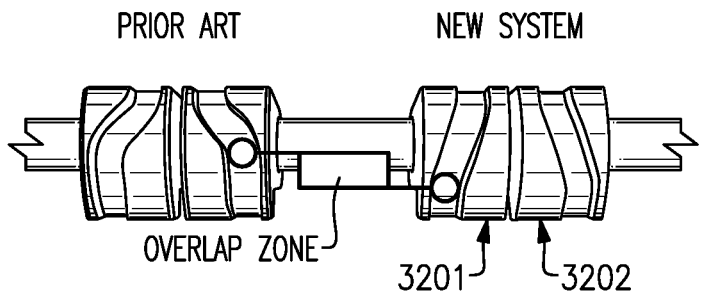
FIG. 33A is a drawing for comparison showing side valve starting point on pulleys from the prior art next to the pulleys of the new system.
Figure 33B:
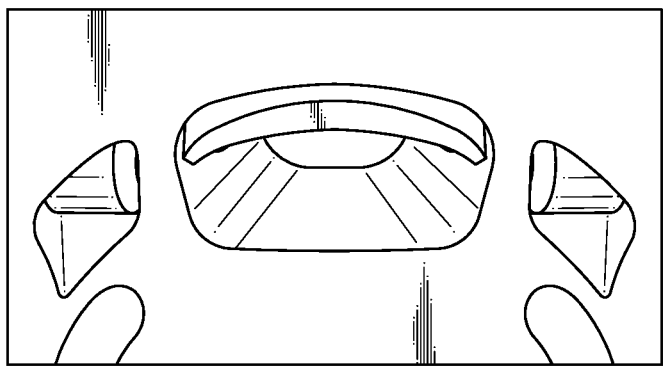
FIG. 33B is a drawing showing an opening sequence starting from all valves closed.
Figure 33C:
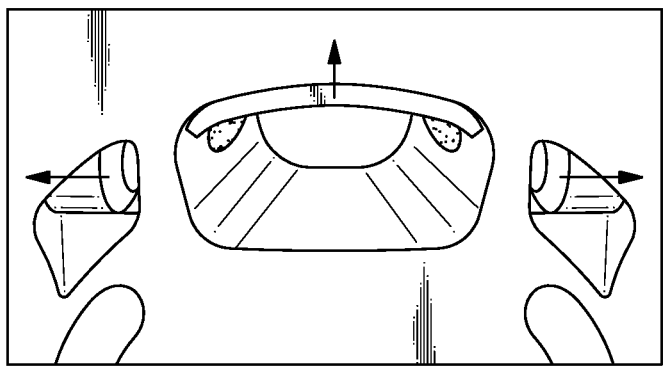
FIG. 33C is a drawing showing overlapping stages where the first stage center valve is still opening, and the second stage side valves are starting to open.
Figure 33D:
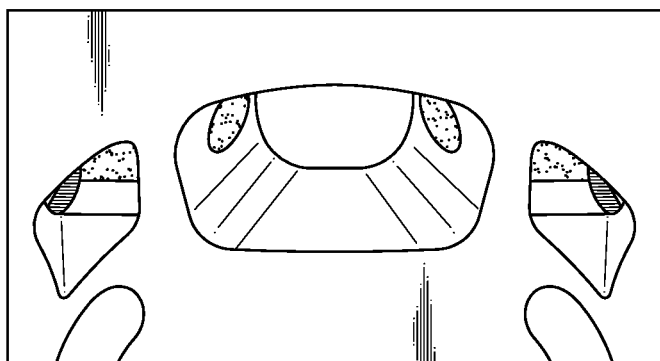
FIG. 33D is a drawing showing all of the power valves open.

FIG. 33C in particular shows another new process, where all valves partially open at the same time from two different stages.

Secondary exhaust valve timing is changed by using control pulleys for the second stage with unique control paths that trigger activation and movement of the second stage valves before the first stage valve movement is complete. The result is an overlapping sequence of stages, and therefore an overlapping movement of the exhaust valves. No feeling of stages with hesitation and surges could be felt with the new exhaust valve coordination.

OVERLAP Example—Overlap was accomplished by making control pulleys with the ramp portion that activates the second stage, start at about 25% of control rod rotation, instead of at 50% of the control rod rotation as in the prior art. The new pulley structure can be seen in FIG. 33A which shows the "overlap zone" between the new system starting point of about 25% and the prior art starting point of 50%. There was found to be a working range between about 20% and 40% of rotation. Activating the movement of the second stage exhaust valves before the first stage exhaust valve movement is complete, creates an overlapping movement of the stages and their valves. Put another way, the movement of the valves from the second stage overlaps with the movement of the valve from the first stage.

STAGGER—It was further realized that staggering the movement of valves configured in a split or mirrored pair, either in a single stage or two stage system, further smoothed the power output dramatically. When stagger was introduced to the pair, the power output (exhaust flow) became perfectly progressive.

A substantially optimize stagger was accomplished by using control pulleys with shaped control paths that activate movement of a valve on one side of the split, mirrored or side exhaust valves, before or after, the movement of the valve on the other side, thus creating a staggered movement of the valves.

FIGS. 34A-D and FIGS. 36A-D show the typical prior art systems of the split, mirrored or side exhaust valves operating with mirrored movement. These valves always move together at the same time.

Figure 34A:
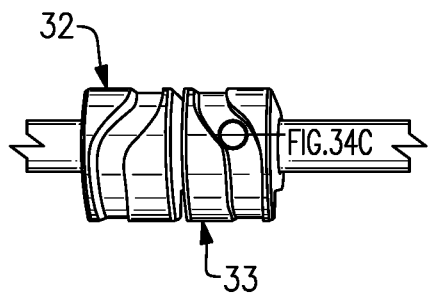
FIG. 34A is a drawing showing the pulleys of the prior art, pulleys have been moved together for comparison.
Figure 34B:
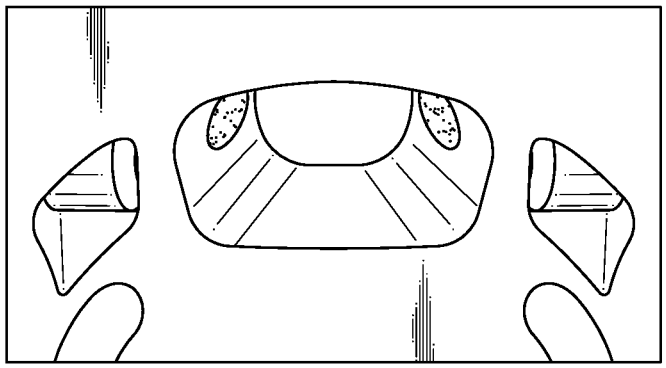
FIG. 34B is a drawing showing the opening sequence of the second stage power valves of the prior art starting with center valve open and side valves closed.
Figure 34C:
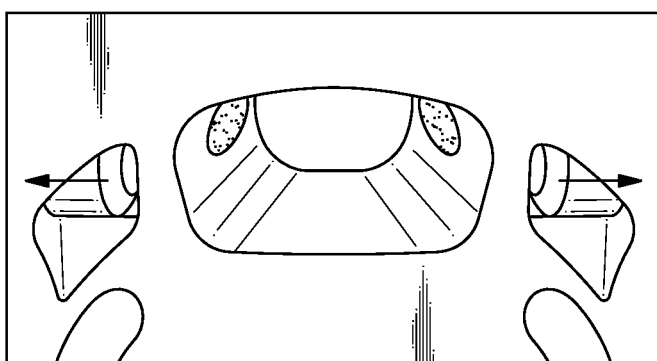
FIG. 34C is a drawing showing side valves opening together.
Figure 34D:
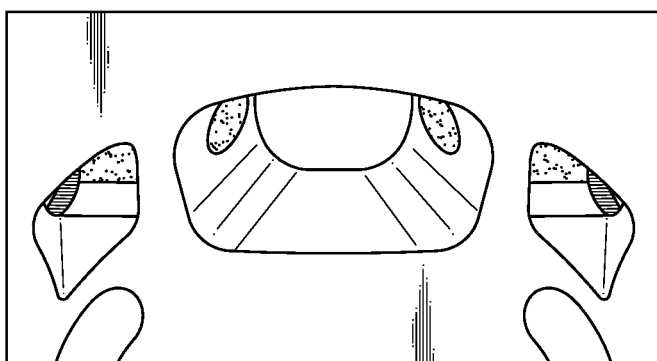
FIG. 34D is a drawing showing all power valves open.
Figure 36B:
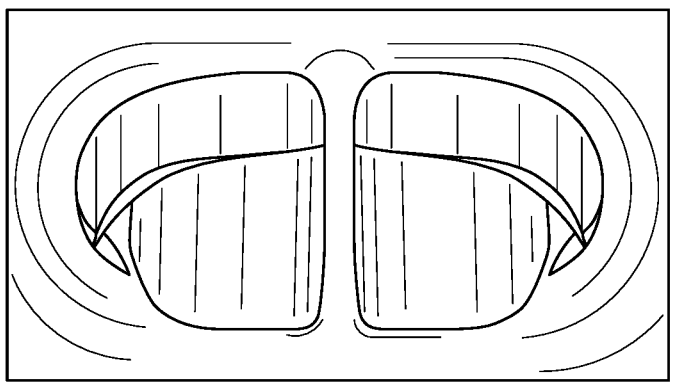
FIG. 36B is a drawing showing mirrored valves starting to open together.
Figure 36C:
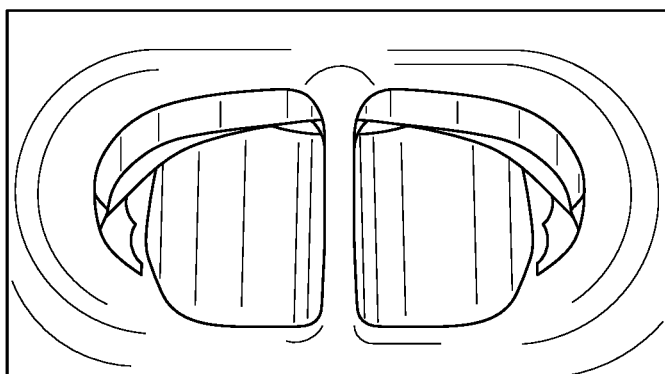
FIG. 36C is a drawing showing mirrored valves continuing to open together.
Figure 36D:
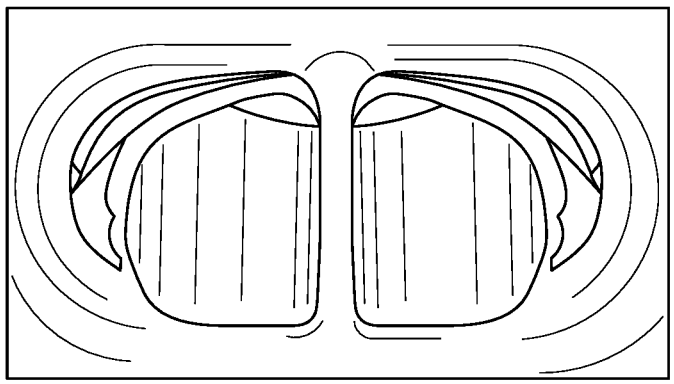
FIG. 36D is a drawing showing all power valves open.
Figure 37A:
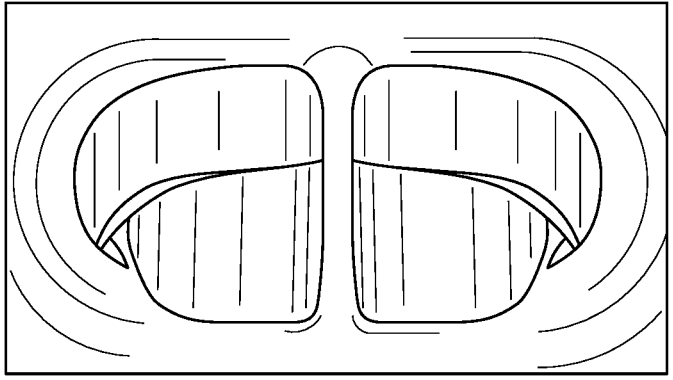
FIG. 37A is a drawing showing staggered opening sequence of the single stage new system starting with all power valves closed.
Figure 37B:
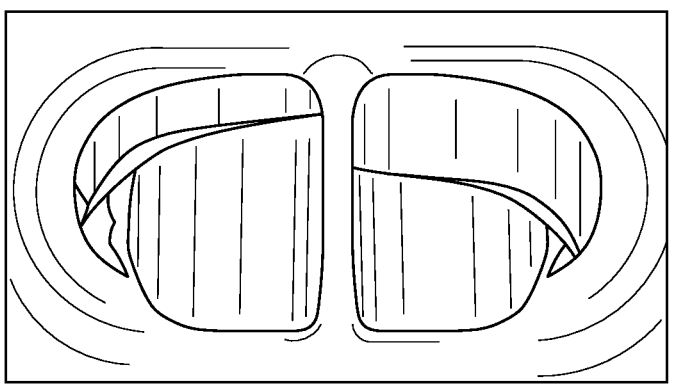
FIG. 37B is a drawing showing staggered opening sequence of valves with right valve opening first as viewed from downstream.
Figure 37C:
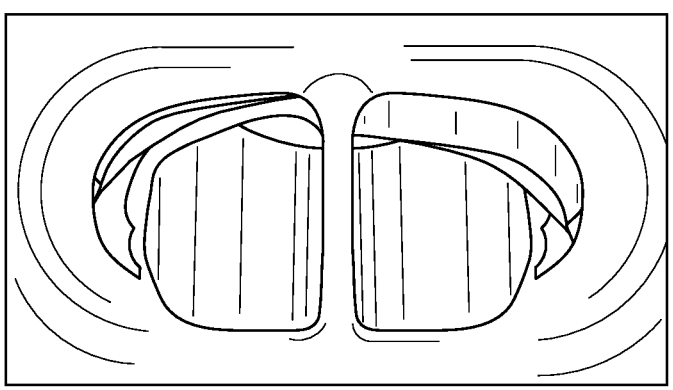
FIG. 37C is a drawing showing staggered opening sequence of valves with right valve open and left valve still partially closed.
Figure 37D:
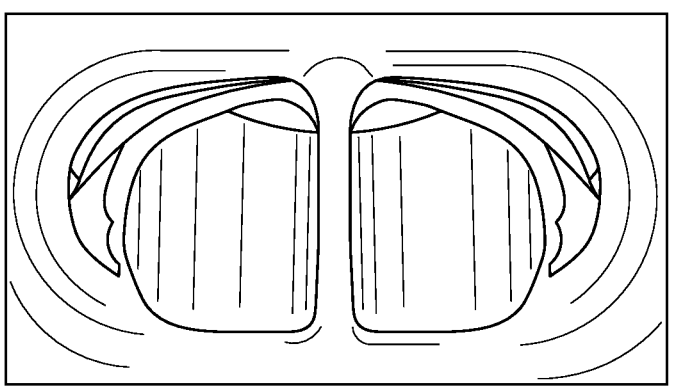
FIG. 37D is a drawing showing all power valves open.

FIGS. 34C and 36B in particular show this locked together movement.

FIGS. 35A-D and FIGS. 37A-D show the new system with a staggered valve movement.

FIGS. 35B, 35C and 37B, 37C in particular shows all valves moving at different times. The valves are staggered and never move together according to the new stagger process of the Application.

Rotation of the control rod causes the valve of one side of the mirrored pair to open first and upon further rotation opens the valve from the other side last, by using control pulleys with separate and unique control paths that trigger activation and movement of the first side valve before the second side valve movement starts, resulting in a staggered sequence of mirrored valves and therefore a staggered movement of the mirrored, split, or side exhaust valves.

When the valves of a mirrored pair are controlled separately providing independent operation that changes their timing and coordination, power delivery is smoothed, and performance is increased.

Another realization is that when the valves of a pair open at different times, this new approach sets up a better exhaust flow going into the curved header pipe which also increases performance.

Figure 35A:
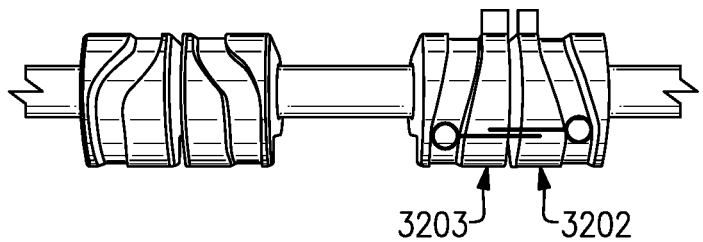
FIG. 35A is a drawing showing different starting points and different ramp angles on pulleys of the new system according to the Application.
Figure 35B:
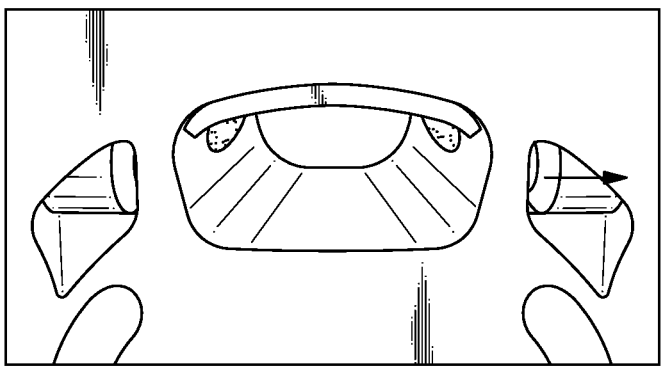
FIG. 35B is a drawing showing staggered opening sequence of side valves with right side valve opening first.
Figure 35C:
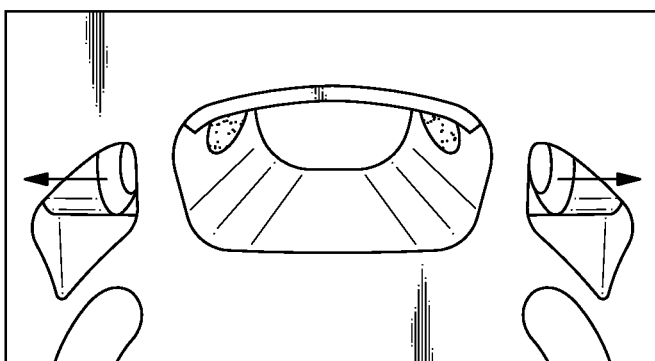
FIG. 35C is a drawing showing staggered opening sequence of side valves with right side valve open farther than left side valve.
Figure 35D:
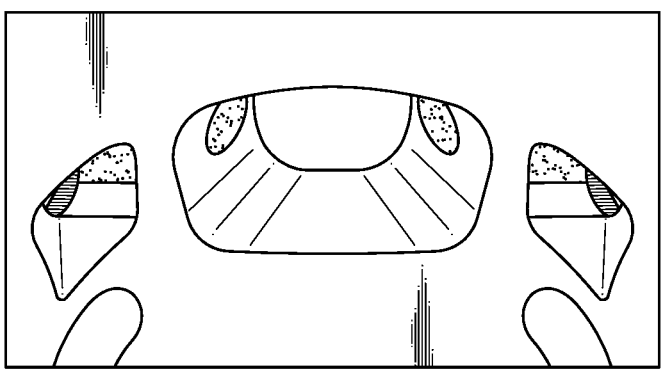
FIG. 35D is a drawing showing all power valves open.

STAGGER Example—Stagger was accomplished by making control pulleys with the ramped portions starting at different times as shown in FIG. 35A. In this case the left side starts at about 23% of control rod rotation and the right side starts at about 28% of rotation, instead of both starting at 50% of control rod rotation as in the prior art. FIG. 35A shows the "stagger zone" between the new system starting points of about 23% and about 28%. There was found to be a working range of stagger between about 5% and 20%. Activating movement of a valve on one side of the split, mirrored, or side exhaust valve pair, before or after the movement of the valve on the other side, creates a staggered movement of the valves.

LIMITER—Limiting the movement of valves configured in a split or mirrored pair, either in a single stage or two stage system, further smoothed the power output and made for higher revving. With certain amounts of maximum travel were introduced to the pair, the power output (exhaust flow) became more efficient because it made a better overall shape of the exhaust port that creates less turbulence, and therefore provides a better exhaust flow. By contrast, when the system used in the prior art reached a certain RPM, the turbulence in the exhaust port made the power fall off abruptly.

FIG. 38A shows the valve 12 from downstream. The dark area around the valve is a sharp edge and large void created by the beveled valve and the fact that the face of the valve travels past being flush with the sides of the port.

FIG. 38C shows the same valve 12 from upstream. The dark area around the valve shows the same sharp edge and deep void around the valve.

FIG. 38B shows the new systems from downstream with new control pulleys that establish a new endpoint. The base of the bevel on the valve 12 is flush with the side of the port for much better exhaust flow.

FIG. 38D also shows the new endpoint with exposed bevel on the valve 12 from upstream.

The increased efficiency saw a rise of 1,000 RPMs at peak output before gradually tapering off. This was accomplished by using control pulleys with uniquely designed and shaped control paths that open the valves part-way and then stops their movement before their previously intended endpoint or stopping point. This limited the previously intended travel and prevented the valves from opening all the way.

Figure 39A:
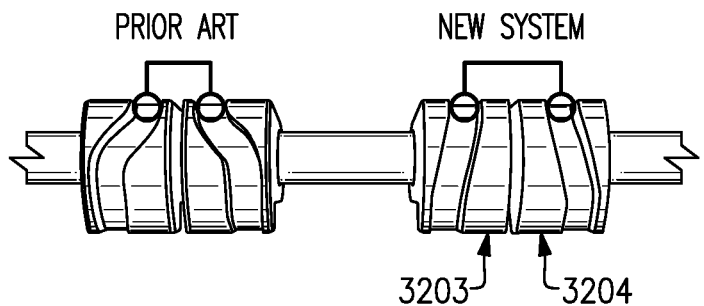
FIG. 39A is a drawing for comparison showing endpoints established by pulleys from the prior art next to the pulleys of the new system according to the Application.

FIG. 39A show pulleys from both systems, notice the different end points.

Figure 39B:
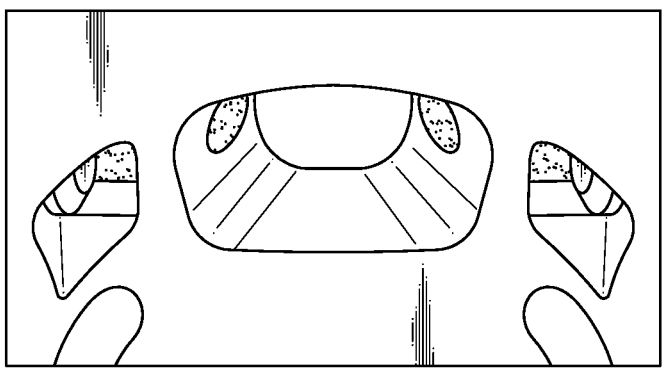
FIG. 39B is a drawing showing new system with all power valves open, as viewed from upstream.

FIG. 39B shows the new system with all valves fully open.

Now the valves are only allowed to open part-way with a new endpoint or stopping point. Put another way, exhaust valves only allowed to open part way, that have their intended travel limited, and are stopped before their previously intended endpoint thereby establishing a new endpoint. The result of restricting valve movement is a higher revving engine with smoother power delivery from beginning to end. LIMITER Example—Limiter was accomplished by making control pulleys with the overall height of the ramped portions lower than those of the prior art as shown in FIG. 39A. In this case the new system uses ramps that are about 68% of the height of the prior art.

Figure 39C:
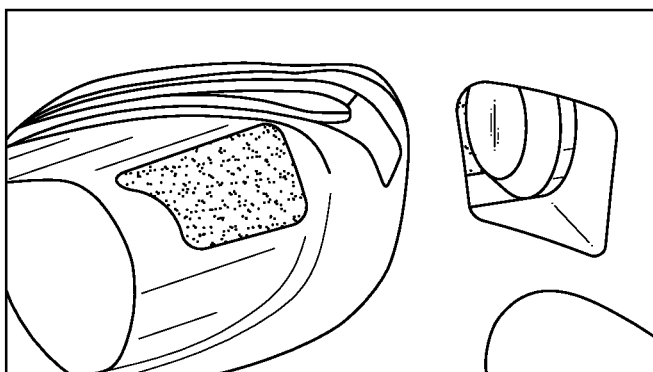
FIG. 39C is a drawing showing new limited power system with all power valves open, as viewed from upstream.
Figure 39D:
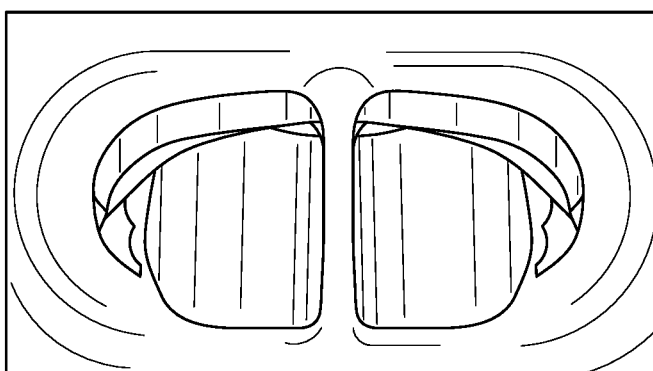
FIG. 39D is a drawing showing new limited power system with all power valves open, as viewed from downstream.

FIG. 39C and FIG. 39D show different pulleys in use with even further restricted end points, in this case the ramped portions are about 47% of the height of the prior art. There was found to be a working range of limiting of between about 0% and 68% of the prior art height. These exemplary pulleys only move the exhaust valves a distance that is less than originally intended restricting the maximum power output of the engine. This new pulley structure is not limiting peak output by fuel restriction, intake restriction, or ignition restriction. Instead, a pulley with limiter as described hereinabove restricts peak output by way of the exhaust valves. Restricted power output is a benefit in many different situations such as, for example small race courses, wooded courses, and for increased safety. No prior art offer valves that only open part way.

In summary of limiter, at a maximum rotation of the control rod, the profiled slot of the left control pulley and the right control pulley limits the open position to less than full open position of the exhaust valves in a limiter operation. In other words, if the pulleys are not connected, the valves could physically open further than when limited by the pulley slot profiles to less than full open at the governor driven maximum rotation of the control rod.

CONCLUSION

These new operations of the secondary exhaust valves, overlap, stagger, and limiter, were not previously understood before as solutions to the Hit problem, as evidenced by the prior art currently in its 21st production year, are believed to work with all types of YPVS™ system from 1999 to the current model year.

Once modified the pulley slots introduce exhaust valve, overlap, stagger, and/or limiter as described hereinabove, a range of different spring rates can now be used in the governor for even more flexibility. The new governor spring can be matched for substantially improved high RPM performance while increasing low RPM torque because of the stronger spring rate.

The new system as described hereinabove makes the pulley operation mechanically smoother having less than half the ramp angle for the linkage pin to climb.

Applicant realized that previously undesirable engine performance characteristics experienced by the motorcycle operator, particularly during acceleration, can be solved by installing the new control pulleys. In the solution, described and claimed in the application, a replacement kit that include unique pulleys with all three discoveries, overlap, stagger, and limited travel is offered. By using any one of these three discoveries or any combination thereof, to any extent, it is possible to tune or tailor the power characteristics to the individual and situation which solves the HIT problem of hesitation and surging power during throttle changes.

Following installation of the new "Hitless" motorcycle engine power valve control upgrade kit with the new valve interaction never considered or attempted before. Exhaust valves now move in a precise manner making exhaust flow smooth and progressive with less turbulence and higher peek output, it provides the ultimate "Hitless" power delivery. The erratic surging and "Hit" problem is solved.

One exemplary adjustable exhaust port 2-stroke motorcycle engine is used in the Yamaha™ YZ250 series motorcycle.

One exemplary adjustable exhaust port 2-stroke motorcycle engine is used in the Yamaha™ YZ125 series motorcycle.

The exemplary embodiments described hereinabove introduced the hitless solution by power valve control in terms of motorcycle engines, such as for example, the classic Yamaha YZ250 and YZ125 2-stroke motorcycle engines. Other suitable applications can include, for example, engines for ATV's, snowmobiles, jet skis, other watercraft, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of operation of exhaust valves of an adjustable exhaust port 2-stroke motorcycle engine comprising:
   providing a control rod mechanically coupled to a governor, so that said governor causes a rotation of said control rod, an exhaust valve system comprising a center exhaust valve controllably linked to said control rod, a left exhaust valve controllably linked to said control rod, and a right exhaust valve controllably linked to said control rod,
   wherein said rotation controls a position of said center exhaust valve, said left exhaust valve and said right exhaust valve; and
   operating said left exhaust valve and said right exhaust valve by opening at least one of said left exhaust valve and said right exhaust valve before said center exhaust valve is completely open in an overlap operation,
   wherein said step of operating further comprises operating said left exhaust valve and said right exhaust valve to open at different times or to have a different degree of open position with respect to each other, in a staggered operation.

2. An adjustable exhaust port 2-stroke motorcycle engine with an exhaust valve system comprising:
   a control rod mechanically coupled to a governor, so that said governor causes a rotation of said control rod;
   a center exhaust valve controllably linked to said control rod;
   a left exhaust valve controllably linked to said control rod and a right exhaust valve controllably linked to said control rod;
   a left control pulley with a profiled slot, said left control pulley mounted to said control rod and a right control pulley with a profiled slot, said right control pulley mounted to said control rod,
   wherein a rotation of said left control pulley controls a position of said left exhaust valve via a first pin sliding in said profiled slot of said left control pulley, and
   wherein a rotation of said right control pulley controls a position of said right exhaust valve via a second pin sliding in said profiled slot of said right control pulley; and
   wherein an initial rotation of said control rod causes said center exhaust valve to open first, and on further rotation of said control rod, and said profiled slot of said left control pulley and said profiled slot of said right control pulley causes said left exhaust valve and said right exhaust valve to open before said center exhaust valve is completely open in an overlap operation.

3. The adjustable exhaust port 2-stroke motorcycle engine of claim 2, wherein said profiled slot of said left control pulley and said profiled slot of said right control pulley causes said left exhaust valve and said right exhaust valve to open at different times with respect to each other, in a staggered operation.

4. The adjustable exhaust port 2-stroke motorcycle engine of claim 2, wherein at a maximum rotation of said control rod, said profiled slot of said left control pulley and said profiled slot of said right control pulley limits an open position of said left exhaust valve and said right exhaust valve to less than a full open position of at least one of said left exhaust valve and said right exhaust valve in a limiter operation.

5. The adjustable exhaust port 2-stroke motorcycle engine of claim 2, wherein said adjustable exhaust port 2-stroke motorcycle engine is disposed in a YZ125 series motorcycle.

6. The adjustable exhaust port 2-stroke motorcycle engine of claim 2, wherein said adjustable exhaust port 2-stroke motorcycle engine is disposed in a YZ250 series motorcycle.

7. An adjustable exhaust port 2-stroke motorcycle engine comprising:
   a control rod mechanically coupled to a governor, so that said governor causes a rotation of said control rod;
   an exhaust valve system comprising a center exhaust valve controllably linked to said control rod, and left exhaust valve and a right exhaust valve controllably linked to said control rod; and a left control pulley having a profiled slot, said left control pulley mounted to said control rod, and a right control pulley having a profiled slot, said right control pulley mounted to said control rod, wherein a rotation of said left exhaust valve and said right exhaust valve respectively via a first pin sliding in said profiled slot of said left control pulley and a second pin sliding in said profiled slot of said right control pulley of said adjustable exhaust port 2-stroke motorcycle engine with said exhaust valve system, and wherein said profiled slot of said left control pulley and said profiled slot of said right control pulley causes said left exhaust valve and said right exhaust valve of said adjustable exhaust port 2-stroke motorcycle engine with said exhaust valve system to open at different times with respect to each other, in a staggered operation, and wherein an initial rotation of said control rod causes said center exhaust valve to open first, and on a further rotation of said control rod, and said profiled slot of said left control pulley and said profiled slot of said right control pulley causes said left exhaust valve and said right exhaust valve to open before said center exhaust valve is completely open in an overlap operation.

8. The adjustable exhaust port 2-stroke motorcycle engine of claim 7, wherein said adjustable exhaust port 2-stroke motorcycle engine is disposed in a YZ125 series motorcycle.

9. The adjustable exhaust port 2-stroke motorcycle engine of claim 7, wherein said adjustable exhaust port 2-stroke motorcycle engine is disposed in a YZ250 series motorcycle.

10. A method of operation of exhaust valves of an adjustable exhaust port 2-stroke motorcycle engine comprising:
providing a control rod mechanically coupled to a governor, so that said governor causes a rotation of said control rod, an exhaust valve system comprising a center exhaust valve controllably linked to said control rod, a left exhaust valve controllably linked to said control rod, and a right exhaust valve controllably linked to said control rod,
wherein said rotation controls a position of said center exhaust valve, said left exhaust valve and said right exhaust valve; and
operating said left exhaust valve and said right exhaust valve by opening at least one of said left exhaust valve and said right exhaust valve before said center exhaust valve is completely open in an overlap operation,
wherein said step of operating further comprises operating said left exhaust valve and said right exhaust valve at a maximum rotation of said control rod, limited to less than a full open position of said left exhaust valve and said right exhaust valve in a limiter operation.

11. An adjustable exhaust port 2-stroke motorcycle engine comprising:
a control rod mechanically coupled to a governor, so that said governor causes a rotation of said control rod;
an exhaust valve system comprising:
a first side and second side of a split center valve controllably linked to said control rod, or
a left exhaust valve and a right exhaust valve controllably linked to said control rod; and
a left control pulley having a profiled slot, said left control pulley mounted to said control rod, and a right control pulley having a profiled slot, said right control pulley mounted to said control rod, wherein a rotation of:
said left control pulley and said right control pulley controls a position of said first side and said second side of said split center valve of said adjustable exhaust port 2-stroke motorcycle engine with said exhaust valve system, or
said left exhaust valve and said right exhaust valve respectively via a first pin sliding in said profiled slot of said left control pulley and a second pin sliding in said profiled slot of said right control pulley of said adjustable exhaust port 2-stroke motorcycle engine with said exhaust valve system, and
wherein said profiled slot of said left control pulley and said profiled slot of said right control pulley causes:
said first side and said second side of said split center valve of said adjustable exhaust port 2-stroke motorcycle engine with said exhaust valve system to open at different times with respect to each other, in a staggered operation, or
said left exhaust valve and said right exhaust valve of said adjustable exhaust port 2-stroke motorcycle engine with said exhaust valve system to open at different times with respect to each other, in a staggered operation, and
wherein at a maximum rotation of said control rod,
said profiled slot of said left control pulley and said profiled slot of said of said right control pulley limits an open position of said first side and said second side of said split center valve of said adjustable exhaust port 2-stroke motorcycle engine with said exhaust valve system in a limiter operation, or
said profiled slot of said left control pulley and said profiled slot of said right control pulley limits an open position of said left exhaust valve and said right exhaust valve to less than a full open position of said adjustable exhaust port 2-stroke motorcycle engine with said exhaust valve system in a limiter operation.

* * * * *